(12) United States Patent
Gao et al.

(10) Patent No.: US 10,398,095 B2
(45) Date of Patent: Sep. 3, 2019

(54) BLOWING-SUCTION DEVICE

(71) Applicant: Positec Power Tools (Suzhou) Co., Ltd, Suzhou (CN)

(72) Inventors: Zhendong Gao, Suzhou (CN); Andrea Cestonaro, Suzhou (CN); Xiahong Zha, Suzhou (CN); Fengli Zhao, Suzhou (CN); Hongfeng Zhong, Suzhou (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 108 days.

(21) Appl. No.: 15/531,348

(22) PCT Filed: Nov. 27, 2015

(86) PCT No.: PCT/CN2015/095867
§ 371 (c)(1),
(2) Date: May 26, 2017

(87) PCT Pub. No.: WO2016/082799
PCT Pub. Date: Jun. 2, 2016

(65) Prior Publication Data
US 2017/0325410 A1 Nov. 16, 2017

(30) Foreign Application Priority Data

Nov. 28, 2014 (CN) .......................... 2014 2 0735100
Apr. 10, 2015 (CN) .......................... 2015 2 0215730
(Continued)

(51) Int. Cl.
*E01H 1/08* (2006.01)
*A01G 20/43* (2018.01)
*A01G 20/47* (2018.01)

(52) U.S. Cl.
CPC ............. *A01G 20/43* (2018.02); *A01G 20/47* (2018.02); *E01H 1/08* (2013.01); *E01H 1/0863* (2013.01)

(58) Field of Classification Search
CPC .......... A01G 20/43; E01H 1/08; E01H 1/0863
See application file for complete search history.

(56) References Cited

U.S. PATENT DOCUMENTS 4,870,714 A 10/1989 Miner
5,440,781 A 8/1995 Kitazawa et al.
(Continued)

FOREIGN PATENT DOCUMENTS

CN 2484350 Y 4/2002
CN 2745993 Y 12/2005
(Continued)

OTHER PUBLICATIONS

European Search Report and Written Opinion from European Application No. 15862892, dated Jun. 28, 2018, 8 pages.
(Continued)

*Primary Examiner* — Dung Van Nguyen
(74) *Attorney, Agent, or Firm* — TraskBritt

(57) ABSTRACT

Disclosed is a blowing-suction device, comprising a housing; an air pipe extending along a longitudinal direction and connected to the housing; a motor located in the housing and providing rotational motion; and a fan rotationally generating an airflow; wherein when the fan operably rotates along a first direction, the blowing-suction device is in a blowing mode; and when the fan operably rotates along a second direction, the blowing-suction device is in a suction mode.

20 Claims, 44 Drawing Sheets

(30) Foreign Application Priority Data

| Jun. 5, 2015 | (CN) | 2015 1 0304730 |
|---|---|---|
| Aug. 13, 2015 | (CN) | 2015 1 0493734 |
| Aug. 24, 2015 | (CN) | 2015 1 0523696 |
| Nov. 6, 2015 | (CN) | 2015 1 0752534 |

(56) References Cited

U.S. PATENT DOCUMENTS

| 5,673,457 | A | 10/1997 | Webster et al. | |
|---|---|---|---|---|
| 6,000,096 | A * | 12/1999 | Everts | A47L 9/322 15/330 |
| 7,266,860 | B2 * | 9/2007 | Tate | A47L 5/14 15/330 |
| 7,748,078 | B2 * | 7/2010 | Andriolo | E01H 1/0836 15/330 |
| 7,870,640 | B2 * | 1/2011 | Hinklin | A47L 5/14 15/330 |
| 8,918,951 | B2 * | 12/2014 | Stones | A01G 20/47 15/339 |
| 9,138,113 | B2 * | 9/2015 | Nesom | A01G 20/47 |
| 2002/0108207 | A1 * | 8/2002 | Oohama | A47L 5/14 15/330 |
| 2003/0210994 | A1 * | 11/2003 | Boyd | F04D 25/084 417/423.1 |
| 2008/0148513 | A1 | 6/2008 | Shaffer | |
| 2014/0310911 | A1 * | 10/2014 | Tate | A47L 5/14 15/330 |
| 2016/0238010 | A1 | 8/2016 | Schaffler et al. | |
| 2018/0146628 | A1 | 5/2018 | Huo et al. | |

FOREIGN PATENT DOCUMENTS

| CN | 200971480 Y | 11/2007 |
|---|---|---|
| CN | 200981987 Y | 11/2007 |
| CN | 101135139 A | 3/2008 |
| CN | 101288572 A | 10/2008 |
| CN | 101481906 A | 7/2009 |
| CN | 201482758 U | 5/2010 |
| CN | 201632451 U | 11/2010 |
| CN | 101322625 B | 1/2011 |
| CN | 201972129 U | 9/2011 |
| CN | 102415852 A | 4/2012 |
| CN | 102647045 A | 8/2012 |
| CN | 102995589 A | 3/2013 |
| CN | 202851398 U | 4/2013 |
| CN | 103156548 A | 6/2013 |
| CN | 103158107 A | 6/2013 |
| CN | 103213106 A | 7/2013 |
| CN | 103300790 A | 9/2013 |
| CN | 103321171 A | 9/2013 |
| CN | 103534413 A | 1/2014 |
| CN | 103572725 A | 2/2014 |
| CN | 103658107 A | 3/2014 |
| CN | 103850206 A | 6/2014 |
| CN | 103866725 A | 6/2014 |
| CN | 103894370 A | 7/2014 |
| CN | 103864221 B | 2/2015 |
| CN | 105648961 A | 6/2016 |
| CN | 105648962 A | 6/2016 |
| CN | 105648963 A | 6/2016 |
| CN | 105648964 A | 6/2016 |
| CN | 205399327 U | 7/2016 |
| CN | 205421121 U | 8/2016 |
| CN | 205421122 U | 8/2016 |
| CN | 205421123 U | 8/2016 |
| CN | 205421124 U | 8/2016 |
| CN | 105648959 B | 5/2018 |
| CN | 105648960 B | 5/2018 |
| DE | 19608376 A1 | 9/1997 |
| EP | 0922429 A2 | 6/1999 |
| EP | 3225740 A4 | 10/2017 |
| JP | 2558617 B2 | 11/1996 |
| JP | 2004092161 A | 3/2004 |
| JP | 2011-078873 A | 4/2011 |
| JP | 2011111793 A | 6/2011 |
| JP | 2011-143084 A | 7/2011 |
| JP | 2014-101743 A | 6/2014 |
| WO | 8904135 A1 | 5/1989 |

OTHER PUBLICATIONS

Chinese Second Office Action for Chinese Application No. 201510847772.3, dated Aug. 28, 2017, 22 pages.
Chinese Second Office Action for Chinese Application No. 201510847124.8, dated Aug. 21, 2017, 22 pages.
Chinese Second Office Action for Chinese Application No. 201510846956.8, dated Aug. 29, 2017, 15 pages.
Chinese Second Office Action and Search Report for Chinese Application No. 201510846809.0, dated Sep. 14, 2017, 11 pages.
Chinese First Office Action and Search Report for Chinese Application No. 201510848179.0, dated Jan. 25, 2017, 26 pages.
Chinese First Office Action and Search Report for Chinese Application No. 201510847772.3, dated Dec. 5, 2016, 23 pages.
Chinese First Office Action and Search Report for Chinese Application No. 201510847124.8, dated Dec. 5, 2016, 21 pages.
Chinese First Office Action and Search Report for Chinese Application No. 201510846992.4, dated Dec. 5, 2016, 14 pages.
Chinese First Office Action and Search Report for Chinese Application No. 201510846956.8 dated Dec. 13, 2016, 18 pages.
Chinese First Office Action and Search Report for Chinese Application No. 201510846809.0, dated Dec. 30, 2016, 11 pages.
International Search Report from International Application No. PCT/CN2015/095867, dated Mar. 4, 2016, 8 pages with English translation.
International Written Opinion from International Application No. PCT/CN2015/095867, dated Mar. 4, 2016, 4 pages.

* cited by examiner

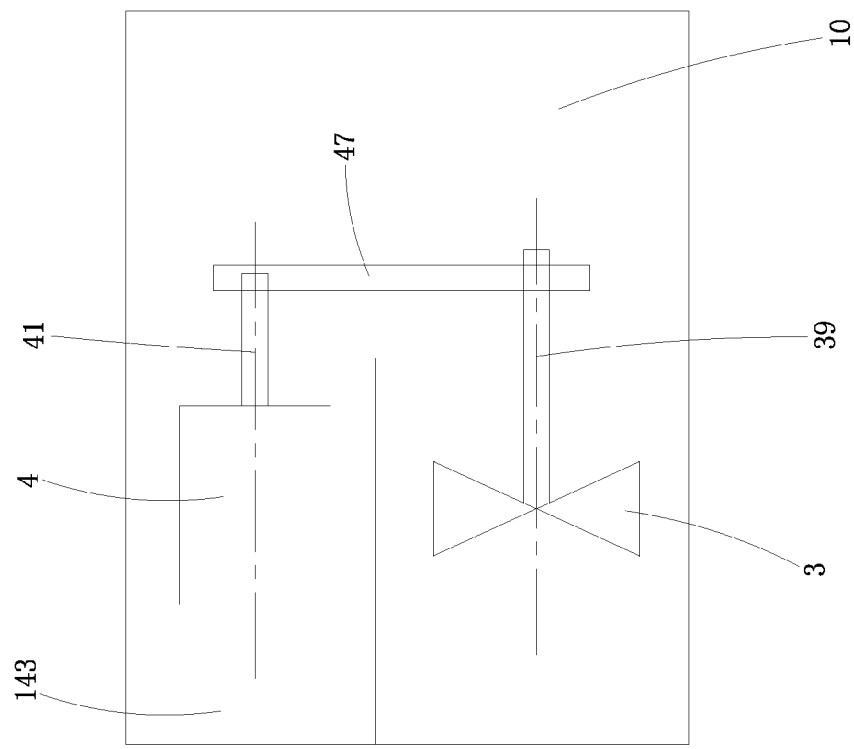
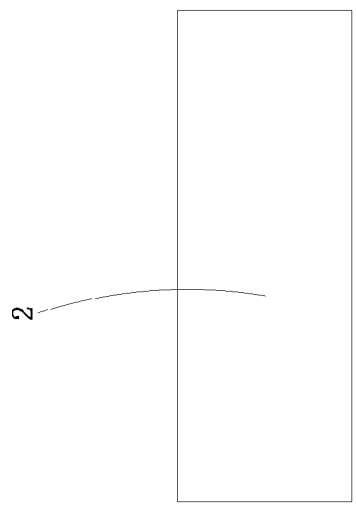
FIG. 20

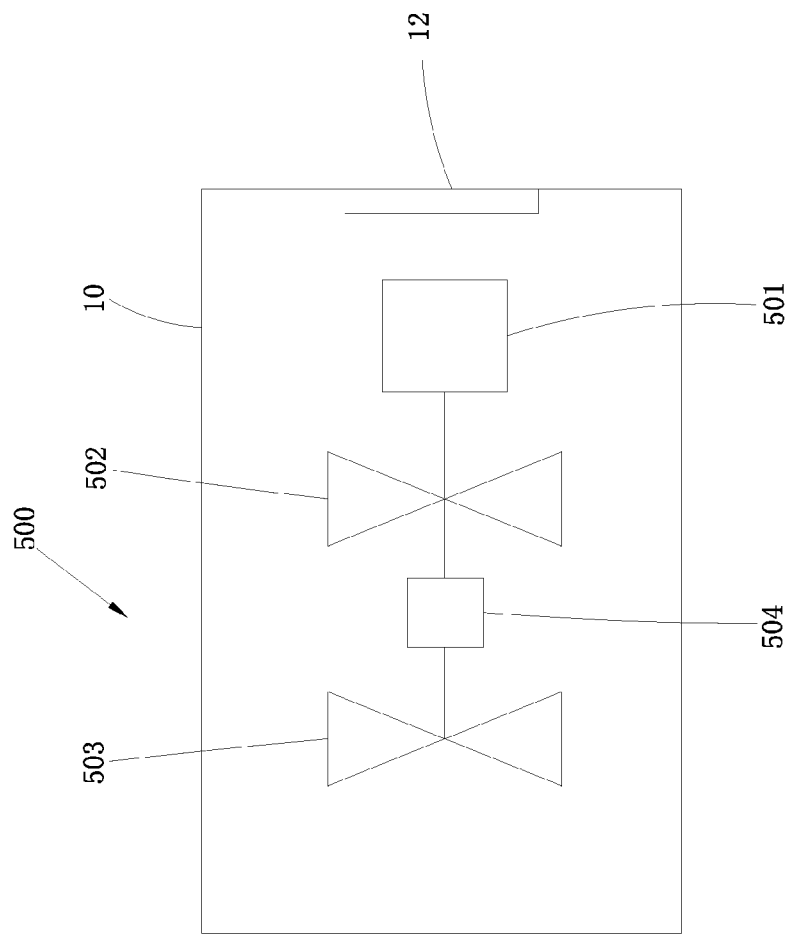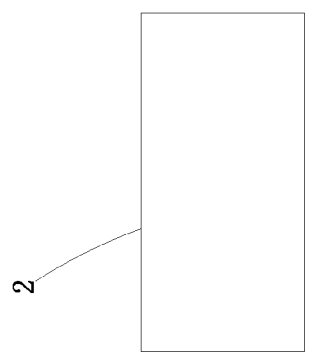
FIG. 41

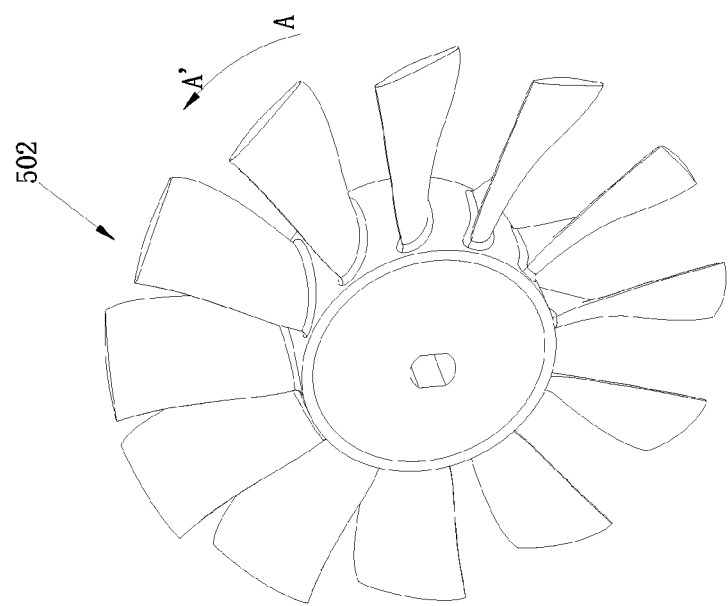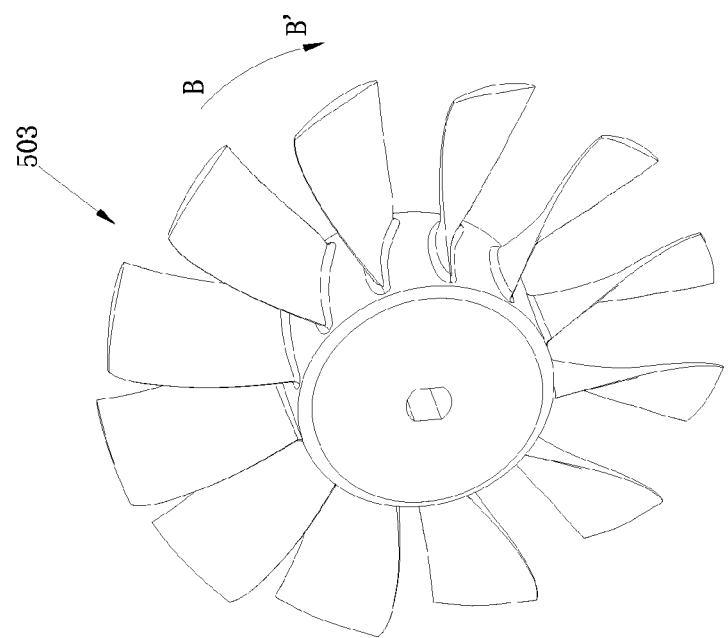
FIG. 42

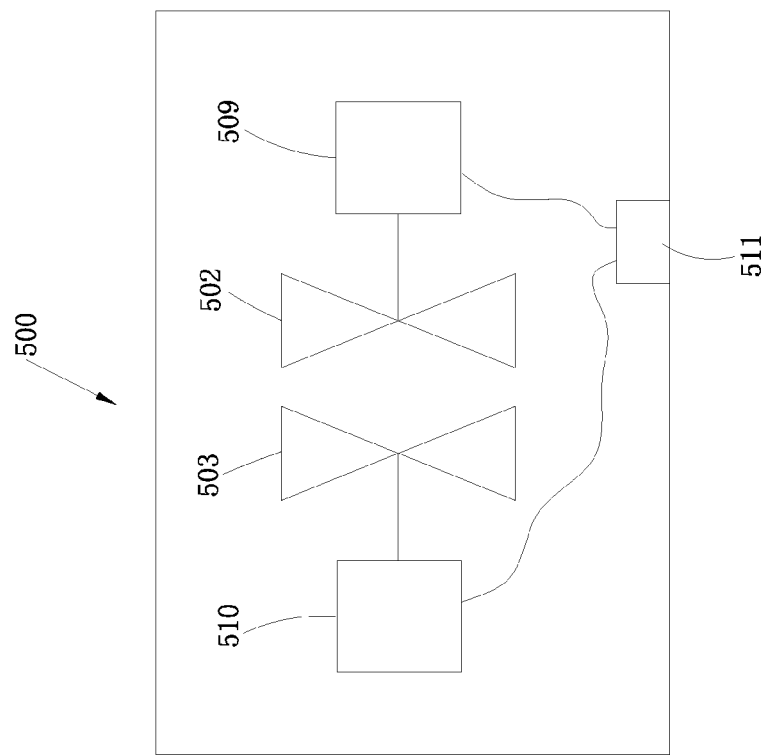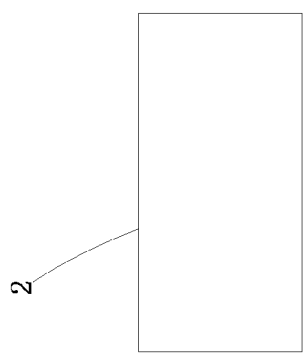
FIG. 45

BLOWING-SUCTION DEVICE

CROSS-REFERENCE TO RELATED APPLICATIONS

This application is a national phase entry under 35 U.S.C. § 371 of International Patent Application PCT/CN2015/095867, filed Nov. 27, 2015, designating the United States of America and published as International Patent Publication WO 2016/082799 A1 on Jun. 2, 2016, which claims the benefit under Article 8 of the Patent Cooperation Treaty to Chinese Patent Application Serial Nos. 201420735100.4, filed Nov. 28, 2014, 201520215730.3 filed Apr. 10, 2015, 201510304730.5 filed Jun. 5, 2015, 201510493734.2 filed Aug. 13, 2015, 201510523696.0 filed Aug. 24, 2015, and 201510752534.4 filed Nov. 6, 2015.

TECHNICAL FIELD

The present invention relates to a blowing-suction device with a blowing function and a suction function.

BACKGROUND

A blowing-suction device is a common electric outdoor cleaning tool, mainly used for cleaning and collecting garbage such as leaves. The blowing-suction device generally has a blowing mode and a suction mode. In the blowing mode, the blowing-suction device blows out air outwards, which can concentrate leaves scattered on the ground. In the suction mode, the blowing-suction device generates suction and cooperates with a collection device to suck the leaves into the collection device, thus avoiding manual cleaning and achieving the aim of saving manpower and time. The collection device may be a carry-on garbage bag embodying portability, and may also be a large-sized garbage can that can store more leaves at a time. Therefore, a user can freely select whether the blowing-suction device is in the suction mode or the blowing mode according to actual working conditions. In this way, an advantage is as follows: the user can complete concentration and collection of the leaves only with one blowing-suction device, which does not require other additional tools.

The traditional blowing device only with a blowing function does not have a suction mode, and thus, the user, after concentrating the leaves by using the blowing function, still needs to rely on another tool to collect the concentrated leaves into the collection device. Herein, the another tool is, for example, a cleaner, a manual tool or the like. Therefore, it is necessary to use more tools to complete the work, and operations are relatively complex. This is a favorable factor of the blowing-suction device compared with the traditional blowing device.

However, the blowing-suction device also has disadvantages. The blowing-suction device implements two different functions of blowing and suction, needs to combine their characteristics, and also needs to enhance performance of blowing and suction as much as possible, which cannot directly follow the structure of the blower. In addition, the blowing-suction device needs to frequently switch between the suction mode and the blowing mode, and thus the process of mode switching has to be simplified as much as possible, facilitating the user's use and enhancing user experience.

For example, the U.S. Pat. No. 4,870,714 discloses a blowing-suction device which has a blowing function and a suction function. When implementing the blowing function, the blow pipe is connected to the radial position of the fan, and when implementing the suction function, the blow pipe is connected to the axial position of the fan. Such a design has the following disadvantages:

1. At first, the blow pipe and the suction pipe are not a same pipe, and thus the user can implement blowing and suction functions only by providing the blow pipe and the suction pipe; if one pipe is lost, it may result in that a function cannot be implemented, and two pipes may definitely occupy a greater storage space and higher cost.
2. In the case of blowing and suction switching, the mounted blow pipe/suction pipe has to be removed first, and then the suction pipe/blow pipe is mounted. That is to say, in the case of switching the blowing and suction modes, the air pipe needs to be replaced, which brings great inconvenience to the user's operation.
3. The blow pipe and the suction pipe need to be mounted in different positions on the blowing-suction device, thus causing complexity of the overall structure. Therefore, the structure of the blowing-suction device has to be optimized, to make the structure more compact, user operations more convenient, and the whole blowing-suction device smaller, thus meeting the user's demand.

BRIEF SUMMARY

In view of this, an objective of the present invention is to provide a blowing-suction device convenient to use and having a simple structure.

To achieve the objective, the present invention employs a technical solution: a blowing-suction device, comprising: a housing having a first opening in communication with the outside; an air pipe connected to the housing and having a pipe orifice in communication with the outside; and an airflow generation device operably generating airflow; wherein when the blowing-suction device is in a blowing mode, the airflow enters the housing from the first opening and is blown out from the pipe orifice, and when the blowing-suction device is in a suction mode, the airflow enters the air pipe from the pipe orifice and is blown out from the first opening.

Preferably, there is only one air pipe, and when the blowing-suction device is in the blowing mode or the suction mode, the position of the air pipe relatively connected to the housing is unchanged.

Preferably, the pipe orifice is at one end of the air pipe, and the other end of the air pipe is provided with a connection port connected to the housing.

Preferably, the air pipe further comprises a bending portion disposed close to the pipe orifice.

Preferably, the length of the air pipe ranges between 500 mm and 800 mm.

Preferably, the air pipe comprises a first section and a second section which are removable, the first section and the second section being further provided with a fixed structure for mutual fixed connection.

Preferably, the fixed structure comprises an elastic engaging member disposed on one of the first section and the second section and a shape-matching structure disposed on the other one of the first section and the second section for shape-matching the engaging member.

Preferably, the housing further has an interface connected to the air pipe, and when the blowing-suction device is in the blowing mode or the suction mode, the air pipe is connected to the interface.

Preferably, there is only one interface.

Preferably, the interface and the first opening are opened in opposite directions.

Preferably, in the blowing mode, the airflow moves from the first opening to the interface along a straight line, and in the suction mode, the airflow moves from the interface to the first opening along a straight line.

Preferably, in the blowing mode and the suction mode, moving directions of the airflow between the first opening and the interface are opposite.

Preferably, the interface and the first opening are on two opposite sides of the airflow generation device.

Preferably, the airflow generation device comprises a fan and a motor for driving the fan to rotate, and the fan can rotate around a fan axis along different directions, thus generating the airflow moving along different directions.

Preferably, the fan comprises an axial fan, a moving direction of an airflow generated by the axial fan being parallel to the direction of the fan axis.

Preferably, the fan comprises a mixed flow fan capable of generating an airflow that moves along an extending direction of the fan axis.

Preferably, the fan axis of the fan extends to pass through the first opening.

Preferably, the housing further has an interface connected to the air pipe, and the fan axis passes through the interface.

Preferably, projections of the first opening and the pipe orifice on a plane perpendicular to the fan axis of the fan at least partially overlap.

Preferably, projections of the first opening and the interface on a plane perpendicular to the fan axis of the fan at least partially overlap.

Preferably, the airflow generation device comprises a contra-rotating axial flow mechanism and an electric motor driving the contra-rotating axial flow mechanism, the contra-rotating axial flow mechanism being drivably generating an airflow moving along different directions.

Preferably, the contra-rotating axial flow mechanism comprises a first axial fan and a second axial fan, and the motor simultaneously drives the first axial fan and the second axial fan to rotate in opposite directions.

Preferably, the first axial fan and the second axial fan respectively comprise several blades, and the rotating direction of blades of the first axial fan is opposite to that of the blades of the second axial fan.

Preferably, a rotation axis of the first axial fan coincides with a rotation axis of the second axial fan.

Preferably, the motor comprises a first motor connected to the first axial fan and a second motor connected to the second axial fan, the blowing-suction device further comprises a control mechanism controlling the first motor and the second motor, and the control mechanism controls the first motor and the second motor to rotate in opposite directions.

Preferably, the blowing-suction device further comprises a transmission device connected to the first axial fan and the second axial fan, and the transmission device is driven by the motor and makes the first axial fan and the second axial fan rotate in opposite directions.

Preferably, the transmission device comprises a connecting shaft connected to the motor, and a first gear set and a second gear set engaged to the connecting shaft with different rotation directions, the first gear set and the second gear set connected to the first axial fan and the second axial fan respectively.

Preferably, when the blowing-suction device is in the blowing mode, the fan rotates around the fan axis along a clockwise direction; and when the blowing-suction device is in the suction mode, the fan rotates around the fan axis along an anti-clockwise direction.

Preferably, the motor is located between the fan and the first opening, so that the distance from the motor to the first opening is less than the distance from the fan to the first opening.

Preferably, the fan, the motor, and the first opening are arranged sequentially along a straight line.

Preferably, the housing further has an interface connected to the air pipe, and the interface, the fan, the motor, and the first opening are arranged sequentially along a straight line.

Preferably, the blowing-suction device further comprises a crushing mechanism disposed between the axial fan and the pipe orifice, the crushing mechanism being used for crushing an object suctioned from the pipe orifice.

Preferably, the crushing mechanism is driven by the motor to rotate around a rotation axis.

Preferably, the rotation axis coincides with the fan axis.

Preferably, the crushing mechanism includes a cutting blade rotatable around the rotation axis.

Preferably, the cutting blade extends along a longitudinal direction perpendicular to a rotary axial direction, including a mounting portion in a middle portion of the cutting blade, and two operating portions extending longitudinally along opposite directions of the mounting portion, the operating portions including a cutting portion for cutting objects.

Preferably, the mounting portion has a flat-square mounting hole.

Preferably, the two operating portions are disposed symmetrically about the center of the rotation axis.

Preferably, each of the operating portions include an end portion at a longitudinal end and a first side and a second side disposed oppositely between the end portion and the mounting portion, and the cutting portion is located on the first side.

Preferably, the second sides are bent along a longitudinal direction and a transverse direction respectively, so that the second sides curl relative to the first sides.

Preferably, the second side is tilted relative to the first side so that a transverse length from the mounting portion to the end portion gradually narrows.

Preferably, the first side and the second side are arc-shaped, so that the cutting blade is S-shaped.

Preferably, the crushing mechanism includes at least two cutting blades at a distance along an extending direction of the rotation axis.

Preferably, a ratio of a projection area of the cutting blade on a section of the air pipe to a sectional area of the air pipe is less than ½.

Preferably, the crushing mechanism includes a trimming line made of a flexible material.

Preferably, the crushing mechanism includes a cutter disposed around the rotation axis, and a cutting blade eccentrically disposed on the cutter.

Preferably, the crushing mechanism further includes a blade selectively expanding or contracting.

Preferably, the blowing-suction device further comprises a duct guiding the airflow to pass through, the duct comprising a deflector extending along a longitudinal direction, stationary blades distributed circumferentially relative to the deflector, and a guide cover receiving the deflector and the stationary blades.

Preferably, the fan and the crushing mechanism are on opposite sides of the duct respectively.

Preferably, the crushing mechanism, the duct, and the fan are arranged sequentially along a straight line.

Preferably, the duct is on one side of the fan away from the first opening.

Preferably, the blowing-suction device further comprises a drive rod passing through the interior of the deflector and axially connected to the crushing mechanism and the axial fan.

Preferably, the shortest distance between the crushing mechanism and the stationary blades is between 10 mm and 20 mm.

Preferably, the stationary blades are radially located between the deflector and the deflector shield, and the airflow passes between the deflector and the deflector shield.

Preferably, the stationary blades are tilted at an angle relative to the moving direction of the airflow.

Preferably, the angle is 5 degrees to 15 degrees.

Preferably, the number of the stationary blades is 7, and the stationary blades are evenly distributed along a circumferential direction.

Preferably, the blowing-suction device further has an accommodating cavity that accommodates the duct and a moving mechanism that operably moves the duct, the moving mechanism switching the duct between a first position where the airflow is guided to pass and a second position in the accommodating cavity.

Preferably, a damping mechanism is further disposed between the deflector shield and the housing.

Preferably, the damping mechanism is an O ring surrounding the deflector shield.

Preferably, the damping mechanism is made of an elastic rubber material.

Preferably, the deflector shield is peripherally provided with a limit slot in which the damping mechanism is located.

Preferably, the housing is further provided with a limit step for clamping the limit slot.

Preferably, the deflector shield is internally provided with a transmission shaft driven by the motor and an supporting bearing supporting the transmission shaft.

Preferably, the blowing-suction device further comprises a damping mechanism disposed between the supporting bearing and the deflector shield.

Preferably, the damping mechanism is made of an elastic material.

Preferably, the damping mechanism is a rubber cap sleeving the supporting bearing.

Preferably, the damping mechanism is a rubber ring encircling the supporting bearing.

Preferably, an airflow channel for the airflow to move is formed between the first opening and the pipe orifice, and the motor is isolated from the airflow channel.

Preferably, the motor is located in the airflow channel, and the blowing-suction device further includes a motor cover isolating the motor from the airflow channel.

Preferably, the airflow passes between the motor cover and the housing.

Preferably, the blowing-suction device further includes a cooling channel for cooling the motor located in the motor cover, and the cooling channel is disposed separately relative to the airflow channel.

Preferably, the cooling channel includes an air inlet and an air outlet disposed on the housing, and the air inlet and the air outlet are both disposed separately on the first opening.

Preferably, the motor cover is provided with a cooling outlet, and the cooling outlet is aligned with the air outlet, so that cooling air directly passes through the air outlet after being discharged from the cooling outlet.

Preferably, the motor cover further includes several protruding portions protruding outwards, the protruding portions abut against the air outlet on the housing, and the cooling outlet is located on the protruding portions.

Preferably, the motor cover extends along a longitudinal direction, and the protruding portions extend along a radial direction perpendicular to the longitudinal direction.

Preferably, the air outlet and the cooling outlet are arranged along a circumferential direction.

Preferably, the motor cover is further provided with a cooling inlet, a guide channel is further disposed between the cooling inlet and the air inlet, and the guide channel is isolated from the airflow channel.

Preferably, the blowing-suction device further includes a duct for guiding the airflow, the duct including a baffle extending along a longitudinal direction, stationary blades distributed circumferentially relative to the baffle, and a guide cover receiving the baffle and the stationary blades, and the airflow passes through the interior of the guide cover.

Preferably, the guide channel is formed between the guide cover and the housing.

Preferably, the blowing-suction device further includes a cooling fan located in the motor cover, the cooling fan rotating to generate a cooling airflow.

Preferably, the blowing-suction device further includes a transmission interface for the motor shaft to go through, so that the motor shaft is connected to the fan located outside the motor cover.

Preferably, the motor cover includes two half-shells that can be fixedly connected with each other.

Preferably, the motor cover is located on one side of the fan close to the first opening.

Preferably, the motor is located outside the airflow channel.

Preferably, the motor controllably rotates around a motor shaft along clockwise and anticlockwise directions, and when rotating along the clockwise direction, the motor drives the fan to rotate along the first direction; when rotating along the anticlockwise direction, the motor drives the fan to rotate along the second direction.

Preferably, the blowing-suction device further comprises a control switch that controls the rotation direction of the motor, the control switch selectively controlling the motor to rotate along the clockwise or anticlockwise direction.

Preferably, the housing has a handle for gripping, and the control switch is disposed on the handle.

Preferably, the control switch has at least 3 operating positions, in the first operating position, the control switch controls the motor to rotate along the clockwise direction, in the second operating position, the control switch closes rotation of the motor, and in the third operating position, the control switch controls the motor to rotate along the anticlockwise direction.

Preferably, the blowing-suction device further comprises a safety switch linking the control switch, and when the safety switch is triggered, the control switch can rotate the motor.

Preferably, the housing further has an interface connected to the air pipe, and when the air pipe is connected to the interface, the safety switch is triggered.

Compared with the prior art, the present invention has the following beneficial effects: the blowing-suction device implements switching between blowing and suction modes by controlling the fan or airflow generation device to generate airflows in different directions, thus improving operational convenience. Moreover, a same air duct can implement the blowing or suction function in the blowing mode or the suction mode only with one air pipe, so that the structure of the whole blowing-suction device is more simplified.

An objective of the present invention is to provide a blowing-suction device convenient to use and having a simple structure.

To achieve the objective, the present invention employs a technical solution: a blowing-suction device, selectively operating in a blowing mode or a suction mode, comprising: a housing; an air pipe connected to the housing both in a blowing mode and a suction mode; and an airflow generation device operably generating an airflow, in the blowing mode, the airflow being blown out from the air pipe, and in the suction mode, the airflow being suctioned from the air pipe; wherein the housing and the air pipe form an airflow channel, and in the blowing mode and the suction mode, the airflow moves in the airflow channel.

Compared with the prior art, the present invention has the following beneficial effects: whether the blowing-suction device is in a blowing mode or a suction mode, the airflow passes through the same airflow channel, and thus, in the case of switching between blowing and suction modes, changing the airflow channel does not need additional operations. It is more convenient when the user uses it.

An objective of the present invention is to provide a method of assembling a blowing-suction device.

To achieve the objective, the present invention employs a technical solution: a method of assembling a blowing-suction device, comprising: P1: assembling an airflow generation device; P2: assembling the airflow generation device into a housing; and P3: connecting an air pipe to the housing to make the airflow generation device generate an airflow, and when the blowing-suction device is in a blowing mode, make the airflow enter from a first opening of the housing and blown out from a pipe orifice of the air pipe; and when the blowing-suction device is in a suction mode, make the airflow suctioned from the pipe orifice of the air pipe and exhausted from the first opening of the housing.

Preferably, step P1 comprises: S1. assembling a first component, wherein step S1 comprises: S11. mounting a fan to a first end of a transmission mechanism; S12. inserting the transmission mechanism into a duct, and making a second end of the transmission mechanism go through the duct, the second end being disposed opposite to the first end; and S13. mounting the crushing mechanism to the second end of the transmission mechanism; S2. assembling a second component, wherein step S2 comprises: S21. fixedly mounting a motor into one motor cover half-shell; and S22. splicing and fixing the other motor cover half-shell with the motor cover half-shell in S21; and S3. matching a motor shaft in the second component with the fan in the first component.

Preferably, step P2 comprises: S4. mounting the first component and the second component into one housing half-shell; and S5. splicing and fixing the other housing half-shell with the housing half-shell in S4.

Preferably, in step S5, the housing half-shells are fixed through a screw.

Preferably, the fan is matched with the first end of the transmission mechanism through a flat-square structure.

Preferably, in step S11, an supporting bearing is mounted on the transmission mechanism.

Preferably, the supporting bearing is mounted between the first end and the second end of the transmission mechanism.

Preferably, in step S12, the supporting bearing is inserted into the duct and makes the supporting bearing abut against a support step in the duct.

Preferably, in step S12, the number of the supporting bearing is at least two.

Preferably, the crushing mechanism is mounted to the second end of the transmission mechanism through fit of a flat-square structure.

Preferably, in step S13, the second end is further mounted with a limit pin limiting movement of the crushing mechanism.

Preferably, in step S21, the motor shaft of the motor at least partially goes through the motor cover half-shell.

Preferably, in step S22, the motor cover half-shells are fixed through a screw.

Preferably, in step S3, the motor shaft and the fan are axially connected through flat-square fit.

Preferably, in step S3, the motor shaft and the fan are axially connected through spline fit.

Compared with the prior art, the present invention has the following beneficial effects: the method of assembling a blowing-suction device is simpler and more convenient.

An objective of the present invention is to provide a blowing-suction device seal-isolating a cooling channel from an airflow channel.

To achieve the objective, the present invention employs a technical solution: a blowing-suction device, including: a housing having a first opening; an air pipe connected to the housing and having a second opening; a fan rotating and generating an airflow, an airflow channel for the airflow to move being formed between the first opening and the second opening; a motor located in the housing and used for driving the fan; wherein the blowing-suction device further includes a motor cover accommodating the motor, the airflow channel is located outside the motor cover, the blowing-suction device further includes a cooling channel for cooling the motor, and the cooling channel is isolated from the airflow channel.

Preferably, the motor cover includes a transmission interface accommodating the motor shaft to pass through, the blowing-suction device further includes a sealing element disposed on the transmission interface, and the sealing element isolates the airflow channel from the cooling channel.

Preferably, the sealing element is a barrel-shaped structure, one end thereof is connected to the transmission interface, and the opposite end supports a support structure of the motor.

BRIEF DESCRIPTION OF THE DRAWINGS

The objective, technical solutions and beneficial effects of the present invention can be clearly obtained through the following detailed description about specific embodiments that can implement the present invention and with reference to the description about the accompanying drawings.

Like symbols and signs in the drawings and the specification are used for representing like or equivalent elements.

FIG. 20 is a schematic diagram of parallel arrangement of a motor and a fan of the blowing-suction device according to the fourth embodiment of the present invention;

FIG. 41 is a schematic diagram of the blowing-suction device according to a twelfth embodiment of the present invention;

FIG. 42 is a schematic diagram of a contra-rotating axial flow mechanism of the blowing-suction device in FIG. 41;

FIG. 45 is a schematic diagram of the blowing-suction device according to a thirteenth embodiment of the present invention.

DETAILED DESCRIPTION

Preferred embodiments of the present invention are described below in detail with reference to the accompanying drawings, to enable the advantages and features of the present invention to be understood by those skilled in the art more easily, thus more clearly and definitely defining the protection scope of the present invention.

Figure 1:
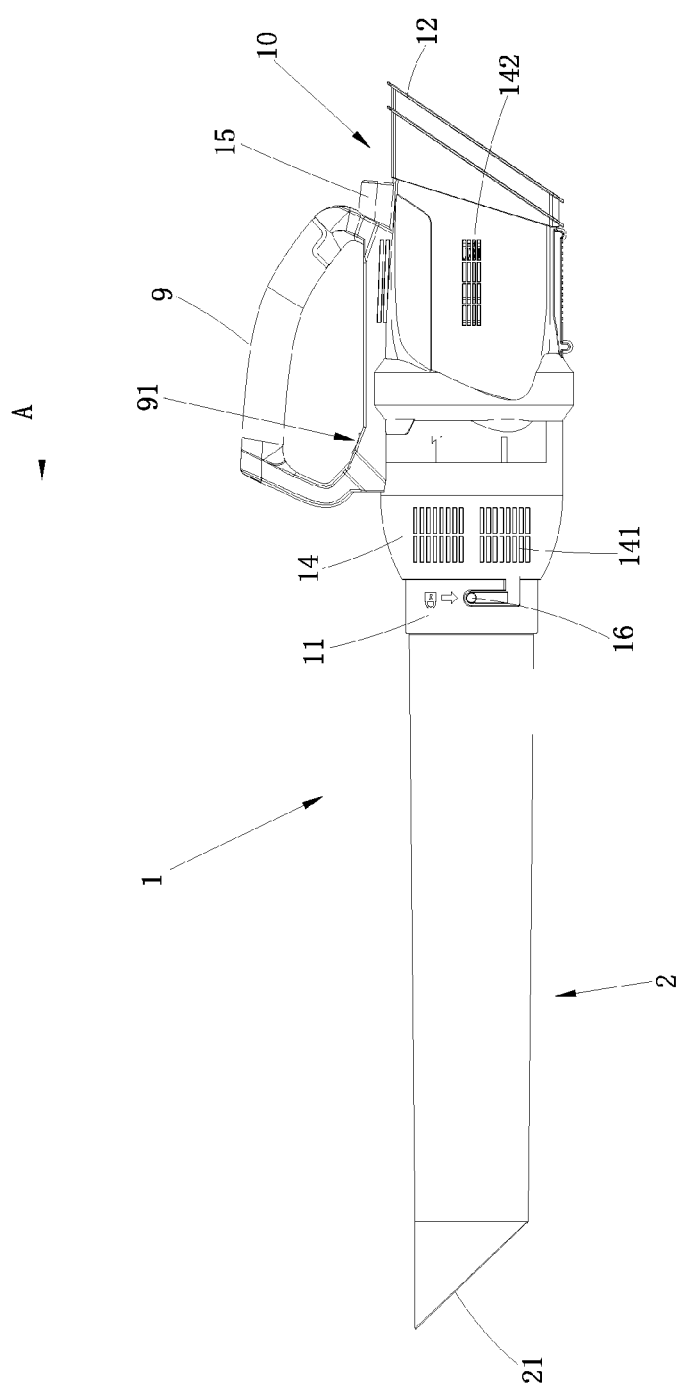
FIG. 1 is an overall schematic diagram of a blowing-suction device according to a first embodiment of the present invention.

FIG. 1 is an overall schematic diagram of a blowing-suction device 1 according to a first embodiment of the present invention. The blowing-suction device 1 is a common garden tool and used for cleaning. The blowing-suction device 1 can concentrate scattered leaves by using a blowing function, and also can suck leaves into a designated garbage collection device by using a suction function, thus achieving the aim of cleaning. Therefore, the blowing-suction device 1 has at least two operating modes. When the blowing-suction device 1 is in a first operating mode, the blowing-suction device 1 performs a blowing function, and when the blowing-suction device 1 is in a second operating mode, the blowing-suction device 1 performs a suction function. Thus, the first operating mode can also be referred to as a blowing mode, and the second operating mode can also be referred to as a suction mode. The blowing-suction device 1 can selectively work in the blowing mode or in the suction mode according to an actual demand of a user. The blowing-suction device 1 wholly extends along a direction shown by an arrow A in FIG. 1, and the direction is defined as longitudinal direction. The blowing-suction device 1 mainly includes a main body 10 and an air pipe 2 connected to the main body 10. The main body 10 includes a housing 14 which substantially extends along a longitudinal direction. The housing 14 is used for wrapping the outside, playing a role of protection. In different embodiments, the housing 14 may be a shell integrally formed, and may also be a whole formed by multiple half shells, and the half shells are fixedly connected by fixing elements such as screws. The housing 14 may include a shell set in the form of one layer or multiple inner and outer layers, and also may include multiple shells protecting respective elements. The air pipe 2 may be connected to the main body 10. The air pipe 2 is internally hollow, for providing air circulation to make the air blown to the outside from the air pipe 2 or suctioned from the outside. In this embodiment, the air pipe 2 is detachably connected to the main body 10. When the blowing-suction device 1 is not needed at ordinary times, the air pipe 2 and the main body 10 can be removed and separated, thus decreasing the overall length dimension of the blowing-suction device 1. When the blowing-suction device 1 is needed, the air pipe 2 and the main body 10 can be connected to perform a corresponding blowing function or suction function. As shown in FIG. 1, the air pipe 2 is located at the longitudinal front end of the main body 10.

Figure 2:
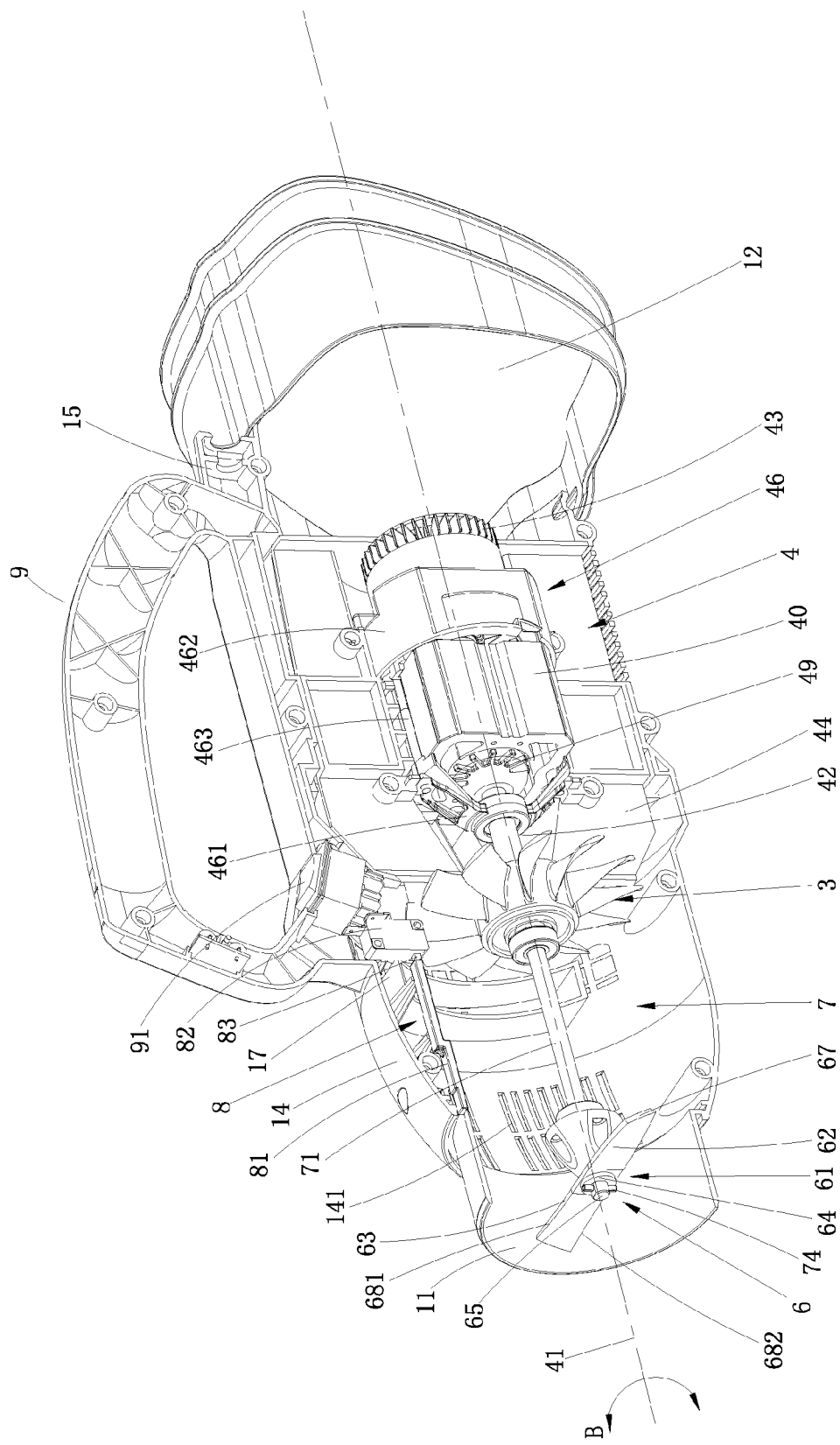
FIG. 2 is a schematic diagram of removal of a duct from the interior of the blowing-suction device in FIG. 1.

The blowing-suction device 1 includes an air generation device. As shown in FIG. 2, the air generation device is received in the housing 14, and operably generates airflow. The airflow generated by the air generation device can move along a direction. In this preferred embodiment, the air generation device controllably generates airflow moving along different directions. For example, the air generation device can generate airflow moving along a longitudinal front end direction, and can also generate airflow moving along a longitudinal rear end direction opposite to the longitudinal front end direction. Angles between different airflow moving directions may be 180 degrees. In other embodiments, the angles between different airflow moving directions may be other angles, such as 60, 90, 120, 150 degrees. As shown in FIG. 2, a common air generation device includes a rotatable fan 3 and a motor 4 for driving the fan 3 to rotate. The motor 4 is used for providing power. According to the power source, the motor 4 may be an air motor, an electric motor driven by electricity, or a gasoline motor using gasoline as fuel. An electric motor includes a common carbon brush motor or a brushless motor. In this embodiment, the motor 4 has a stator 40 and a rotor 49 which can rotate relative to the stator 40. The stator 40 is fixedly support by a support structure 46. The support structure 46 includes a front bracket 461 and a rear bracket 462 separately arranged along the longitudinal direction. The front bracket 461 and the rear bracket 462 respectively support the stator 40. The front bracket 461 and the rear bracket 462 are fixedly connected through a bolt 463. The rotor 49 includes a motor shaft 42 extending along an axis 41. In this embodiment, the axis 41 extends along the longitudinal direction. The rotor 49 drives the motor shaft 42 to make rotating motion around the axis 41. The motor shaft 42 is connected to the fan 3, and drives the fan 3 to rotate correspondingly. Certainly, a transmission mechanism such as a gear can be set between the fan 3 and the motor shaft 42, which can selectively rotate around the axis 41 along a clockwise direction, and also can rotate along an anticlockwise direction, as shown by a double-headed arrow B in FIG. 2. Certainly, in other embodiments, the motor 4 can also rotate only along one direction. In other embodiments, the air generation device is not limited to including a fan 3 and a motor 4, for example, a way of adopting a new power technology such as magnetic force to drive, thus generating airflow.

Figure 3:
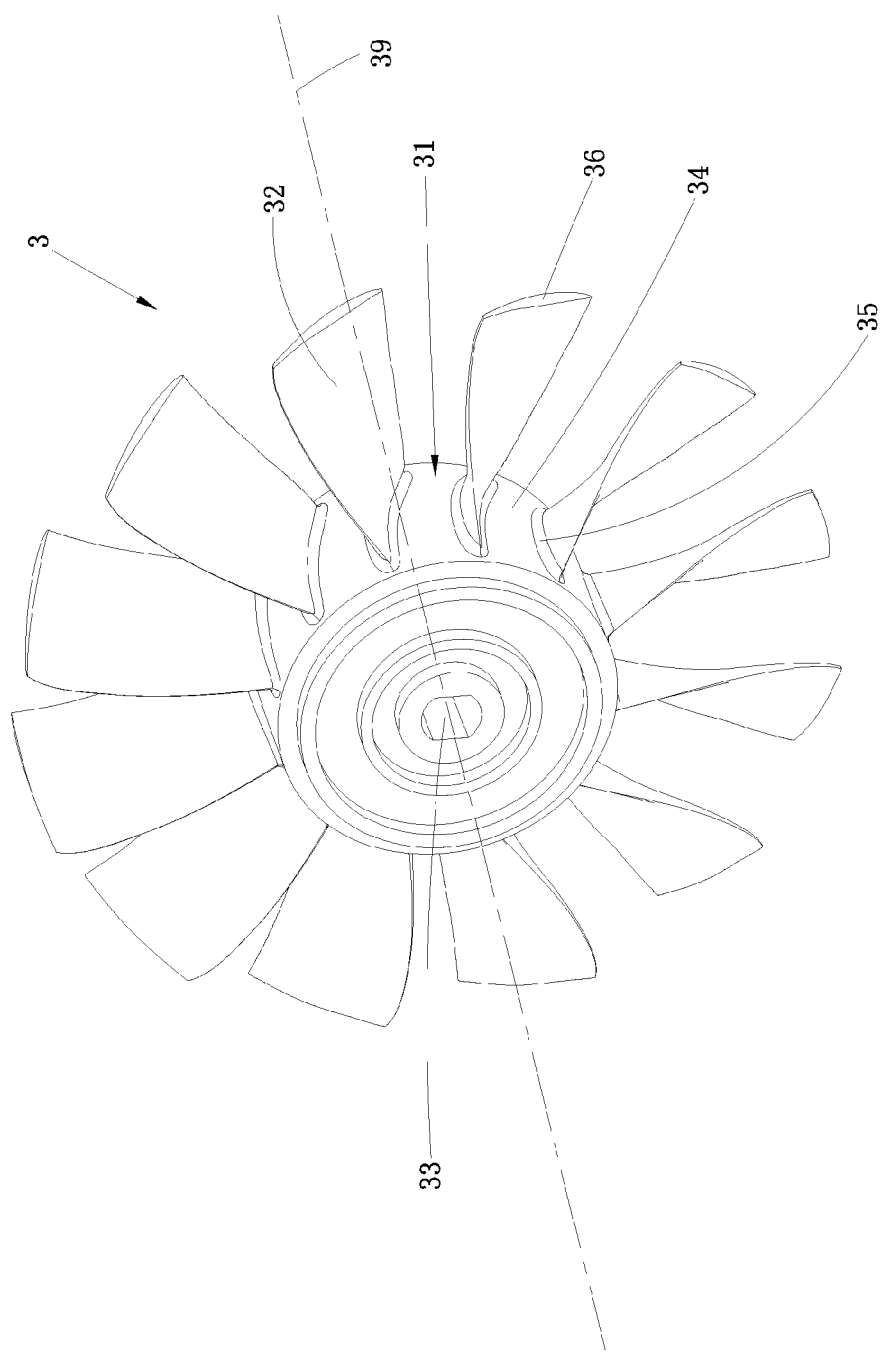
FIG. 3 is a schematic diagram of a fan of the blowing-suction device in FIG. 1.

The fan 3 is rotatably driven to generate airflow. In this embodiment, the fan 3 is connected to the motor shaft 42, and is driven by the motor shaft 42 to rotate correspondingly. The fan 3 and the motor 4 are front-back distributed along the longitudinal direction in the main body 10. The fan 3 is closer to the longitudinal front end. The motor 4 is closer to the longitudinal rear end. The fan 3 at least includes an axial fan. The axial fan can rotate around a fan axis 39, and generate airflow moving in parallel to an extending direction of the fan axis 39. In other embodiments, the fan 3 may be composed of a multi-stage axial fan, and may also be formed by only a one-stage axial fan. In addition, the fan 3 may also be formed by other types of multi-stage fans, but at least one stage therein is an axial fan. In other embodiments, the fan 3 may also be formed by a mixed flow fan, because the mixed flow fan can also generate airflow moving along an extending direction of the fan axis 39. In this embodiment, as shown in FIG. 3, the fan 3 is composed of a one-stage axial fan. The fan 3 includes a hub 31 and several blades 32 set on the hub 31. A connecting hole 33 is disposed on the hub 31 to be connected with the motor shaft 42. The connecting hole 33 is preferably in a flat square shape, and fits a flat square structure on the motor shaft 42, to make the fan 3 and the motor shaft 42 form non-relative rotation. It should be noted that the connecting hole 33 is a through hole with a longitudinal thickness, and the motor shaft 42 is inserted into a part of the connecting hole 33, but is not inserted into the whole connecting hole 33. The purpose of this design is that the connecting hole 33 needs to be connected with other elements. In other embodiments, a corresponding spline structure can also be disposed on the connecting hole 33 and the motor shaft 42, to realize a connection without relative rotation between the fan 3 and the motor 4. The blade 32 extends along a radial direction of the hub 31. One end of the blade 32 is connected to a circumferential surface 34 of the hub 31, the end is a connecting end 35, and the other end relative to the connecting end 35 is a free end 36. The blade 32 may be formed integrally with the hub 31, and may also be fixedly connected to the hub 31. A side edge between the connecting end 35 and the free end 36 is curved to make the whole blade 32 in a substantially curly state. The blade 32 is spirally set along a ligature direction (that is, the radial direction of the fan 3) between the connecting end 35 and the free end 36, to make the blade 32 wholly similar to a spiral ladder structure, and thus the connecting end 35 and the free end 36 are not in one plane. The blades 32 are distributed uniformly along a circumferential direction of the fan 3. In a preferred embodiment, the number of the blade 32 is 12, and certainly it can be 9, 10, 11, 13, 14 and the like. The spiral directions of the several blades 32 all keep the same. The blade 32 rotates together with the hub 31. In this embodiment, the fan axis 39 of the axial fan coincides with the axis 41 of the motor shaft 42. Certainly, in other embodiments, the fan axis 39 of the axial fan is set not to coincide with the axis 41 of the motor shaft 42. In this embodiment, a plane formed by the rotation of the axial fan is substantially perpendicular to the axis 41. The air passes through the plane from one side of the fan 3, and moves to the other side of the fan 3. A starting side of the fan 3 is defined as an upstream region, and the other side is defined as a downstream region. In this embodiment, the upstream region and the downstream region are front-back distributed along the longitudinal direction. The air passes through the fan 3 from the upstream region and moves to the downstream region, so the fan 3 is located in a path through which the air flows. In this embodiment, because the motor 4 and the fan 3 are arranged longitudinally, the motor 4 is also located in a path through which the air flows. In addition, it should be noted that the fan 3 may rotate along different directions, i.e., a first direction and a second direction, so the rotation of the fan 3 generates airflow moving along different directions. It should be specially emphasized that different moving directions of the airflow are relative to the fan 3. Specifically, it refers to that the direction when the airflow passes through a plane formed through rotation of the fan 3 in the first operating mode is different from the direction when the airflow passes through the plane formed through rotation of the fan 3 in the second operating mode. In this embodiment, the fan 3 controllably rotates in a clockwise direction or an anticlockwise direction around the fan axis 39, as shown by the double-headed arrow B in FIG. 2. This is conducted on the basis that the fan 3 always rotates around the same fan axis. In other embodiments, the fan 3 can also rotate around a different fan axis. For example, in a time period, the fan 3 rotates around a first fan axis, so the fan 3 rotates towards the first direction; in another time period, the fan 3 rotates around a second fan axis, and the first fan axis and the second fan axis may be in parallel or at an angle. Here, the angle may be 90 degrees or an acute angle or other angles. In addition, in this embodiment, the motor 4 controls the rotating direction of the fan 3, and the motor 4 can make the fan 3 generate airflow moving towards a direction, and can also make the fan generate airflow moving towards another direction. In this embodiment, because the motor 4 is in power connection with the fan 3, the rotating direction of the fan 3 can be controlled by controlling the rotating direction of the motor 4. Controlling the motor 4 to rotate in a positive direction can make the fan rotate along the first direction, and controlling the motor 4 to rotate in a opposite direction can make the fan 3 rotate along the second direction. In this embodiment, the first direction of the fan 3 is the clockwise direction, and the second direction of the fan 3 is the anticlockwise direction. In other words, the first direction and the second direction are just opposite. In other embodiments, a reverse clutch may also be disposed between the motor 4 and the fan 3. The fan 3 is driven to rotate towards different directions by changing a clutch position or/and status of the reverse clutch. However, no matter which direction the fan 3 rotates towards, the motor 4 can only rotate uniaxially to transfer power.

As shown in FIG. 1 and FIG. 2, the main body 10 is also provided with a handle portion 9 for gripping, and the handle portion 9 is curved. Two ends thereof are respectively connected to the main body 10 to form a gripping space. When the blowing-suction device 1 is operated, the handle portion 9 is located above the blowing-suction device 1. More specifically, the handle portion 9 is located above the motor 4, so that the handle portion 9 and the motor 4 can reach a comparatively ideal weight balance. Preferably, a control switch 91 for controlling the rotating direction of the motor 4 is disposed on the handle portion 9, and the control switch 91 operably controls the motor 4 to rotate along a clockwise direction or an anticlockwise direction. The control switch 91 can also be integrated with other control functions, such as a speed control function, which can adjust the rotating speed of the motor 4 in a stepless or step manner. The speed control function may not be set on the control switch 91, but control is made using another switch. In a preferred embodiment, the control switch 91 has at least three gears, that is, it has at least three operating positions. A first operating position is corresponding to a status that the motor 4 rotates along a clockwise direction or to a status that the fan 3 rotates along the first direction; a second operating position is corresponding to a status that the motor 4 rotates along an anticlockwise direction or to a status that the fan 3 rotates along the second direction; a third operating position is corresponding to a status that the motor 4 stops working or to a status that the fan 3 stops rotating; the third operating position can be located between the first operating position and the second operating position, and can also be located in other positions. The control switch 91 itself is not limited to being on the handle portion 9, and may also be in other positions on the main body 10. In this embodiment, an electrical interface 15 is disposed at the handle end of the blowing-suction device 1, and the electrical interface 15 is fixedly connected with a power line (not shown). The power line is used to match an external power source to provide alternating current power for the blowing-suction device 1. Here, the external power source may be a 220V alternating current power source. In other embodiments, the electrical interface 15 of the main body 10 can further match a removable battery pack, and the battery pack is plugged to a mating portion to provide direct current power for the blowing-suction device 1. The battery pack is pluggable or fixed. In addition, the material of the battery pack is preferably a lithium battery, a nickel cadmium battery and so on, and the voltage of the battery pack may be, but not limited to, 40V or 56V.

Figure 4:
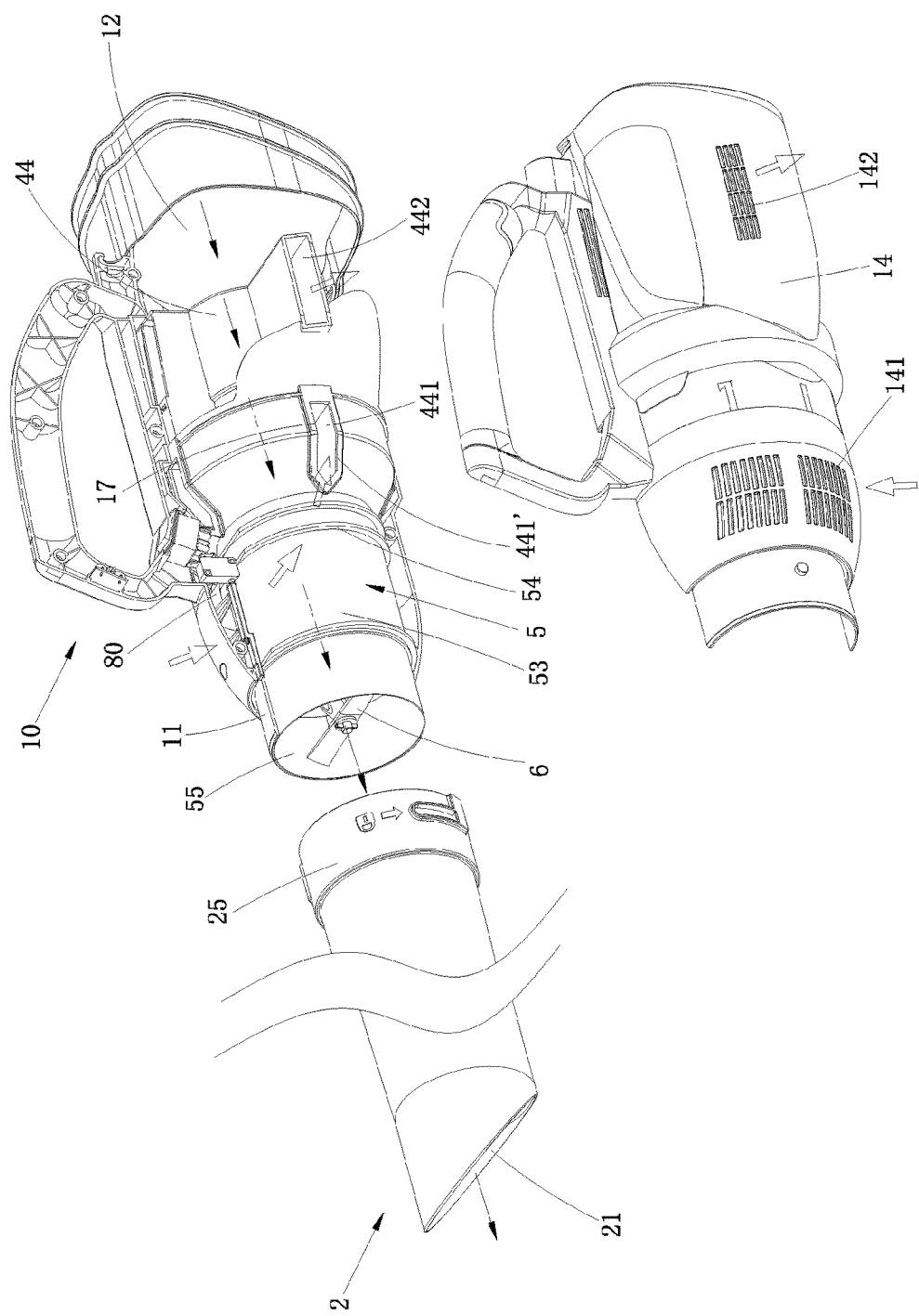
FIG. 4 is a schematic diagram of the blowing-suction device in FIG. 1 in a blowing mode.
Figure 5:
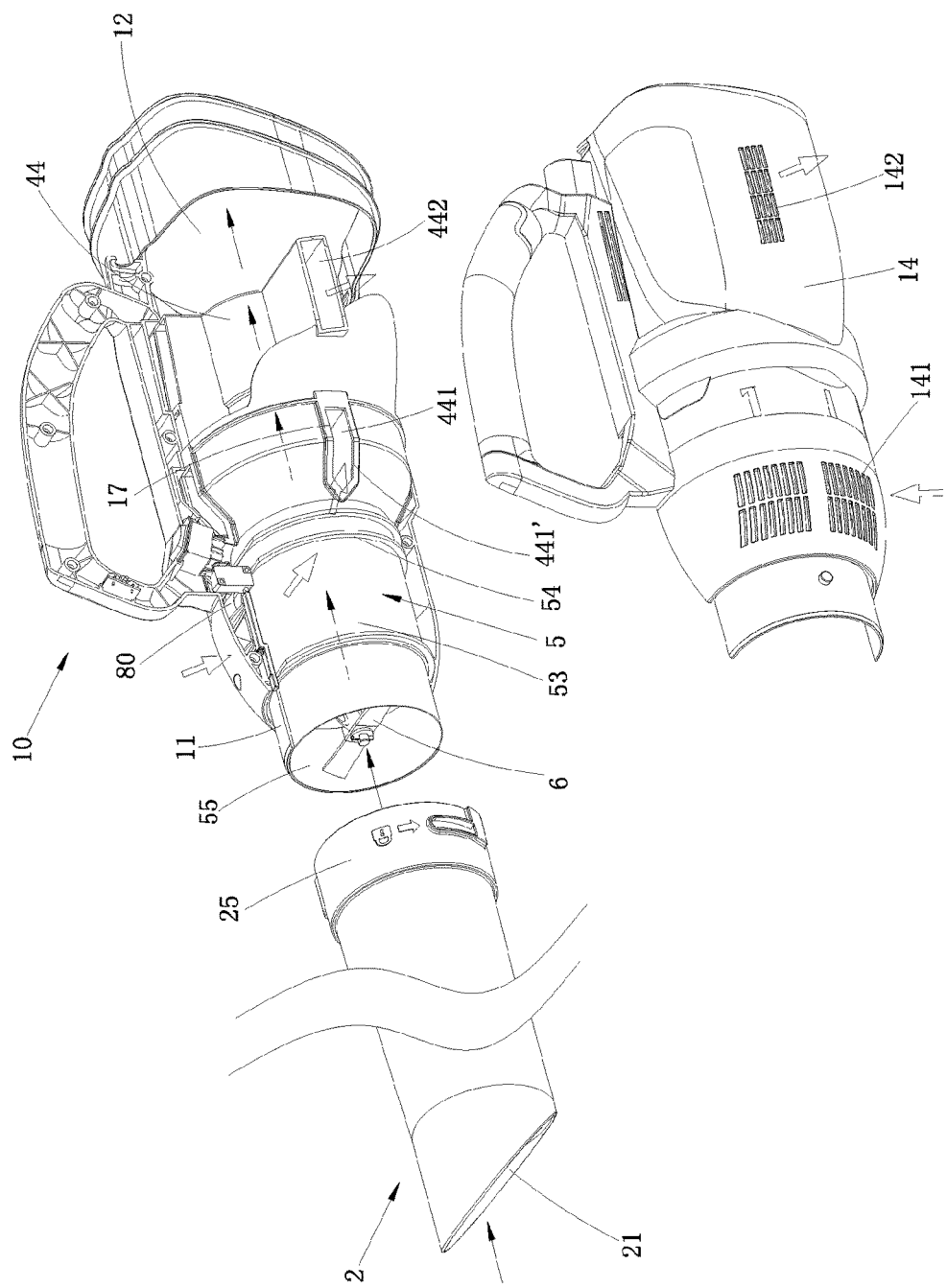
FIG. 5 is a schematic diagram of the blowing-suction device in FIG. 1 in a suction mode.

As shown in FIG. 2, FIG. 4 and FIG. 5, the main body 10 further includes an interface 11 and a first opening 12 arranged longitudinally. The interface 11 and the first opening 12 are both disposed on the housing 14. The interface 11 is used for connecting the air pipe 2, and the first opening 12 is used for connecting the outside, and airflow generated by the air generation device can move through the first opening 12 from the inside of the main body 10 to the outside, or move from the outside to the inside of the main body 10. The interface 11 is located at the longitudinal front end of the main body 10, and the first opening 12 is located at the longitudinal rear end of the main body 10. The outline of the interface 11 is substantially the same as that of the air pipe 2, for connecting the air pipe 2, so as to connect the air pipe 2 with the main body 10. A positioning structure 16 is further disposed on the main body 10 near the interface 11. In this embodiment, the positioning structure 16 is a positioning bump protruding beyond the surface of the main body 10, for positioning and fitting a corresponding slot on the air pipe 2.

Figure 23:
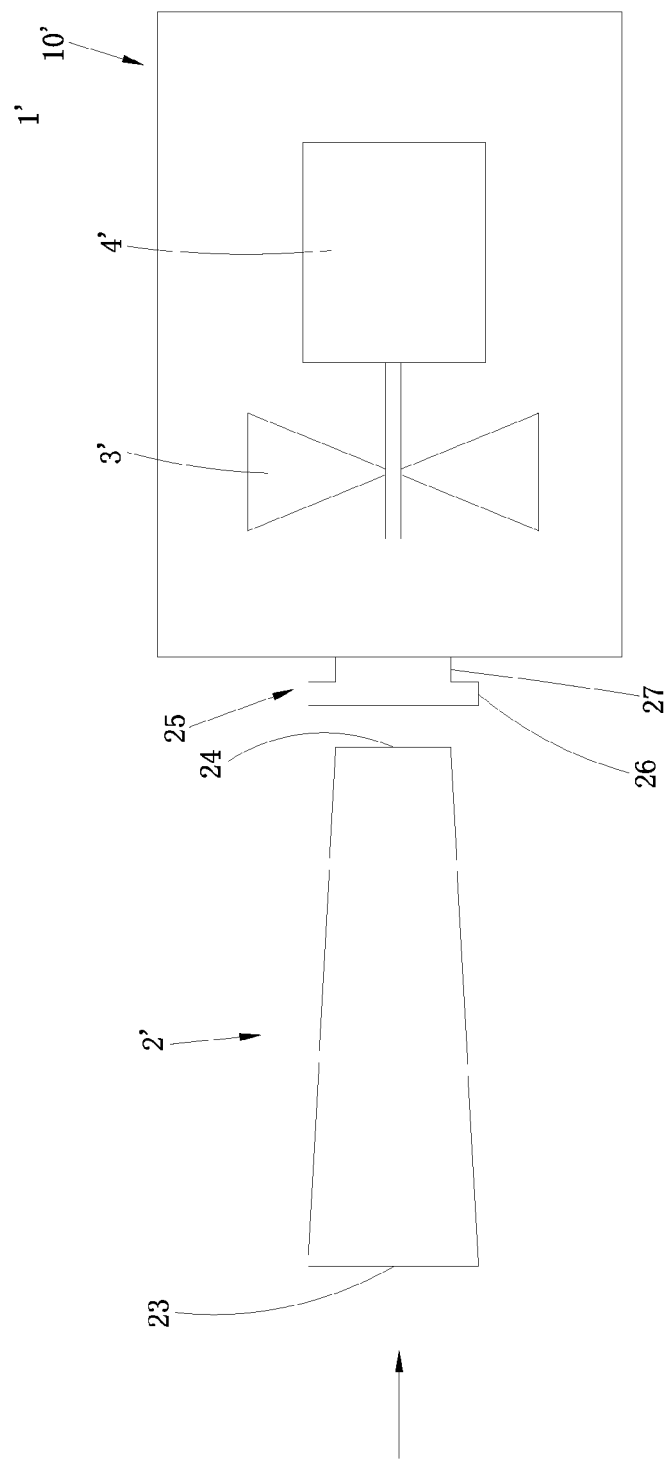
FIG. 23 is a schematic diagram of a blowing-suction device in a suction mode according to a seventh embodiment of the present invention.
Figure 24:
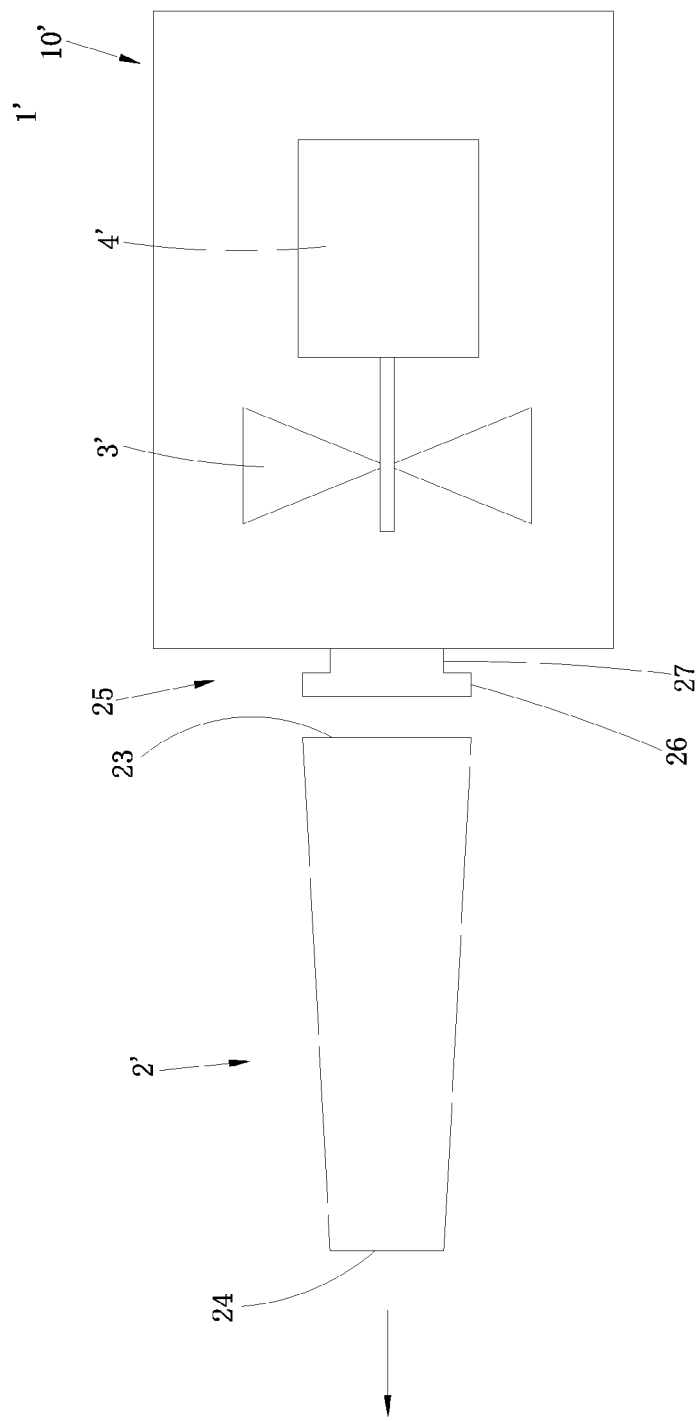
FIG. 24 is a schematic diagram of a blowing-suction device in a blowing mode according to the seventh embodiment of the present invention.

The air pipe 2 is used for circulation of airflow. One end of the air pipe 2 is connected with the interface 11, and the other end opposite to the end has a pipe orifice 21 connecting the outside. In this embodiment, there is one and only one air pipe 2. Certainly, in other embodiments, the air pipe 2 can also be an air pipe with a complete blowing or suction function combined by multiple segments. When the air pipe 2 is needed, each segment can be connected. For example, the air pipe 2 includes a first segment and a second segment which are removable, and a fixing structure for fixed connection is further disposed between the first segment and the second segment. The fixing structure may include an elastic clamping element disposed on the first segment, and a shape-matching element fitting the elastic clamping element disposed in a corresponding position of the second segment. Here, the shape-matching element may be a circular hole, which can just contain insertion and clamping of the elastic clamping element. Certainly, the elastic clamping element can also be disposed on the second segment, and the shape-matching element is disposed on the first segment. When the air pipe 2 is to be used, a whole air pipe can be formed by connecting the first segment and the second segment through the fixing structure and used. When the air pipe 2 is not needed, the air pipe 2 can be disassembled into multiple segments and stored, thus being helpful to reduce the occupied area. In addition, an accessory with an auxiliary function can be additionally mounted on the air pipe 2, for example, an accessory which can change the shape of the pipe orifice 21 may be mounted at the pipe orifice 21 of the air pipe 2, such as an accessory widening the sectional area of the air pipe. For another example, an accessory changing the air-out direction of the air pipe may be mounted at the pipe orifice 21 of the air pipe 2, to make the orientation of the pipe orifice 21 change to some extent, so the pipe orifice can blow to a wider direction, thus improving the working efficiency. In this embodiment, the air pipe is a straight pipe stretching straight, and the pipe diameter dose not vary at the end portion. Certainly, a portion with a variable pipe diameter may be disposed at the end portion of the air pipe or the whole air pipe, to adjust an air-out speed conveniently. For example, a cone-shaped structure with a gradient radius may be disposed on the air pipe 2. In a preferred embodiment, as shown in FIG. 23 and FIG. 24, the air pipe 2 is a cone-shaped pipe on the whole. One end of the air pipe 2 has a larger sectional area, and the other end has a smaller sectional area. For another example, a bending portion can be disposed at the air pipe 2, to make the extending direction of the air pipe 2 turn at the bending portion. In a preferred embodiment, the bending portion is disposed near the pipe orifice 21 of the air pipe 2. In addition, in order to reduce the gripping pressure, a roller supported on the ground is disposed near the bending portion of the air pipe 2. So, when a blowing function is performed, the weight of the air pipe 2 is effectively shunted by the roller support. To meet the requirement of safety regulation, the length range of the air pipe 2 is between 500 mm to 800 mm, preferably about 550 mm. The sectional area range of the air pipe 2 is between 5000 square millimeter to 15000 square millimeter, preferably about 8000 square millimeter. As shown in FIG. 4 and FIG. 5, one end of the air pipe 2 has a connecting port 25 connected to the main body 10, and the other end is provided with a pipe orifice 21 connecting the outside. In the embodiment of FIG. 1, the connecting port 25 of the air pipe 2 connected to the main body 10 has a smaller sectional area, and preferably the diameter is 100 millimeter, while the pipe orifice 21 of the air pipe 2 has a larger sectional area, and preferably the diameter is 110 millimeter. So, the sectional area of the connecting port 25 is smaller than that of the pipe orifice 21. After the air pipe 2 is connected to the main body 10, projections of the pipe orifice 21 of the air pipe 2 and the first opening 12 on a plane perpendicular to the fan axis 39 at least partially coincide. A section formed by the pipe orifice 21 and the horizontal line form an angle. After the handle portion 9 located at the longitudinal rear end of the blowing-suction device 1 is gripped by the user, because a position where the user's hand naturally hangs down is not close to the ground, but is about dozens of centimeters to 1 meter away from the ground, and because there is an angle between the pipe orifice 21 of the air pipe 2 located at longitudinal front end of the blowing-suction device 1 and the horizontal line, the pipe orifice 21 can get closer to the ground. The air pipe 2 can be detachably connected to the interface 11, and also can be always fixedly connected. In this embodiment, whether in a blowing mode or a suction mode, the air pipe 2 is always connected to the main body 10 by the interface 11, without switching between different modes, so the air pipe 2 can be fixedly connected to the main body 10. During transportation or storage, the air pipe 2 and the main body 10 are separated to reduce the occupied volume. The pipe orifice 21 of the air pipe 2 also refers to the second opening, and the second opening is relative to the first opening 12 of the housing 14. So, in this embodiment, the main body 10 has only one interface 11 connected to the air pipe 2.

As shown in FIG. 2, the blowing-suction device 1 further includes a safety mechanism 8. The function of the safety mechanism 8 is to make sure that a starting circuit can be switched on only after the air pipe 2 is connected to the main body 10, and the user operates the control switch 91 to make it work. When the air pipe 2 is not connected to the main body 10, the safety mechanism 8 disconnects the starting circuit, and the motor 4 cannot work normally even if the user operate the control switch 91, thus ensuring the safety. In this embodiment, the safety mechanism 8 is disposed close to the interface 11 of the main body 10. The safety mechanism 8 includes a trigger rod 81 and a trigger switch 82 abutting against the trigger rod 81. A trigger button 83 is disposed on the trigger switch 82, and one end of the trigger rod 81 abuts against the trigger button 83. The other end of the trigger rod 81 is a free end. When the air pipe 2 is mounted to the interface 11, the safety mechanism 8 is triggered. Specifically, the air pipe 2 abuts against the free end of the trigger rod 81, thus squeezing the trigger button 83 through the trigger rod 81, and making the circuit on, so that the control switch 91 is under control. When the air pipe 2 is removed from the interface 11, the trigger button 83 is reset to disconnect the circuit.

Figure 8:
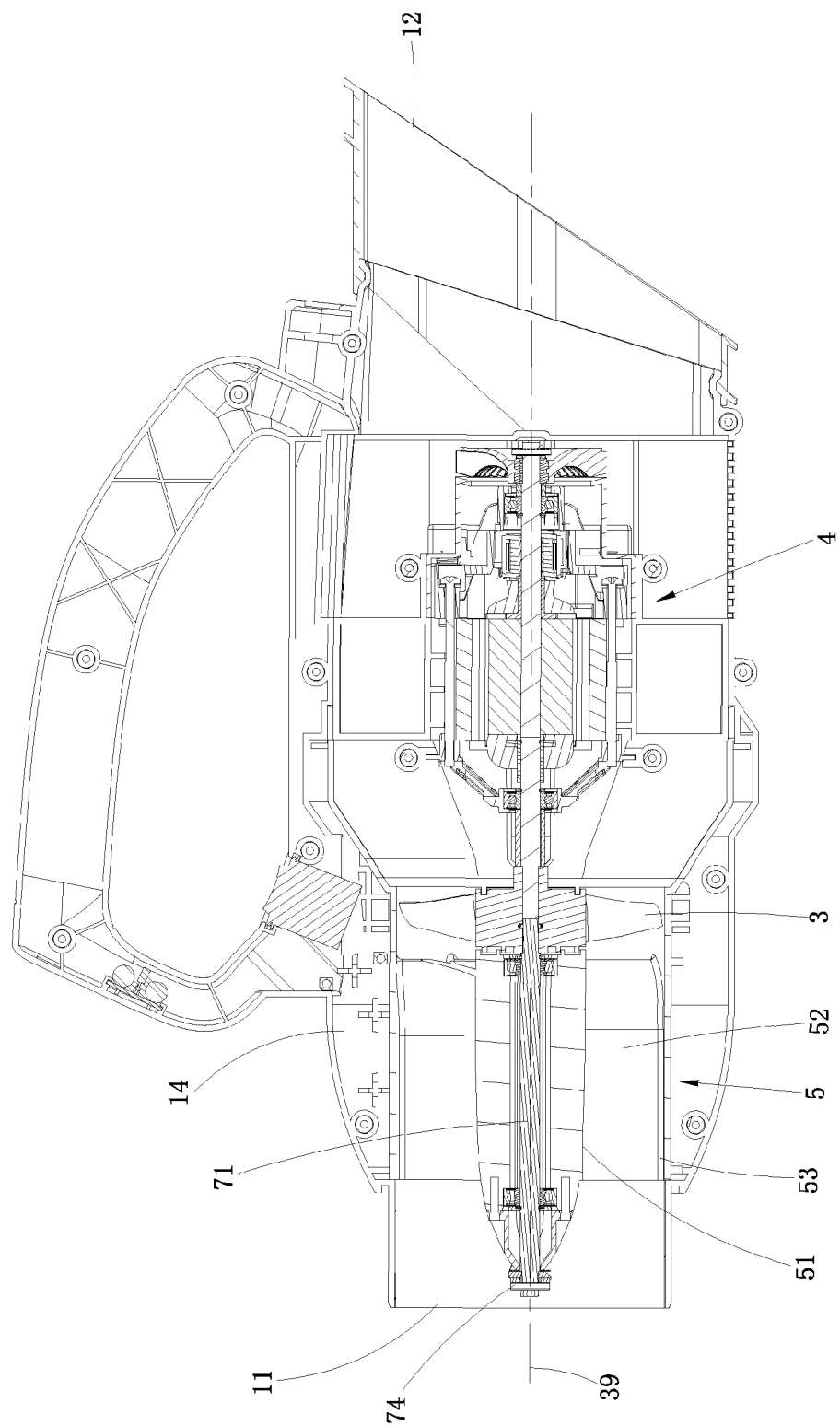
FIG. 8 is a sectional view of the blowing-suction device in FIG. 1.

The first opening 12 is disposed at the longitudinal rear end of the main body 10. In the embodiment shown in FIG. 17, the first opening 12 has a removable safety shield 121. In a preferred embodiment, the safety shield 121 can rotate around a rotating shaft to open or close the first opening 12. In other embodiments, the safety shield 121 may be fixed on the first opening 12 by snapping or plugging. In addition, several cancellous intake structures are disposed on the safety shield 121. Air can pass through the first opening 12 from the intake structures, but particles with a larger volume such as branches and leaves cannot pass, and are blocked out of the safety shield 121. In addition, due to the blocking effect of the safety shield, the user's hand cannot extend into the first opening 12 to be injured. In a preferred embodiment, after the safety shield 121 opens the first opening 12, the first opening 12 can be connected to a collection device. The collection device may be a removable accessory connected to the blowing-suction device 1. The collection device may be a cloth bag, for collecting leaves, branches and other foreign matters suctioned in a suction mode. Certainly, in the embodiment as shown in FIG. 2, the first opening 12 is provided with no safety shield. The first opening 12 has a substantially oval outline. A formed plane is inclined relative to the direction of the axis 41, and an inclined angle is substantially between 30 degrees and 60 degrees, preferably the inclined angle is 45 degrees. The shape of the first opening 12 is substantially oval. As shown in FIG. 8, the fan axis 39 of the fan 3 extends through the first opening 12. In other embodiments, the first opening 12 may not be towards the longitudinal rear end, but a curved portion is disposed at the housing 14, and the first opening 12 is disposed on the curved portion, to make the orientation of the first opening 12 located at the curved portion change, not towards the longitudinal rear end. In one embodiment, the curved portion bends downward, or bends to the ground, to make the first opening 12 disposed downward, that is, a direction deviating from the handle portion 9; in another embodiment, the curved portion can bend upward, to make the first opening 12 disposed upward, that is, a direction close to the handle portion 9.

The interface 11 is disposed at the longitudinal front end of the main body 10. The interface 11 is used for connecting the air pipe 2. Specifically, the interface 11 is connected to the connecting port 25 of the air pipe 2. There is one and only one interface 11 on the main body 10, so, whether in a blowing mode or a suction mode, the air pipe 2 is always connected to the interface 11. The shape of the interface 11 basically matches the connecting port 25 of the air pipe 2. In this embodiment, the interface 11 is disposed towards the longitudinal front end, and the first opening 12 is disposed towards the longitudinal rear end, so the interface 11 and the first opening 12 are opened in opposite directions. In addition, the interface 11 and the first opening 12 are located at two opposite ends of the air generation device. For the main body 10, when the blowing-suction device 1 is in a blowing mode, as shown in FIG. 4, the air enters the main body from the first opening 12, then moves substantially along a straight direction, and leaves the main body 10 from the interface 11 and enters the air pipe 2 correspondingly. In a suction mode, the air enters the main body 10 from the interface 11, then leaves the main body 10 from the first opening 12 along a straight direction. So, in the blowing mode and the suction mode, the moving directions of the airflow generated by the air generation device between the interface 11 and the first opening 12 are opposite. In addition, it should be noted that, in this embodiment, the fan axis 39 of the fan 3 extends through the interface 11. For the fan 3 and the motor 4 of the air generation device, the motor 4 is located between the fan 3 and the first opening 12, such that the distance from the motor 4 to the first opening 12 is less than that from the fan 3 to the first opening 12. In this embodiment, the fan 3, the motor 4 and the first opening 12 are sequentially disposed along a straight line. The interface 11 and the first opening 12 are located, along the extending direction of the fan axis 39, at two ends of the fan 3 respectively. Alternatively, the interface 11 and the first opening 12 are located at two opposite ends of the air generation device. Projections of the interface 11 and the first opening 12 on a plane perpendicular to the fan axis 39 at least partially coincide. Therefore, the interface 11, the fan 3, the motor 4 and the first opening 12 are sequentially disposed along a straight line.

Figure 6:
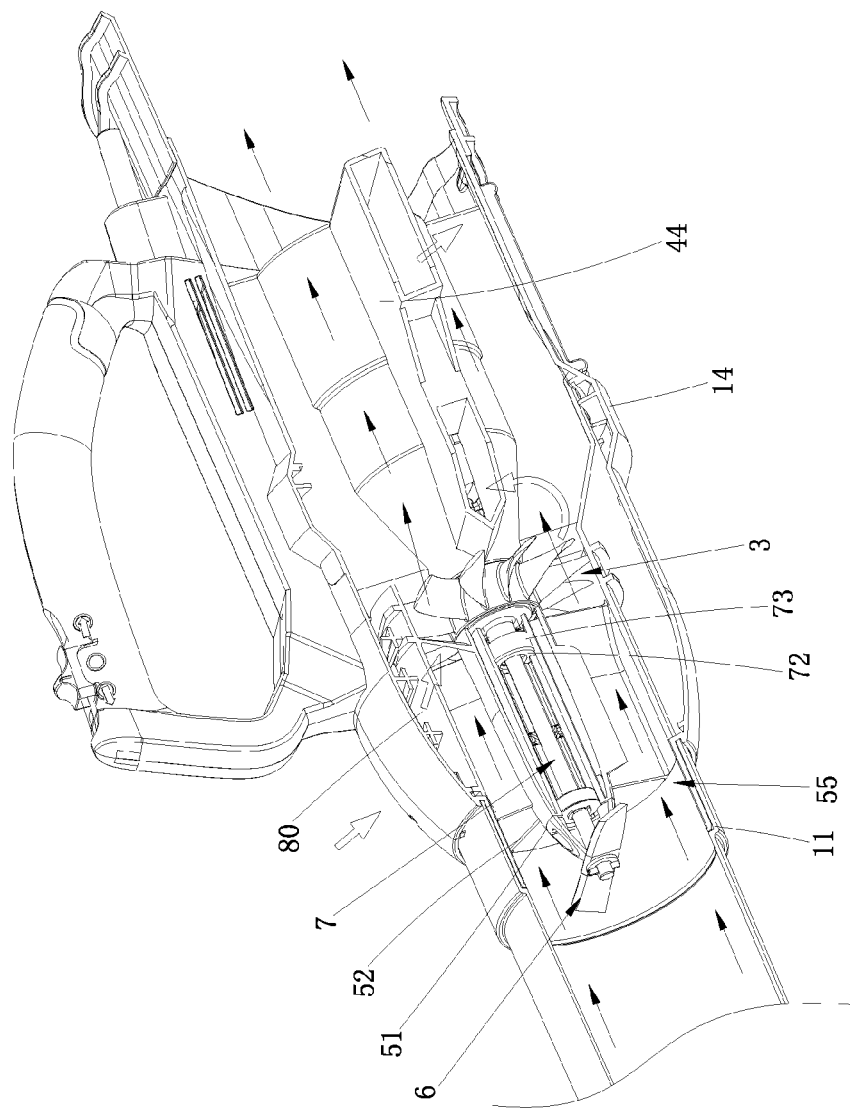
FIG. 6 is a schematic diagram of an airflow channel inside the blowing-suction device in FIG. 1.

After the air pipe 2 is connected to the main body 10, in a blowing mode, the air generation device generates airflow moving along a direction, the air enters the housing 14 from the first opening 12 of the main body 10, then moves in the main body 10 until airflow blown out from the pipe orifice 21 of the air pipe 2 is formed, and the moving direction of the airflow is as shown by a single arrow in FIG. 4. In a suction mode, the air pipe 2 is still connected to the main body 10, and the position where it is connected to the main body 10 does not change. The air generation device generates airflow moving along another direction, the moving direction in this mode is different from the moving direction in the blowing mode, and the air enters the air pipe 2 from the pipe orifice 21. After being suctioned, the airflow moves in the main body 10, and finally forms the airflow discharged from the first opening 12, as shown by a single arrow in FIG. 5. Certainly, it is stressed additionally that in the suction mode, because the pipe orifice 21 faces the ground, leaves, branches, dust and other foreign matters may enter the main body 10 together through the pipe orifice 21 along with the airflow. In the blowing mode, the first opening 12 is away from the ground, so only the air can enter the main body 10. Therefore, as shown in FIG. 6, inside the blowing-suction device 1, an airflow channel 55 for the air to move is formed between the first opening 12 and the pipe orifice 21, in other words, the housing 14 and the air pipe 2 jointly form the airflow channel 55 for the airflow to move. The airflow channel 55 is a passage through which the air moves in the blowing-suction device 1. Under normal circumstances, as the blowing-suction device 1 has different operating modes, i.e., a blowing mode and a suction mode, in consideration of respective performances, the airflow channel varies in different operating modes. However, in the present invention, the airflow channel 55 is a channel jointly used by the airflow in the blowing mode and the suction mode. That is to say, in the blowing mode and the suction mode, the airflow should move in the same airflow channel. Nevertheless, in the two modes, moving directions of the airflow are different. Optimally, moving directions of the airflow in the two modes are opposite. Specifically, in the blowing mode, the airflow moves from the first opening 12 to the pipe orifice 21. In the suction mode, the airflow moves from the pipe orifice 21 to the first opening. In addition, it should be noted that the airflow channel 55 wholly extends along the longitudinal direction, and the airflow channel 55 may also partially curl or bend. In this embodiment, the fan 3 and the motor 4 are both located in the airflow channel 55. In the blowing mode, the fan 3 is driven by the motor 4 to rotate, and the fan 3 rotates around the fan axis 39 along the clockwise direction, and when it is switched to the suction mode, the fan 3 is driven by the motor 4 to rotate, and the fan 3 rotates around the fan axis 39 along the anticlockwise direction. In the embodiment shown in FIG. 20, the fan 3 is still located in the airflow channel 55, but the motor 4 is not located in the airflow channel 55.

Figure 7:
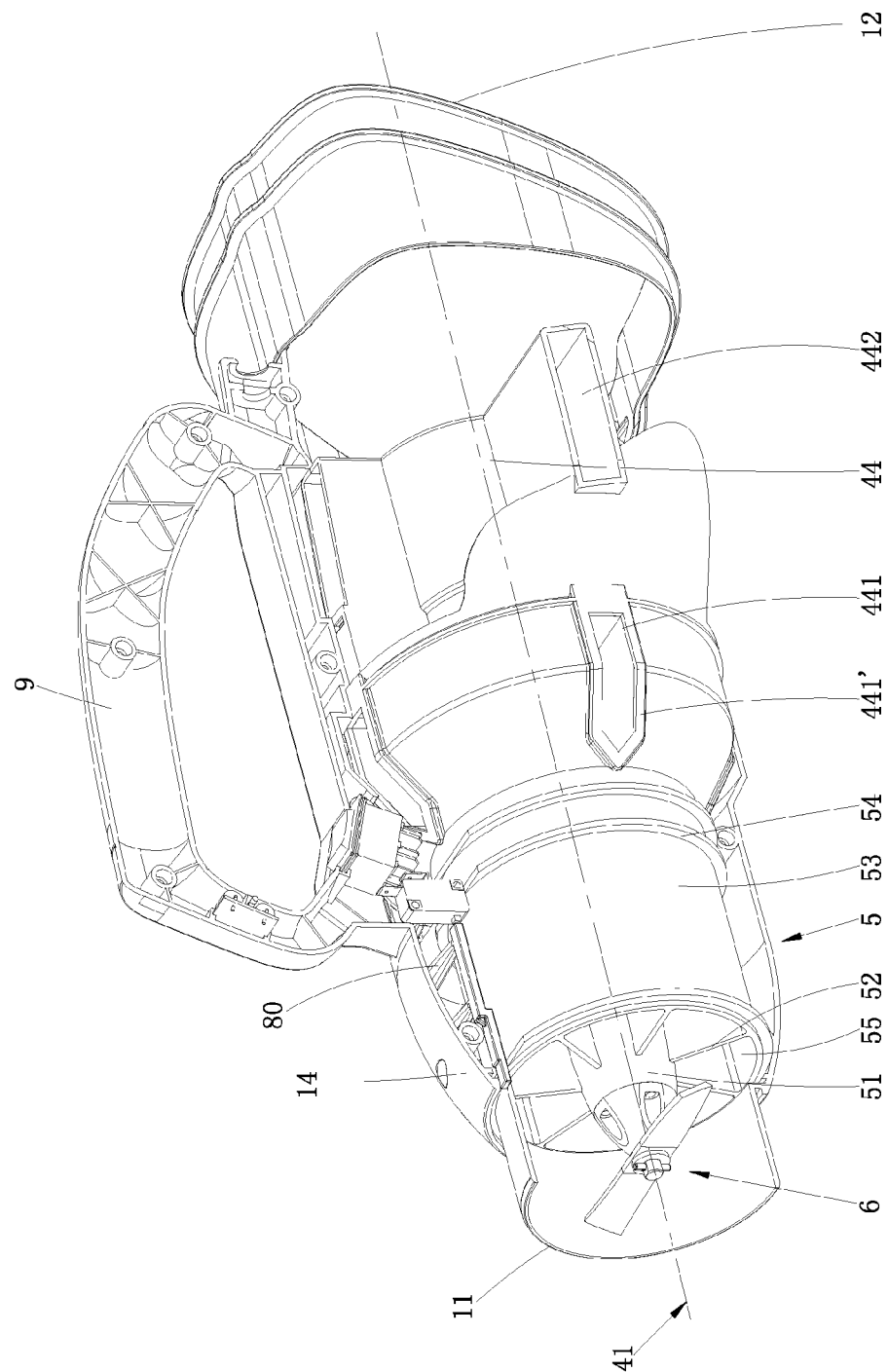
FIG. 7 is a schematic diagram of an internal structure of the blowing-suction device in FIG. 1.
Figure 17:
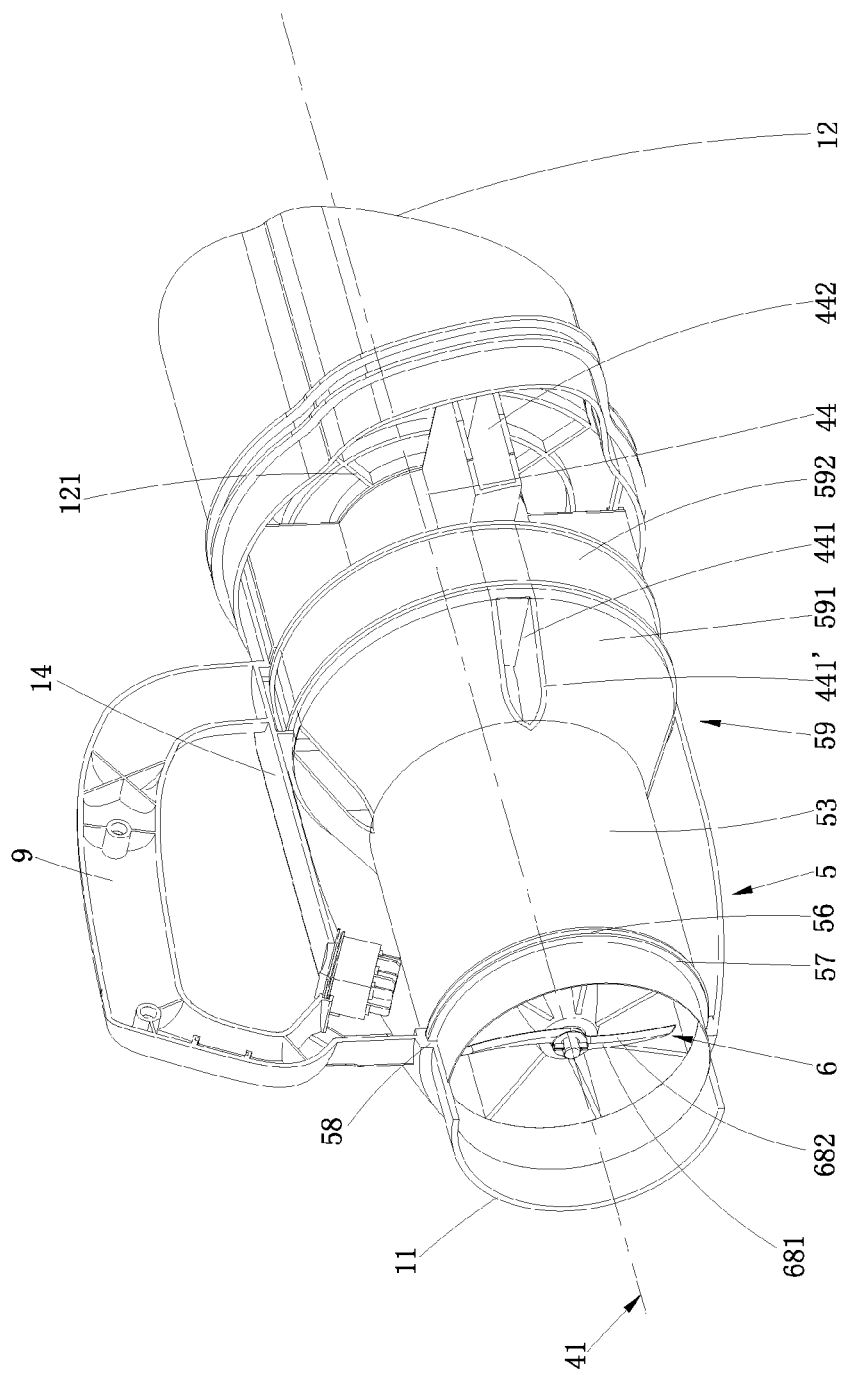
FIG. 17 is a schematic diagram of an internal structure of the blowing-suction device according to the second embodiment of the present invention.

As shown in FIG. 7 and FIG. 8, the blowing-suction device 1 further includes a duct 5. The function of the duct 5 is to guide the airflow generated by the fan 3 to move to the air pipe 2, to make moving directions of the airflow more uniform, enhancing the effect of the whole airflow. In this embodiment, the duct 5 is also located in the airflow channel 55, and is located between the interface 11 and the fan 3. The duct 5 is disposed close to the interface 11 of the main body 10, and the duct 5 is closer to the longitudinal front end than the fan 3, or the duct 5 is located at one side of the fan 3 away from the first opening 12. When the fan 3 generates airflow moving towards the interface 11, the airflow will firstly pass through the duct 5 and then arrive at the interface 11. In other words, the airflow may be first diverted by the duct 5 and then arrive at the interface 11. The duct 5 includes a deflector 51 inside the housing 14, a stationary blade 52 fixedly connecting the deflector 51 and a deflector shield 53 for containing the deflector 51 and the stationary blade 52. The deflector shield 53 is inside the housing 14, and there is a space formed between the deflector shield 53 and the housing 14. In this embodiment, the deflector shield 53 is a cylindrical shell with hollow interior, the interior of the cylindrical shell accommodates the deflector 51 and the stationary blade 52. The airflow generated by the fan 3 passes through the interior of the deflector shield 53. The deflector shield 53 is preferably provided with a raised fixing element 54. The fixing element 54 is disposed at the outer side of the deflector shield 53, and may be fixedly connected to the inner side of the housing 14, thus playing a role of fixing the position of the deflector shield 53. In this embodiment, the fixing element 54 may be a rib raised from the surface, and disposed in a ring shape. In another embodiment as shown in FIG. 17, a damping mechanism 56 is further disposed between the deflector shield 53 and the housing 14, and the damping mechanism 56 is used for reducing vibration transferred from the deflector shield 53 to the housing 14. A positioning slot 57 is disposed on the deflector shield 53, and the damping mechanism 56 is accommodated in the positioning slot 57. A positioning step 58 fitting the positioning slot 57 is disposed at a corresponding position of the inner wall of the housing 14. In this embodiment, the damping mechanism is an elastic ring circularly surrounding the deflector shield 53. Certainly, the damping mechanism 56 may also be an elastic block in a block shape. In addition, it should be noted that the damping mechanism 56 is preferably located at the longitudinal front end of the deflector shield 53. The deflector shield 53 further has a fitting portion 59 disposed at the longitudinal rear end. The fitting portion 59 also extends along the longitudinal direction. The fitting portion 59 has a cone-shaped structure with a gradient radius, the cone-shaped structure is similar to a bell mouth opened towards the rear end, with the effect of partially fitting and warping a motor cover 44 of the motor 4. The motor cover 44 can be partially fixed with the fitting portion 59. The deflector shield 53 extends along the longitudinal direction, and the two longitudinal ends are all not closed. Certainly, in other embodiments, the housing 14 may also serve as the deflector shield 53.

The deflector 51 is located in the deflector shield 53. The deflector 51 wholly extends along the axis 41, and in a cone-shaped structure, and one end is towards the interface 11; the other end is away from the interface 11, and the end away from the interface 11 has an opening. The extending direction of the deflector 51 is the same as that of the deflector shield 53. The deflector 51 has a hollow interior, and other elements may enter the interior of the deflector 51 through the opening. The airflow generated by the fan 3 passes through the outer side of the deflector 51. Therefore, cooperation of the deflector 51 and the deflector shield 53 makes the airflow generated by the fan 3, and pass between the deflector 51 and the deflector shield 53.

Stationary blades 52 are disposed outside the deflector 51. The stationary blades 52 are preferably evenly distributed circumferentially on the deflector 51. The stationary blades 52 are fixedly connected to the deflector 51. Preferably, a plane formed by the stationary blades 52 is disposed to be inclined with the direction of the axis 41 at an angle. The inclined angle may be set between 8 degrees and 15 degrees. The number of the stationary blades 52 is about 7. The duct 5 is located in the airflow channel 55. The space between the deflector shield 53 and the deflector 51 is for passing of the airflow. The stationary blades 52 are disposed between the deflector 51 and the deflector shield 53, and are just located in the airflow channel 55, so the stationary blades 52 can guide the passing airflow. In the blowing mode, the duct 5 is located in the downstream region of the fan 3, the airflow blown from the fan 3 produces a rectifying effect, which can adjust the direction of rotation of part of the airflow, reduce the generation of vortex, make the overall airflow direction more uniform, and improve the blowing effect and efficiency of the airflow. It should be noted that the stationary blades 52 and the blade 32 of the fan 3 are all disposed around the circumferential direction of the axis. To avoid mutual interference in the circumferential direction and ensure that there may not be more overlapping of the blade in any phase of the circumferential direction to generate similar effect of superimposition of resonance, the number of the stationary blade 52 and the number of the blade 32 are set as mutual prime numbers. For example, the number of the stationary blades 52 may be set as 6, and the number of the blade 32 is 11 correspondingly. For another example, the number of the stationary blades 52 is set as 7, and the number of the blade 32 is 12 correspondingly. Therefore, when the fan 3 rotates, at any moment, the number of the blades of the blade 32 and the stationary blade 52 overlapping in a phase is at most one. The duct 5 may be located inside the main body 10 and may be formed integrally with the main body 10. Certainly, the duct 5 may also be a separate element fixedly connected to the main body 10. In other embodiments, the duct 5 may also be disposed in the air pipe 2.

As shown in FIG. 4 and FIG. 5, the blowing-suction device 1 has at least two operating modes: a blowing mode and a suction mode. When the blowing-suction device 1 is in the blowing mode, the fan 3 operably rotates along a first direction, making the generated airflow blown out from the pipe orifice 21 of the air pipe 2. When the blowing-suction device 1 is in the suction mode, the fan 3 operably rotates along a second direction, making the generated airflow suctioned from the pipe orifice 21 of the air pipe 2. It should be noted that, whether in the blowing mode or in the suction mode, the air pipe 2 is always connected to the interface 11 of the main body 10. So, when the blowing-suction device 1 switches from the blowing mode to the suction mode, or from the suction mode to the blowing mode, a user does not need to perform extra operations or movement on the position and fixing of the air pipe 2, but only needs to control the rotating direction of the fan 3. When it switches to the blowing mode, the fan 3 is controlled to rotate along the first direction, and when it switches to the suction mode, the fan 3 is controlled to rotate along the second direction. Further, in the blowing mode, the air enters from the first opening 12 and is blown out from the pipe orifice 21. In the suction mode, the air is suctioned from the pipe orifice 21 and discharged from the first opening 12. Whether in the blowing mode or in the suction mode, paths through which the air passes are all located between the first opening 12 and the pipe orifice 21, and the paths through which the air moves are the same, but only directions of movement of the air are different in the blowing mode and in the suction mode. Therefore, both in the blowing mode and in the suction mode, the blowing-suction devices 1 uses the airflow channel 55. Therefore, the structure of the airflow channel of the blowing-suction device 1 is further simplified, and there is no need to additionally dispose a second airflow channel.

Figure 29:
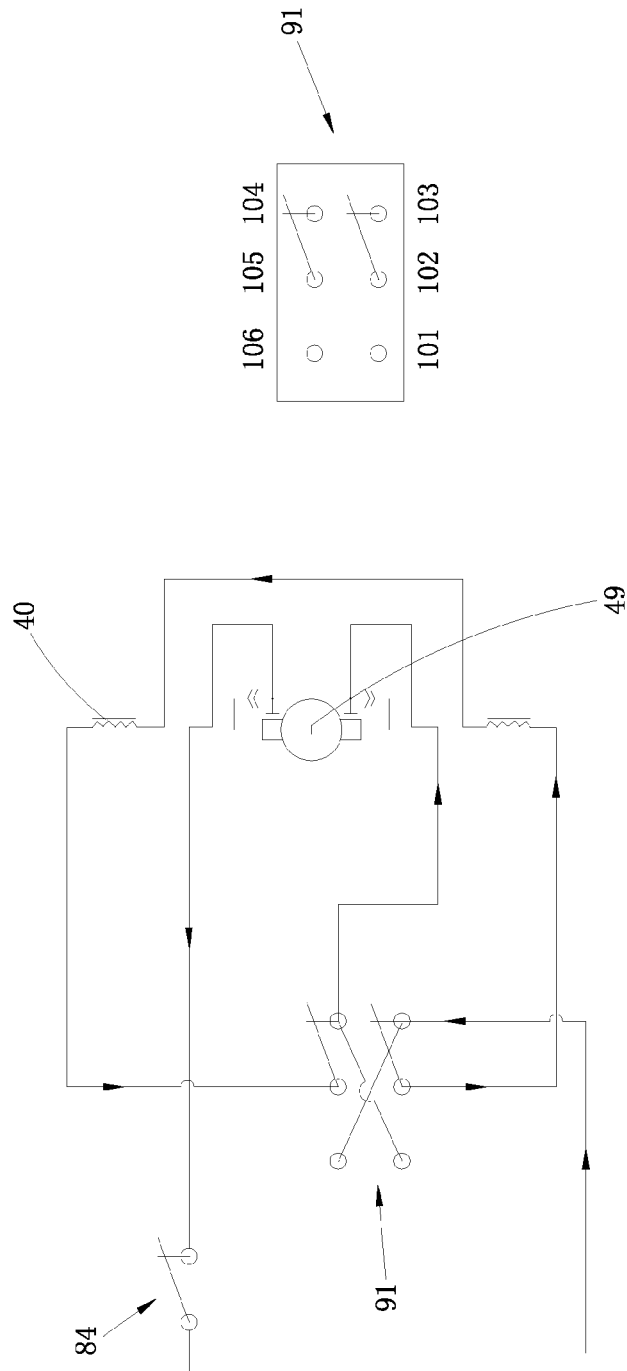
FIG. 29 is a schematic circuit diagram of a control switch of the blowing-suction device in a first operating position in FIG. 1.
Figure 30:
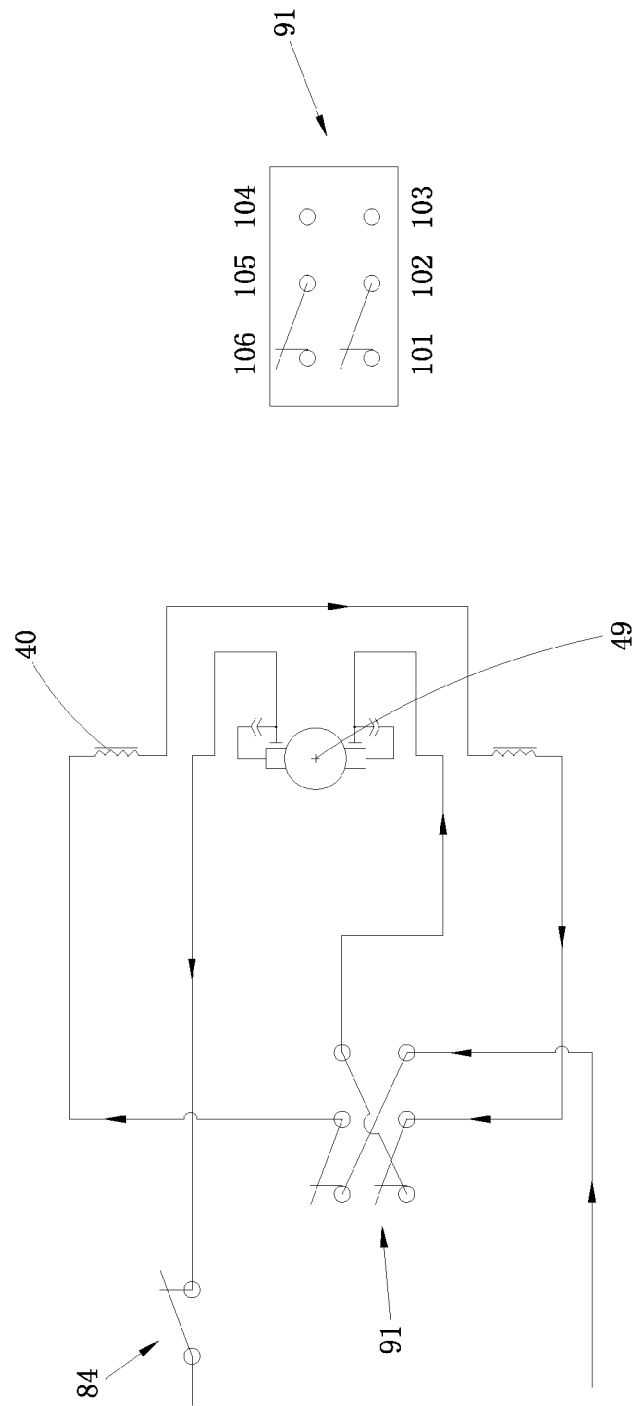
FIG. 30 is a schematic circuit diagram of a control switch of the blowing-suction device in a second operating position in FIG. 1.
Figure 31:
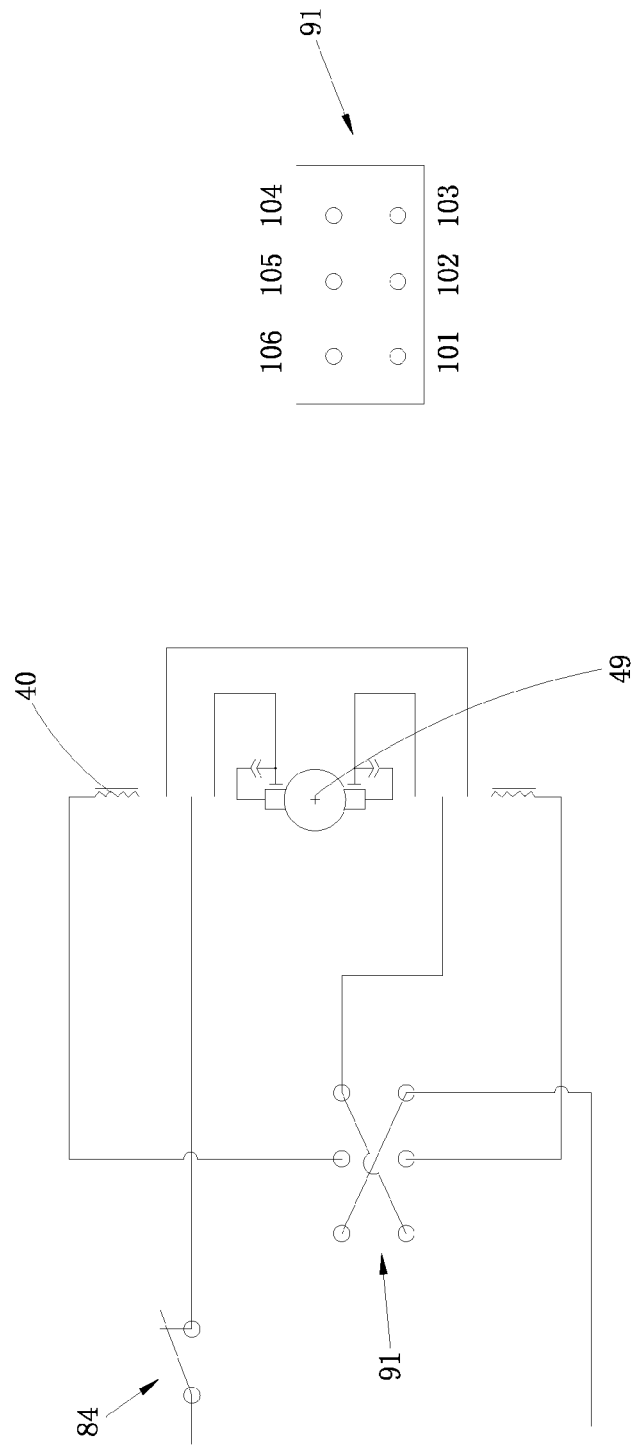
FIG. 31 is a circuit schematic diagram of a control switch of the blowing-suction device in a third operating position in FIG. 1.

In addition, because the blowing-suction device 1 has at least two different operating modes, how to switch the operating mode conveniently has to be taken into consideration. Therefore, the blowing-suction device 1 has a blowing-suction mode switch, a user can conduct a mode switching by controlling the blowing-suction mode switch, for example, switch from the first operating mode to the second operating mode, or switch from the second operating mode to the first operating mode. In the present invention, the air pipe 2 does not need to move or change the position when the mode is switched, so the blowing-suction mode switch may be a control switch 91. When the control switch 91 is operated to switch to a position where the fan 3 rotates along the first direction, the blowing-suction device 1 is in the blowing mode. When the control switch 91 is operated to switch to a position where the fan 3 rotates along the second direction, the blowing-suction device 1 is in the suction mode. The advantage brought is that a user operation when the operating mode is switched is quite convenient, and the air pipe 2 does not need to be changed or moved. When the blowing-suction device 1 is not needed, the air pipe 2 and the main body 10 can be dismounted, to facilitate storage. When the blowing-suction device 1 is needed, whether in a blowing mode or in a suction mode, it is only necessary to mount the air pipe 2 to the main body 10, and the control switch 91 is operated, making the motor 4 start and rotate along the corresponding direction. Specifically, when the blowing-suction device 1 is in the blowing mode, the control switch 91 is operated to move to the first operating position, and when the blowing-suction device 1 is in the suction mode, the control switch 91 is operated to move to the second operating position. Even if mode switching is needed, the air pipe 2 does not need to be frequently dismounted and mounted. In addition, because the fan 3 of the blowing-suction device 1 includes an axial fan, and the axial fan can generate a higher air speed, compared with the traditional centrifugal fan, the blowing efficiency is greatly improved on the premise that the dimension is not increased. Because the motor 4 is connected to the fan 3, when the motor 4 rotates along the clockwise direction, the motor 4 will drive the fan 3 to rotate along the clockwise direction; and when the motor 4 rotates along the anticlockwise direction, the motor 4 will drive the fan 3 to rotate along the anticlockwise direction. Therefore, in this embodiment, the control switch 91 indirectly realizes the control over the fan 3 in a manner of controlling the rotating direction of the motor 4. As shown in FIG. 29 to FIG. 31, the motor 4 includes a stator 40 and a rotor 49 which can rotate relative to the stator 40. The stator 40 and the rotor 49 are respectively wound with coils and connected to the circuit, relative rotation of the stator 40 and the rotor 49 can be realized by using the current generated after the circuit is on according to the principle of electromagnetic induction. The control switch 91 is used for controlling the on-off of the circuit. The control switch 91 has multiple gears, or has multiple operating positions. It operably moves between the gears or operating positions. In the embodiment as shown in FIG. 29, the control switch 91 has a pin 102 and a pin 105, when the control switch 91 is operably moved to the first operating position, the pin 104 and the pin 105 are on while the pin 102 and the pin 103 are on, at this moment, according to the circuit which is on, a current direction of the circuit where the stator 40 is located is the same as that of the circuit where the rotor 49 is located, under the effect of the principle of electromagnetic induction, the rotor 49 rotates along the clockwise direction relative to the stator 40, then the motor 4 wholly rotates along the clockwise direction, the corresponding fan 3 also rotates along the clockwise direction, and at this moment the blowing-suction device 1 is in the blowing mode. When the mode of the blowing-suction device 1 needs to be switched, it is only necessary to operate the control switch 91 to move to the second operating position, as shown in FIG. 30, the pin 6 and the pin 5 are on while the pin 2 and the pin 1 are on, and at this moment, the current direction of the circuit where the stator 40 is located changes, but the current direction of the circuit where the rotor 49 is located does not change. So, the rotor 49 rotates along the anticlockwise direction relative to the stator 40, the motor 4 and the fan 3 both rotate along the anticlockwise direction correspondingly, and at this moment, the blowing-suction device 1 is in the suction mode. Certainly, those skilled in the art can easily think of that when the control switch 91 moves to a different operating position, the current passing through the stator 40 does not change, but the current direction of the rotor 49 changes. In brief, when the control switch 91 moves to a different position, the current direction of one of the rotor 49 and the stator 40 changes. Therefore, the method of controlling the blowing-suction device to switch blowing and suction modes is operating the control switch 91 to move from the first operating position where the axial fan rotates along the first direction to the second operating position where the axial fan rotates along the second direction. In the switching process, the position where the air pipe 2 is connected to the main body 10 keeps the same. In a preferred embodiment, the control switch 91 may further have a third operating position different from the first and second operating positions. In this position, as shown in FIG. 31, the pin 102 and the pin 105 are not connected with other pins, so the circuit connecting the stator 40 and the rotor 49 is not on, in other words, the motor 4 cannot rotate, but is in a stop status. Therefore, the control switch 91 can control the motor 4 to switch among three statuses, which are respectively a forward rotation status, a stop status and a reverse rotation status. In addition, as shown in FIG. 29 to FIG. 31, a safety switch 84 linked with the safety mechanism 8 can be further disposed in the circuit where the stator 40 or/and the rotor 49 is/are located. When the safety switch 84 is not triggered, no matter which operating position the control switch 91 is in, the whole circuit is in an off status, and the motor 4 will never be started. The control switch 91 can play the role of controlling the circuit only when the safety switch 84 is triggered.

In addition, as shown in FIG. 2, FIG. 6 and FIG. 7, the blowing-suction device 1 further includes a crushing mechanism 6. Because the fan 3 or/and the motor 4 is/are located in the airflow channel 55, in the suction mode, branches, leaves and other objects with a larger volume may enter the main body 10 from the pipe orifice 21 together with the air, and may cause damage to the fan 3 or/and the motor 4, thus affecting the service life of the blowing-suction device 1. Therefore, the purpose of disposing the crushing mechanism 6 is to crush the suctioned objects with a larger volume, to change them into smaller and lighter objects to pass through the fan 3, thus reducing the damage to the fan 3 caused by high speed impact on the fan 3 by heavier objects. Therefore, the crushing mechanism 6 is disposed in a position between the fan 3 and the pipe orifice 21. In this embodiment, the crushing mechanism 6 is disposed in a position close to the interface 11 in the main body 10, so that an object to be crushed, after entering the main body 10 from the pipe orifice 21 in the suction mode, first passes through the crushing mechanism 6 and then passes through the fan 3. In this embodiment, the duct 5 is located between the crushing mechanism 6 and the fan 3, and the fan 3 and the crushing mechanism 6 are located at respective opposite sides of the duct 5, i.e., the crushing mechanism 6 is closer to the pipe orifice 21 than the duct 5. The crushing mechanism 6, the duct 5 and the fan 3 are sequentially arranged along a straight line. The duct 5 is located at one side of the fan 3 away from the first opening 12. The crushing mechanism 6 may be driven to rotate around a rotation axis to produce a crushing effect. In this embodiment, the crushing mechanism 6 may be driven by the motor 4 to rotate. The blowing-suction device 1 includes a transmission mechanism 7 connecting the fan 3 and the crushing mechanism 6. The transmission mechanism 7 makes the crushing mechanism 6 make rotating motion. In this embodiment, the rotation axes of the crushing mechanism 6 and the fan 3 coincide. Certainly, the rotation axis of the crushing mechanism 6 can be parallel to or at an acute angle with the rotation axis of the fan 3. Because the fan 3 in this embodiment is also driven by the motor 4, the motor 4 can simultaneously drive the fan 3 and the crushing mechanism 6 to rotate together. In a preferred embodiment, the fan 3 and the crushing mechanism 6 can rotate synchronously. When the fan 3 rotates along the first direction, the crushing mechanism 6 also rotates along the first direction; when the fan 3 rotates along the second direction, the crushing mechanism 6 also rotates along the second direction. When the crushing mechanism 6 rotates, high speed rotation of the crushing mechanism 6 forms a cutting plane substantially perpendicular to the axis 41, which would not influence air circulation in the blowing mode. In the suction mode, the air and the object to be crushed may pass through the cutting plane, wherein the air can pass through the cutting plane without loss, but the object to be crushed may be cut into small objects when passing through the cutting plane, and then passes through the fan 3, thus achieving the purpose of protecting the fan 3 and being conducive to collection. As shown in FIG. 2 and FIG. 8, the transmission mechanism 7 is a transmission shaft 71 extending along the longitudinal direction. The transmission shaft 71 may rotate around the axis 41, and certainly, through several eccentric structures, the transmission shaft 71 may not rotate around the axis 41. One end of the transmission shaft 71 is connected to the fan 3, and the other end is connected to the crushing mechanism 6, so that the fan 3 and the crushing mechanism 6 move synchronously. The end of the transmission shaft 71 connected to the fan 3 is connected to the connecting hole 33 of the fan 3 through a flat-square structure or a spline and other structures. Because the motor shaft 42 and the transmission shaft 71 are located on two sides of the fan 3 respectively, the motor shaft 42 of the motor 4 is connected to the fan 3 from one side of the connecting hole 33, and the transmission shaft 71 connected to the crushing mechanism 6 is connected to the fan 3 from the other side of the connecting hole 33. In this embodiment, the transmission shaft 71 is not connected to the motor shaft 42 directly, but the linked motion between them is realized through the transfer of the fan 3. After the crushing mechanism 6 is mounted to the transmission shaft 71, the end of the transmission shaft 71 is further provided with an anti-slipping structure 74, and the function of the anti-slipping structure 74 is to protect the crushing mechanism 6 from axial movement relative to the transmission shaft 71. In this embodiment, the anti-slipping structure 74 is a latch which can be plugged into a jack on the transmission shaft 71. In addition, the anti-slipping structure 74 further includes a spacer and so on. Because the motor 4 and the crushing mechanism 6 are located on two opposite sides of the duct 5, the transmission shaft 71 may pass through the duct 5, to connect the motor 4 and the crushing mechanism 6. In this embodiment, the transmission shaft 71 passes through the hollow interior of the deflector 51 of the duct 5 along the axial direction. As shown in FIG. 6, a supporting bearing 72 for supporting the transmission shaft 71 is further disposed between the transmission shaft 71 and the deflector 51. The transmission shaft 71 may be support rotatably relative to the supporting bearing 72. The number of the supporting bearing 72 may be one or more. In this embodiment, the number of the supporting bearing 72 is two, which are disposed at a distance along the extending direction of the transmission shaft 71. However, in other embodiments, because the transmission mechanism 7 selectively disconnects the transmission transferred from the fan 3 to the crushing mechanism 6, when the fan 3 rotates, the crushing mechanism 6 may not rotate. In this embodiment, the transmission mechanism 7 includes a clutch separated from and reunited with the motor shaft 42. When the clutch is selectively in power connection with the motor shaft 42, the fan 3 and the crushing mechanism 6 rotate together, and when the clutch selectively breaks the power connection from the motor shaft 42, the fan 3 can still rotate, but the crushing mechanism 6 does not rotate.

In the embodiment as shown in FIG. 2 and FIG. 7, the fan 3 and the duct 5 are located on the same side of the motor 4, in other words, the motor 4 and the duct 5 are located on two sides of the fan 3 respectively. In this embodiment, one end of the transmission shaft 71 is not directly connected to the motor shaft 42, but connected to the fan 3. In this embodiment, the connecting hole 33 of the fan 3 is a flat-square through hole. The through hole is connected to the transmission shaft 71 and the motor shaft 42 respectively in a flat-square form. Although the transmission shaft 71 and the motor shaft 42 are not directly connected, they can achieve synchronous motion by matching with the fan 3 respectively. Certainly, a spline structure may also be disposed in the connecting hole 33, and the transmission shaft 71 and the motor shaft 42 are connected to the fan 3 through respective splines. In other embodiments, the transmission shaft 71 and the motor shaft 42 may also be directly matched through common transmission forms such as sleeving, a planetary gear, and an external gear. As the fan 3 is located at a longitudinal rear side of the duct 5 and the crushing mechanism 6 is located at a longitudinal front side of the duct 5, the transmission shaft 71 passes through the deflector 51 of the duct 5 and connects the crushing mechanism 6. Certainly, in other embodiments, the motor 4 may also be located in the duct 5, that is, the motor 4 and the duct 5 are located on the same side of the fan 3. Besides, as the crushing mechanism 6 is closer to the longitudinal front end than the duct 5, in order not to reduce the amount of air entering the duct 5, the crushing mechanism 6 has to be at a longitudinal distance from the duct 5. The shortest distance between the crushing mechanism 6 and the stationary blade 52 of the duct 5 is 0.5 mm to 50 mm. More preferably, the shortest distance between the crushing mechanism 6 and the stationary blade 52 of the duct 5 is 10 mm to 20 mm. Further, the shortest distance is 12 mm or 13 mm.

Figure 12:
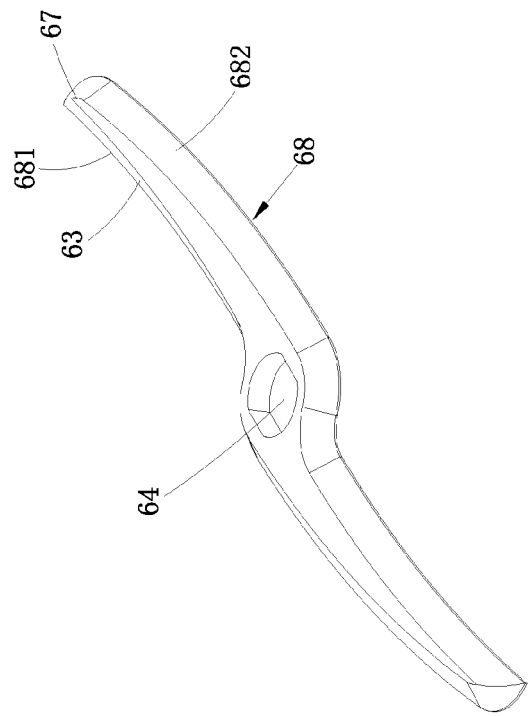
FIG. 12 is a schematic diagram of a crushing mechanism according to a third embodiment of the present invention.
Figure 11:
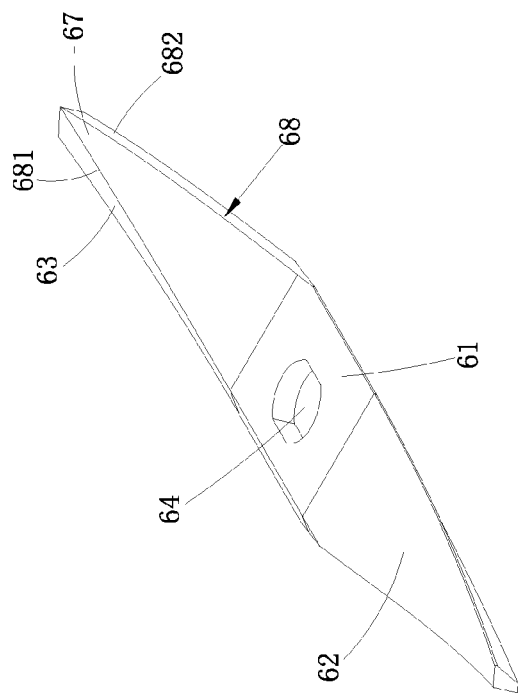
FIG. 11 is a schematic diagram of a crushing mechanism according to a second embodiment of the present invention.

In the embodiment as shown in FIG. 2, the crushing mechanism 6 includes a cutting blade. The cutting blade is made of an alloy metal material, has a hardness, and cuts an object passing therethrough at a high speed. The cutting blade may rotate around a rotation axis of the crushing mechanism 6. In this embodiment, the rotation axis of the crushing mechanism 6 coincides with the axis 41. The rotation axis and the axis 41 may be in parallel or intersect at an angle. The cutting blade extends along a longitudinal direction perpendicular to the rotation axis, including a mounting portion 61 in the middle of the cutting blade, and two operating portions 62 longitudinally extending along opposite directions of the mounting portion 61, the operating portions 62 each including a cutting portion 63 for cutting an object. The operating portions 62 are disposed symmetrically about the center of the cutting blade. The mounting portion 61 is used for connecting the transmission mechanism 7, including a mounting hole 64. The mounting hole 64 may be in a flat-square shape, and may also have a spline structure or another transmission structure, to facilitate power connection with the transmission shaft 71. Certainly, the mounting portion 61 may also be in the form of multiple shape-matched mounting holes. Besides, the mounting portion 61 further includes a positioning element 65 that fixes the mounting hole 64 onto the transmission shaft 71. The positioning element 65 may be a common jump ring, a pin, a nut or the like. Each operating portion 62 includes an end portion 67 located at a longitudinal end of the cutting blade and a side edge 68 located between the mounting portion 61 and the end portion 67. As the mounting portion 61 and the end portion 67 of the cutting blade have a longitudinal width, each operating portion 62 has two side edges 68 disposed oppositely, i.e., a first side edge 681 and a second side edge 682. The first side edge 681 and the second side edge 682 both extend along the longitudinal direction. The cutting portion 63 may be certainly disposed on one of the first side edge 681 and the second side edge 682. For example, the cutting portion 63 is disposed on the first side edge 381. The cutting portion can be a blade or a sawtooth, and can be used to crush objects. The cutting portion 63 may be certainly disposed on the two side edges 68, or even at the end portion 67. In one embodiment, the cutting portion 63 is only disposed on the first side edge 681, and the second side edge 682 of the cutting blade is curled relative to the first side edge 681. That is to say, the second side edge 682 of the cutting blade is curled along a longitudinal direction and in a transverse direction perpendicular to the longitudinal direction. Thus, the second side edge 682 can form an air lift part, so that the negative pressure of the air in the downstream region of the air lift part decreases, thus reducing vortex. Certainly, in other embodiments, the cutting blade may also be basically planar on the whole, and is not curled. It should be noted that the crushing mechanism 6 may include more than one cutting blade, and may include multiple cutting blades. The multiple cutting blades are arranged at a distance along the axis direction of the crushing mechanism 6. In an optimal embodiment, the crushing mechanism 6 includes two cutting blades spaced apart along the axis direction. The two cutting blades have the same structure, and are driven by the motor 4 to have synchronous rotation with a phase difference. Certainly, the cutting blades may also have different shapes. In another embodiment as shown in FIG. 11, the first side edge 681 and the second side edge 682 of each operating portion 62 of the cutting blades are inclined relatively, and an angle formed by the two side edges through inclination is an acute angle, so that the longitudinal width of the cutting blades from the mounting portion 61 to the end portion 67 gradually narrows. Such a design has an advantage of reducing the space occupied by the cutting blades, so that more space is made for the airflow to pass through. In a preferred embodiment, when a projection area of the cutting blade on a section of the air pipe 2 accounts for less than ½ of the sectional area of the whole air pipe 2, the passing effect of the airflow is better. In a more preferred embodiment, the ratio of the projection area to the sectional area is ⅓ or ¼. In another embodiment shown in FIG. 12, the first side edge 681 and the second side edge 682 of each operating portion 62 of the cutting blades are arc-shaped, and the two side edges have different radians, so that the whole cutting blade is substantially S-shaped.

Figure 14:
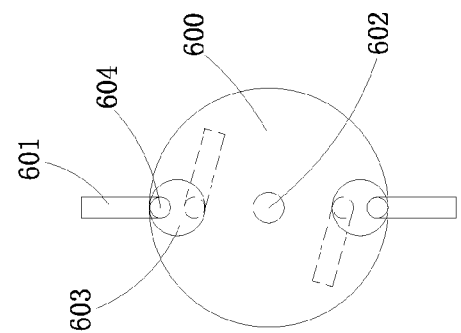
FIG. 14 is a schematic front view of the crushing mechanism according to the fourth embodiment of the present invention.
Figure 13:
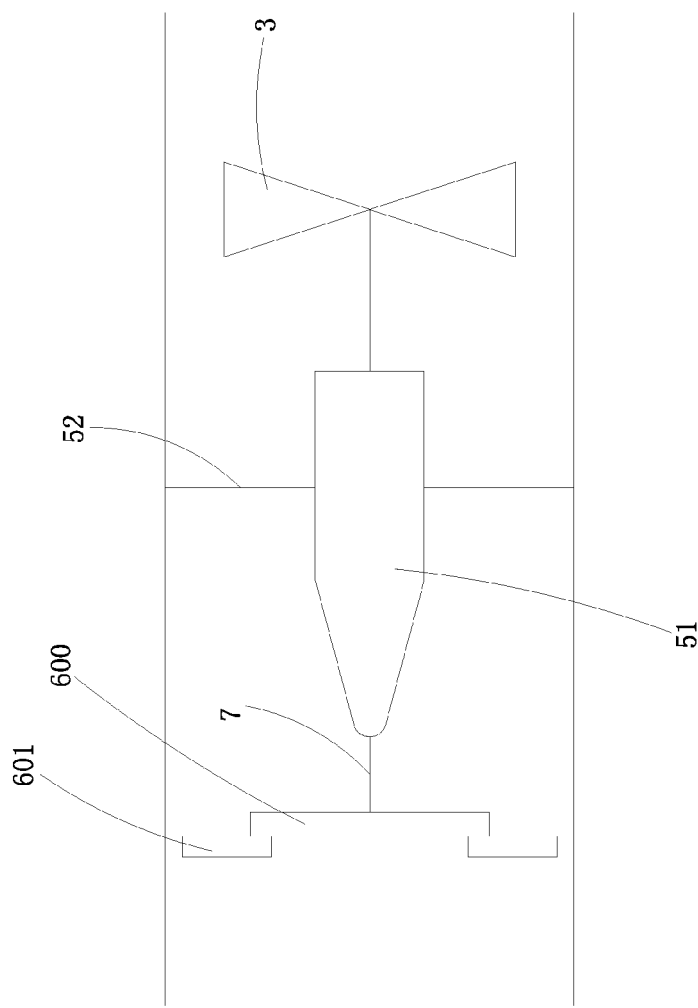
FIG. 13 is a schematic side view of a crushing mechanism according to a fourth embodiment of the present invention.

In the embodiment as shown in FIG. 13 and FIG. 14, the crushing mechanism 6 further includes a cutter 600 and a blade 601 disposed on the cutter 600. The crushing mechanism 6 may also be driven by the motor 4 to rotate. Certainly, the crushing mechanism 6 stops rotating when not driven by the motor 4. The cutter 600 is disk-shaped in this embodiment. The blade 601 is disposed at an edge of the disk. The cutter 600 is centrally provided with a connecting portion 602 connected to the transmission mechanism 7. The transmission mechanism 7 drives the cutter 600 to rotate around the axis of the transmission mechanism 7. Certainly, the rotating direction may be rotation along one direction and may also be rotation along two reverse directions. Several mounting holes 603 are disposed at edges of the cutter 600, and the blade 601 matches the cutter 600 through the mounting holes 603. As shown in FIG. 13, the blade 601 is provided with a pivot pillar 604. The pivot pillar 604 passes through a plane where the blade 601 is located, and at the same time, the pivot pillar 604 passes through the mounting holes 603 and can fit sidewalls of the mounting holes 603. The area of the mounting hole 603 is greater than the sectional area of the pivot pillar 604. When the cutter 600 is driven by the transmission mechanism 7 to make rotating motion, the blade 601 at the edge of the cutter 600 is thrown away outwards along the radial direction of the cutter 600 due to the effect of centrifugal force. The blade 601 can extend out of the cutter 600 for cutting. When the blade 601 is encountered with a harder object, the blade 601 collides with the object to shift the pivot pillar 604 in the mounting hole 603, so that the blade 601 retracts from the cutter 600, as shown by the dotted line in FIG. 13, and in this way, abrasion of the blade 601 can be avoided. In this embodiment, two sets of blades 601 are disposed on the cutter 600. Certainly, the cutter 600 may also be provided with multiple sets of blades, for example, 3 sets, 4 sets and the like.

Figure 15:
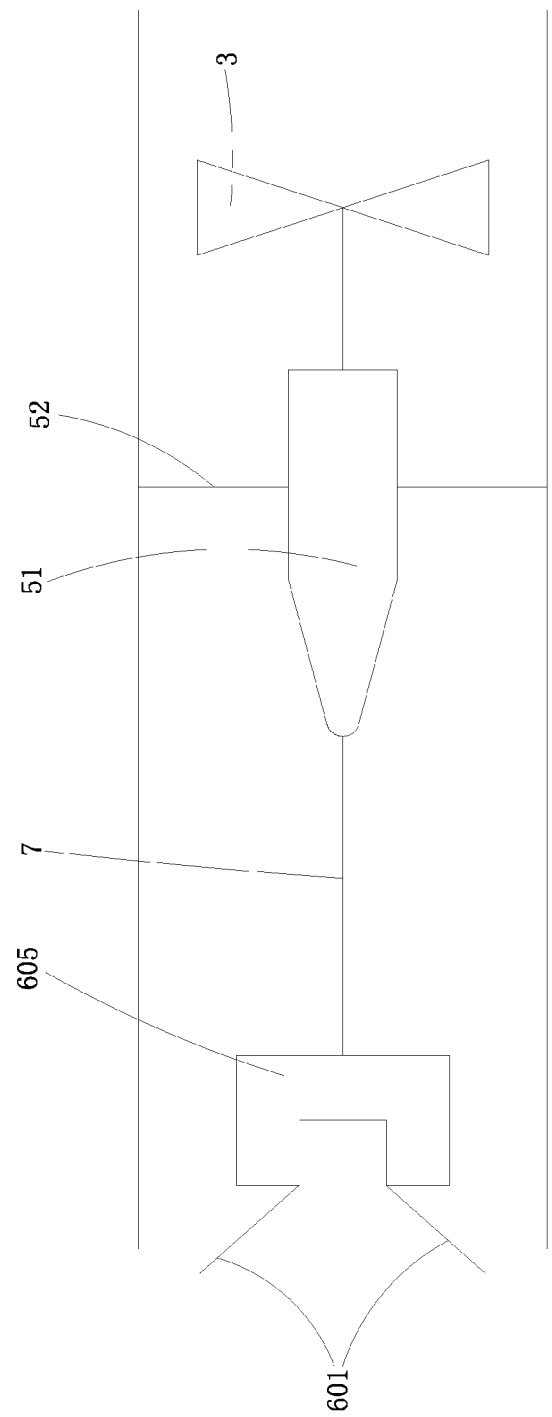
FIG. 15 is a schematic diagram of expansion of a crushing mechanism according to a fifth embodiment of the present invention.
Figure 16:
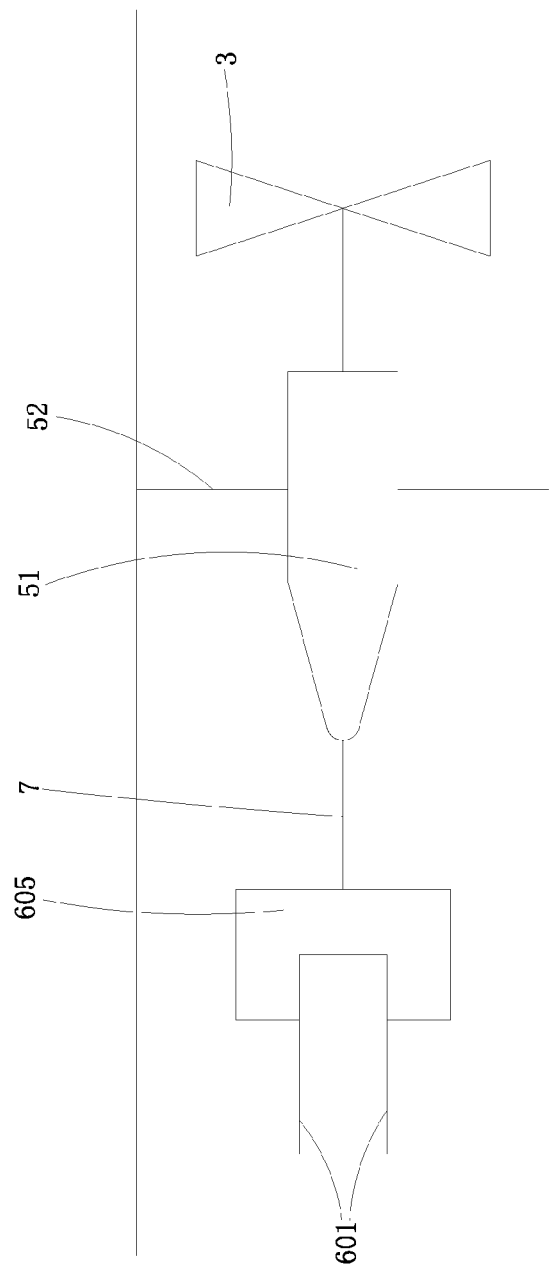
FIG. 16 is a schematic diagram of contraction of the crushing mechanism according to the fifth embodiment of the present invention.

In another embodiment as shown in FIG. 15 and FIG. 16, the crushing mechanism 6 includes at least one set of symmetrical blades 601. Certainly, the crushing mechanism 6 may also include several sets of blades 601, such as 2 sets, 3 sets or more. Besides, the crushing mechanism 6 further includes an extensible member 605. The blades 601 are mounted onto the extensible member 605. As shown in FIG. 15 and FIG. 16, the extensible member 605 may drive the blades 601 to switch between a contraction status and an expansion status. As shown in FIG. 15, the blades 601 expand outwards and at this point, are in an expansion status, and the blades 601 may play a role of crushing when expanding. As shown in FIG. 16, the blades 601 contract inwards, and at this point, are in a contraction status. The extensible member 605 may drive the blades 601 to expand or contract in a movable manner. As shown in FIG. 15 and FIG. 16, the extensible member 605 is movably connected to the transmission mechanism 7. The transmission mechanism 7 drives the extensible member 605 to move axially. Specifically, as shown in FIG. 15, when the transmission mechanism 7 rotates along one direction, the extensible member 605 moves towards a longitudinal front end under the effect of rotation in the direction, and at this point, the blades 601 are in an expansion status. The corresponding blowing-suction device 1 is just in the status of a suction mode, and the expanding blades 601 can produce a crushing effect. As shown in FIG. 16, when the transmission mechanism 7 rotates along another direction, the extensible member 605 moves towards a longitudinal rear end under the effect, and at this point, the blades 601 are in a contraction status. The contracting blades 601 can reduce the sectional area occupied by the blades 601, thus ensuring that an enough air circulation area. The corresponding blowing-suction device 1 is just in the status of a blowing mode. That is to say, when the blowing-suction device 1 is in the suction mode, the blades 601 expand, thus conducting crushing. When the blowing-suction device 1 is in the blowing mode, the blades 601 contract, thus increasing the air-passing area.

In other embodiments, the crushing mechanism 6 includes a trimming line made of a flexible material. When the transmission mechanism 7 drives the crushing mechanism 6 to rotate around its axis at a high speed, under the action of the centrifugal force, the trimming line extends along a radial direction, thus playing a role similar to a cutting blade. With such a design, the trimming line also produces an effect of crushing.

Figure 10:
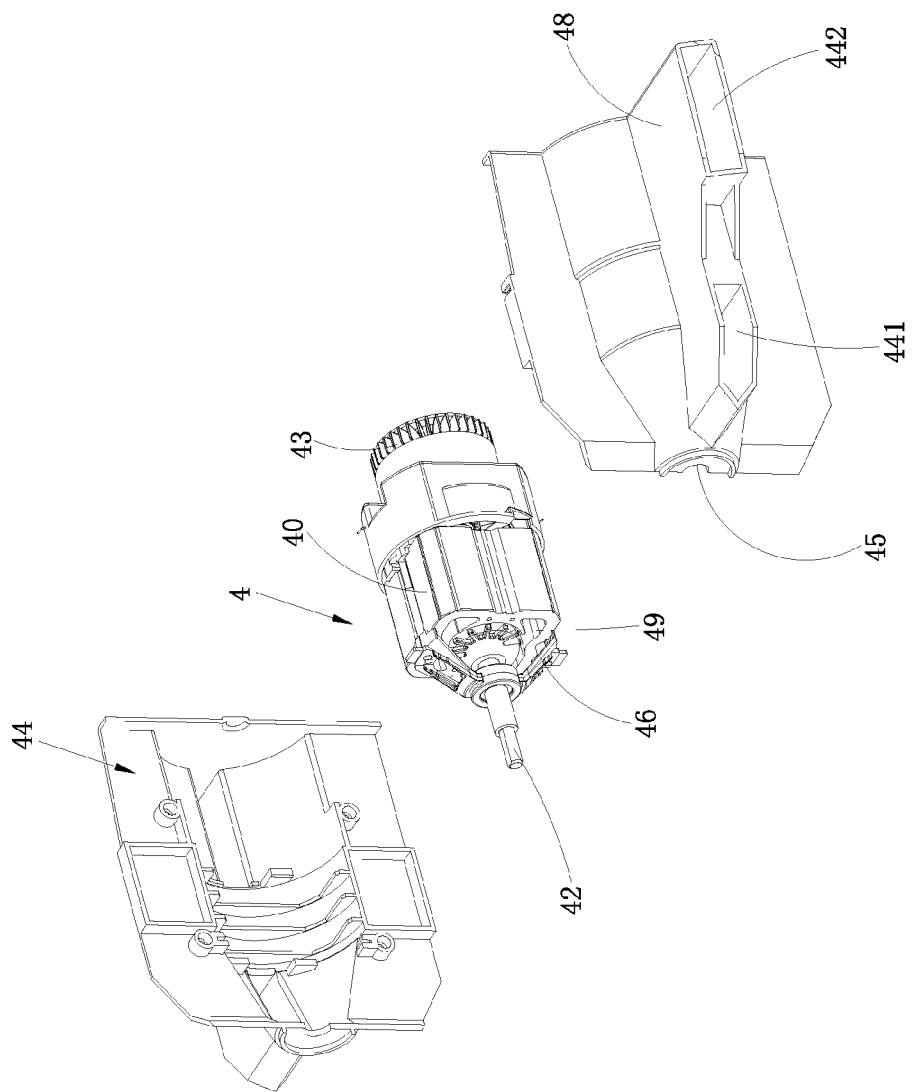
FIG. 10 is a schematic exploded diagram of a motor cover in FIG. 6.
Figure 18:
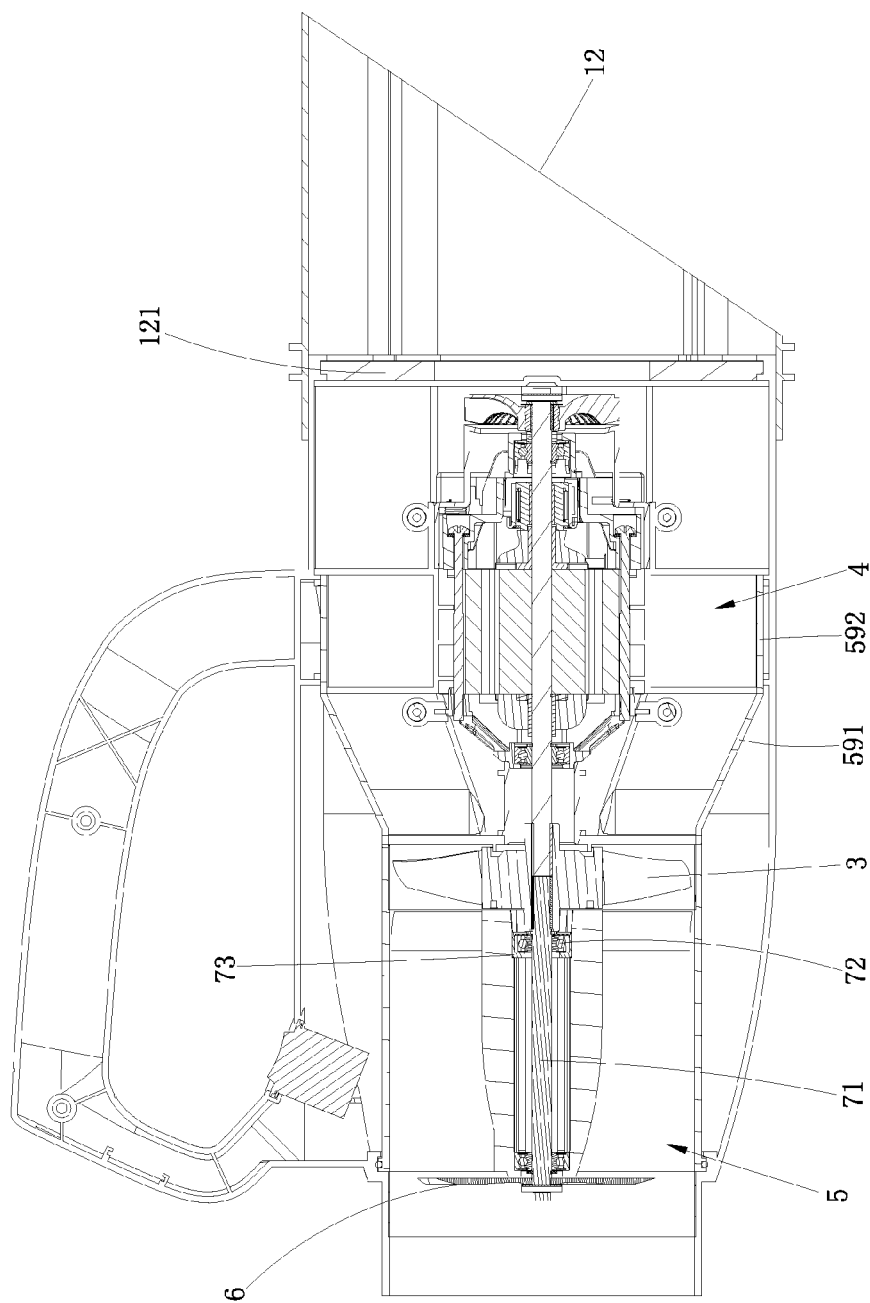
FIG. 18 is a sectional view of the blowing-suction device in FIG. 17.

Even if in the presence of the crushing effect of the crushing mechanism 6, crushed fine particles may still cause damage to the motor 4 when passing through the motor 4. Under some extreme conditions, the airflow suctioned in the suction mode may carry a small amount of water stains and water vapors. Humidity generated by the water stains and water vapors may also have obvious influences on the motor 4. To this end, the blowing-suction device 1 of the present invention further optimizes the design of the motor 4, so that the motor 4 and the airflow channel 55 are isolated. In an embodiment as shown in FIG. 2, the motor 4 is located in the airflow channel 55, and the blowing-suction device 1 includes a motor cover 44 located inside the housing 14. A closed internal space is formed inside the motor cover 44, the motor 4 is in the internal space, and the airflow channel is located outside the motor cover 44. Therefore, the motor cover 44 isolates the motor 4 from the airflow channel 55. The airflow passes through the airflow channel 55 located between the motor cover 44 and the housing 14, while the motor 4 may not be affected as it is always located in the motor cover 44. Impurities or water vapors in the airflow channel 55 may not affect the motor 4 located in the motor cover 44. In another embodiment as shown in FIG. 18, the motor 4 is directly disposed outside the airflow channel 55, thus avoiding influences of the impurities or water vapors in the airflow channel 55 thereon. Therefore, in this embodiment, the motor 4 may also not be provided with a sealed motor cover 44. As shown in FIG. 10, the motor cover 44 may include two half shells that can be fixedly connected with each other; certainly, in other embodiments, the motor cover 44 may also be formed integrally. In addition, as the motor cover 44 wraps the motor 4, the motor cover 44 is located on one side of the fan 3 close to the first opening 12.

In order to produce an ideal cooling effect on the motor 4 located in the motor cover 44, a cooling channel is further disposed inside the blowing-suction device 1, and the cooling channel is used for guiding cooled airflow to pass through the motor 4 so as to achieve a cooling effect. In this embodiment, the cooling channel used by the cooled airflow and the airflow channel used by the airflow generated by the fan 3 are disposed independently of each other. In this way, it can ensure that the cooled airflow and the airflow generated by the fan 3 run and move independently of each other without interfering with each other. To this end, as shown in FIG. 1, FIG. 4 and FIG. 5, the cooling channel has an air inlet 141 and an air outlet 142 disposed on the housing 14. The air inlet 141 and the air outlet 142 are disposed independently of each other, and the air inlet 141 and the air outlet 142 are disposed in positions which are different from those of the interface 11 and the first opening 12 on the housing 14. The air inlet 141 and the air outlet 142 are in communication with the motor cover 44 respectively. Specifically, in the blowing mode, as shown in FIG. 4, the cooled air enters the interior of the motor cover 44 from the air inlet 141 and cools the motor 4, and then leaves the motor cover 44 and goes back to the outside via the air outlet 142, as shown by the hollow arrows in FIG. 4. The airflow generated by the fan 3 enters the main body 10 from the first opening 12, and then is blown out from the pipe orifice 21 of the air pipe 2, as shown by the single arrows in FIG. 4. In the suction mode, the air is suctioned into the airflow channel from the pipe orifice 21 of the air pipe 2 along with foreign matters, and then is discharged from the first opening 12, as shown by the single arrows in FIG. 5. The cooling air still enters the motor cover 44 from the air inlet 141, and drives the heat generated by the motor 4 during operation to go back to the outside from the air outlet 142, as shown by the hollow arrows in FIG. 5. In this embodiment, the air inlet 141 and the air outlet 142 are both located in the longitudinal middle of the housing 14. The air inlet 141 and the air outlet 142 are evenly distributed on the housing 14 around the circumferential direction. The air inlet 141 and the air outlet 142 are substantially disposed as grid-shaped openings. The air inlet 141 and the air outlet 142 are front-back distributed relatively along the longitudinal direction. The air inlet 141 is closer to a longitudinal front end of the housing 14 relative to the air outlet 142, and the air outlet 142 is closer to a longitudinal rear end of the housing 14 relative to the air inlet 141. In a preferred embodiment, as shown in FIG. 2, the blowing-suction device 1 further includes a cooling fan 43 disposed in the motor cover 44. The cooling fan 43 may be driven by the motor 4 to rotate to generate cooled airflow. The cooling fan 43 is connected to the motor shaft 42 of the motor 4. The cooling fan 43 is preferably located in a longitudinal rear end of the motor 4.

As shown in FIG. 10, the motor cover 44 is provided thereon with a transmission interface 45 accommodating piercing of the motor shaft 42, thus facilitating the motor 4 inside the motor cover 44 to be connected to the fan 3 outside the motor cover 44. The transmission interface 45 is disposed along the direction of the axis 41. The sectional area of the transmission interface 45 is relatively small, which can only accommodate piercing of the motor shaft 42 without affecting the sealing property of the motor cover 44. The motor cover 44 is preferably formed by a left half shell and a right half shell through fixed connection. The two half shells are fixedly connected through a fixed bolt or another common manners. Besides, the cooling fan 43 is also located inside the motor cover 44.

As the air inlet 141 and the air outlet 142 are both disposed on the housing 14 and the motor cover 44 is located inside the housing 14, in order to ensure smooth connection between them, a cooling inlet 441 and a cooling outlet 442 are further disposed on the motor cover 44. The cooling inlet 441 is in communication with the air inlet 141, and at the same time, the cooling outlet 442 is in communication with the air outlet 142.

Figure 9:
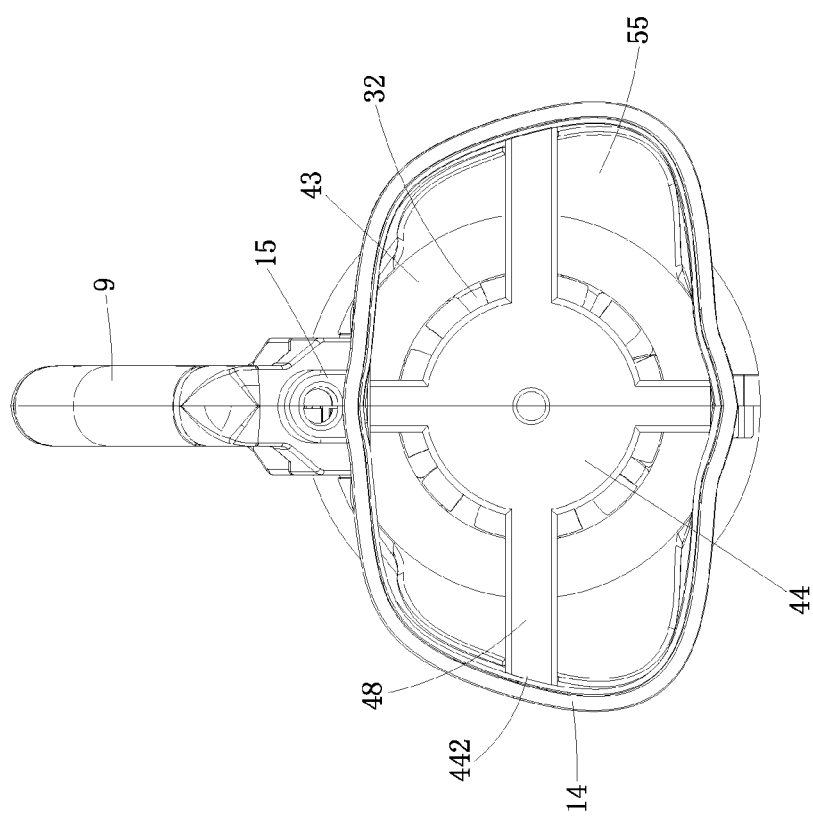
FIG. 9 is a rear view of the blowing-suction device in FIG. 1.

In this embodiment, sizes and positions of the cooling outlet 442 and the air outlet 142 are disposed correspondingly. Preferably, the cooling outlet 442 on the motor cover 44 is aligned with the air outlet 142 on the housing 14, so that the cooling air, after being discharged out of the motor cover 44 from the cooling outlet 442, is directly discharged to the outside through the air outlet 142. As shown in FIG. 9 and FIG. 10, the motor cover 44 includes several protruding portions 48 protruding outwards from the surface of the cover body. End portions of the protruding portions 48 may directly abut against the inner surface of the housing 14. Peripheries of the protruding portions 48 inside the housing 14 are still parts of airflow circulation generated by the fan 3. Cooling outlets 442 are located at the end portions of the protruding portions 48. The position where the housing 14 abuts against the protruding portions 48 is just provided with air outlets 142. Several air outlets 142 and cooling outlets 442 are arranged along the circumferential direction. In this embodiment, the motor cover 44 substantially extends along the longitudinal direction. The protruding portions 48 extend along a radial direction perpendicular to the longitudinal direction. In other words, the protruding portions 48 are evenly distributed along the circumferential direction of the axis 41. The number of the protruding portions 48 in this embodiment is 4, and an angle between two adjacent protruding portions 48 is 90 degrees. Certainly, the number of the protruding portions 48 may also be 3, 5, 6 or the like. As shown in FIG. 9, when the air passes through the protruding portions 48, the air passes through gaps between the protruding portions 48 and the housing 14, and the gaps form a part of the airflow channel 55. As, in the suction mode, the motor cover 44 and the protruding portions 48 are located in a downstream region of the fan 3 and the air passes around the protruding portions 48, the protruding portions 48 may also produce an effect similar to diversion. Similarly, to reduce the effect of superposition of resonance, the number of the protruding portions 48 and the number of the blades 32 are set as mutual prime numbers. For example, the number of the protruding portions 48 is 4, while the number of the blades 32 is 11. For another example, the number of the protruding portions 48 is 5, while the number of the blades 32 is 12. In this way, when the fan 3 rotates, at any time, the number of the blades 32 and the protruding portions 48 overlapping in phase is at most one. In the suction mode, the cooling air, after entering the motor cover 44, moves towards the cooling outlet 442 from the protruding portions 48, and finally flows to the outside from the air outlets 142. In other embodiments, the cooling outlet 442 of the motor cover 44 may not be directly aligned with the air outlet 142 on the housing 14, but the air is discharged from the air outlet 142 after passing a passage.

In this embodiment, the air inlet 141 is not directly aligned with the cooling inlet 441, but is staggered at a distance along the longitudinal direction or staggered at a distance along the circumferential direction perpendicular to the longitudinal direction. Therefore, as shown in FIG. 4 to FIG. 6, a guide channel 80 is further disposed between the cooling inlet 441 and the air inlet 141. Circulation of the cooling air between the cooling inlet 441 and the air inlet 141 passes through the guide channel 80. In other words, the cooling air, after entering the housing 14, enters the motor cover 44 through the guide channel 80. The gap between the deflector shield 53 and the housing 14 forms the guide channel 80. As the airflow generated by the fan 3 passes through the interior of the deflector shield 53 and the cooling air passes through the guide channel 80, the deflector shield 53 may still separate the cooling air from the blowing-suction airflow generated by the fan 3. In this embodiment, a fitting portion 59 of the deflector shield 53 of the duct 5 wraps the motor cover 44. Certainly, in other embodiments, the deflector shield 53 may also be completely separated from the motor cover 44. The deflector shield 53 is provided with a cooling inlet 441' basically fitting in with the cooling inlet 441. The air enters the interior of the housing 14 from the air inlet 141, then moves in the gap between the housing 14 and the deflector shield 53, and enters the interior of the motor cover 44 through the cooling inlets 441 and 441'. In this embodiment, the cooling inlet 441' is disposed on the fitting portion 59.

The blowing-suction device 1 has at least two operation modes: a blowing mode and a suction mode. In the blowing mode, the air pipe 2 is fixedly connected to the main body 10 through the interface 11. The fan 3 controllably rotates along a first direction around its axis, thus generating airflow. The manner of controlling the rotation direction of the fan 3 is preferably a control switch 91. The air enters the interior of the main body 10 from the first opening 12, and then passes through the airflow channel 55 between the motor cover 44 and the housing 14 and the fan 3. The airflow channel 55 between the motor cover 44 and the housing 14 forms an upstream region of the fan 3 in the blowing mode.

Owing to the sealing effect of the motor cover 44, the air may not enter the interior of the motor cover 44. After the air passes through the fan 3 from the upstream region, the air passes through the interior of the deflector shield 53. Specifically, an internal space between the deflector 51 and the deflector shield 53 constitutes the airflow channel 55 for the air to pass, and the airflow channel 55 forms a downstream region in the blowing mode. The air is finally blown out from the pipe orifice 21 of the air pipe 2.

In the suction mode, the air pipe 2 is still fixedly connected to the main body 10 through the interface 11. The fan 3 controllably rotates along a second direction around its axis, thus generating airflow. The second direction is different from the first direction. The manner of controlling the rotation direction of the fan 3 is preferably a control switch 91. The air enters from the pipe orifice 21 of the air pipe 2 along with foreign matters such as leaves, and then passes through the airflow channel 55 between the deflector 51 and the deflector shield 53. The airflow channel 55 forms an upstream region of the fan 3 in the suction mode. After passing through the fan 3, the air enters the airflow channel 55 between the motor cover 44 and the housing 14. The region forms a downstream region in the suction mode. Finally, the air moves from the downstream region to the first opening 12 of the main body 10 to be discharged out. In this mode, the first opening 12 is preferably connected to a collection device such as a garbage bag, and garbage leaves, after being discharged out from the first opening 12 together with the air, may enter the garbage bag for recycling.

Figure 39:
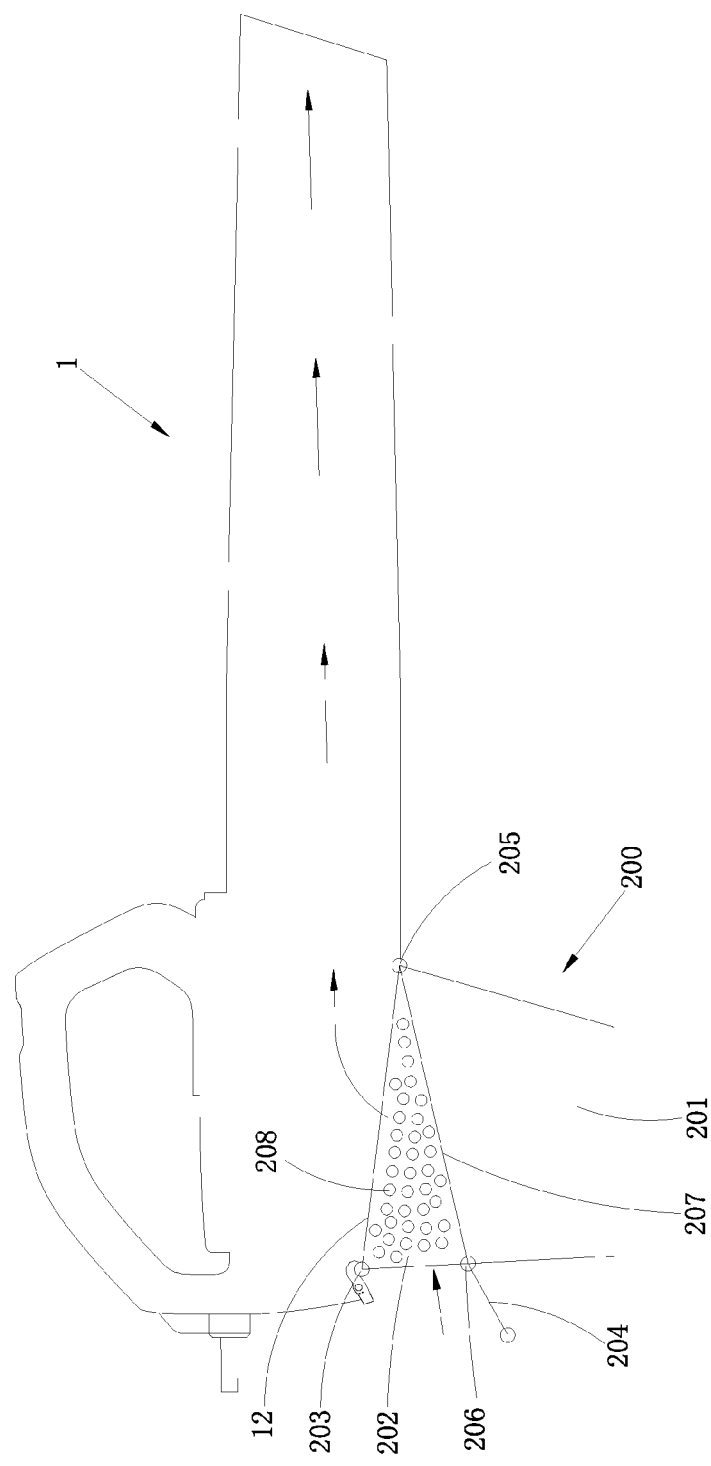
FIG. 39 is a schematic diagram of mounting of a collection device when the blowing-suction device is in a suction mode according to the present invention.
Figure 40:
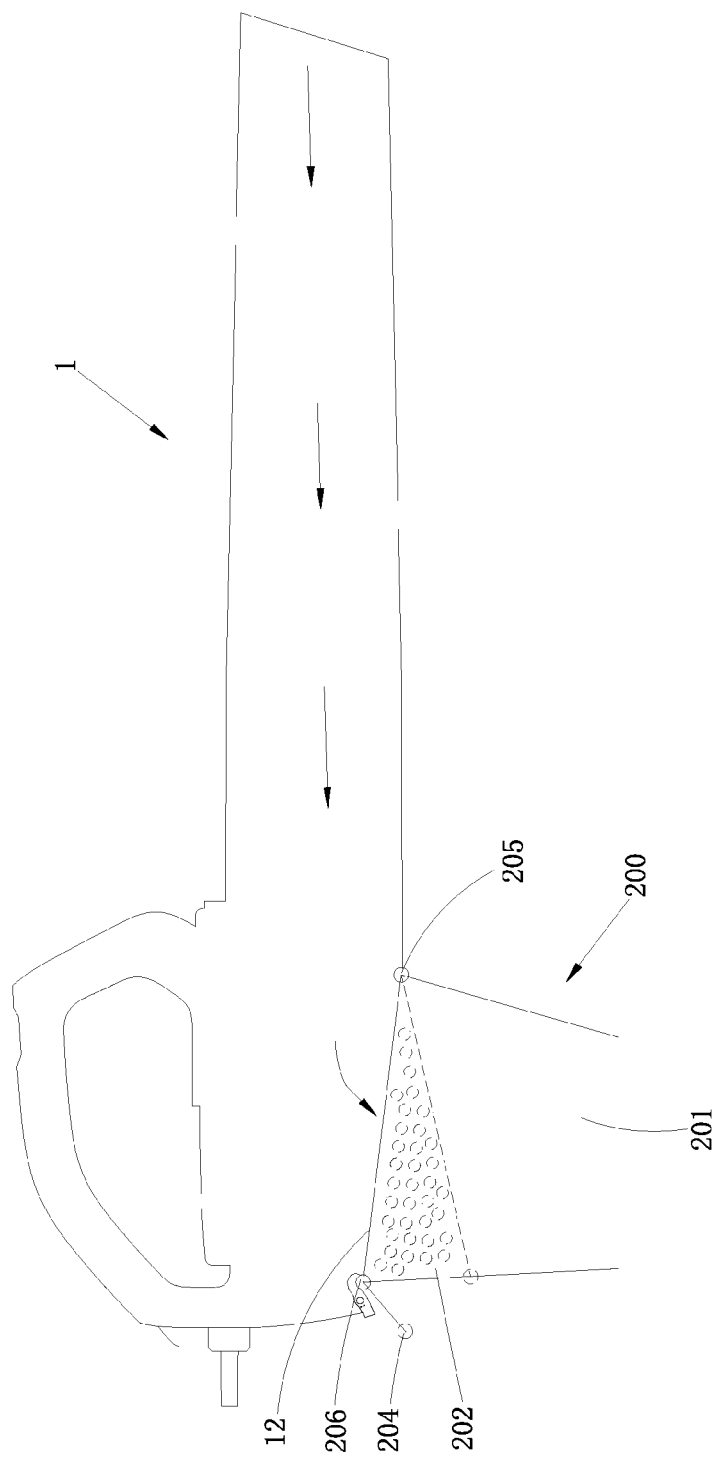
FIG. 40 is a schematic diagram of mounting of a collection device when the blowing-suction device is in a blowing mode according to the present invention.

In the traditional blowing-suction device, when the blowing-suction device executes a suction mode, the collection device is mounted on the blowing-suction device. When the blowing-suction device executes a blowing mode, the collection device needs to be removed from the blowing-suction device. Therefore, when encountered with some working conditions where frequency switching is required, the collection device correspondingly needs to be removed from the blowing-suction device. As shown in FIG. 39 and FIG. 40, in this embodiment, whether the blowing-suction device 1 is in the blowing mode or the suction mode, the collection device 200 may be connected onto the blowing-suction device 1. The collection device 200 includes a collecting portion 201 and an air intake portion 202 movable relative to the collecting portion. The collecting portion 201 is used for collecting garbage, while the air intake portion 202 is used for circulating the air inside and outside the collection device 200. As shown in FIG. 40, when the blowing-suction device 1 is in the suction mode, the moving directions of the air and the garbage are as shown by the arrows in FIG. 40. The air intake portion 202 is received in the collecting portion 201, and at this point, garbage suctioned from the blowing-suction device 1 may directly enter the collecting portion 201 to make collection. As shown in FIG. 39, when the blowing-suction device 1 is in the blowing mode, the moving direction of the air is as shown by the arrows in FIG. 39. The air intake portion 202 moves to expose the collecting portion 201. The air required by the blowing-suction device 1 to execute blowing enters the blowing-suction device 1 through the air intake portion 202. In this way, the collection device 200 is connected onto the blowing-suction device 1 all the time, and can implement switching between the blowing and suction modes without removal. In this embodiment, the collection device 200 further includes a mounting portion 203 mounted to the blowing-suction device 1. The collection device 200 is connected to the blowing-suction device 1 all the time through the mounting portion 203. The mounting portion 203 is preferably fixedly disposed in the air intake portion 202. The mounting portion 203 may be a hook structure. The hook structure causes the air intake portion 202 to be fixedly connected with the blowing-suction device 1. An operating portion 204 is disposed on the collecting portion 201, so that a user controls the collecting portion 201, through the operating portion 204, to move relative to the air intake portion 202. In this embodiment, the operating portion 204 is a handle mounted on the collecting portion 201. The user drives the collecting portion 201 to move relative to the air intake portion 202 by gripping the handle. In this embodiment, the collecting portion 201 may pivotally move relative to the air intake portion 202. The collection device 200 includes a pivot 205 respectively connected to the collecting portion 201 and the air intake portion 202, so that the collecting portion 201 and the air intake portion 202 rotate relative to the pivot 205. As shown in FIG. 39, the air intake portion 202 is fixedly mounted to the first opening of the blowing-suction device 1 through the mounting portion 203. In this embodiment, the first opening 12 is disposed downwards. The collecting portion 201 and the air intake portion 202 form an angle relative to the pivot 205, so that the air intake portion 202 is exposed outside the collecting portion 201. At this point, the blowing-suction device 1 is in the blowing mode, and the outside air enters the first opening 12 of the blowing-suction device 1 through the air intake portion 202. As shown in FIG. 40, when the blowing-suction device 1 switches to the suction mode, the operating portion 204 is operated to rotate around the pivot 205, so that the collecting portion 201 rotates relative to the air intake portion 202, and the air intake portion 202 is received in the collecting portion 201. In the suction mode, leaves, dust and garbage discharged from the first opening 12 enter the collecting portion 201. It should be noted that the collecting portion 201 is preferably provided with a second mounting portion 206. The second mounting portion 206 is fixedly connected with the blowing-suction device 1. The second mounting portion 206 is preferably a hook structure similar to the mounting portion 203. In this embodiment, the collecting portion 201 is a bag made of a flexible material. The bag has an opening 207, and garbage such as leaves is collected into the bag through the opening 207. When not making collection, the bag may be folded and compressed into a small receiving volume, to facilitate collection. A common material of the bag may be non-woven fabrics or the like. The air intake portion 202 is disposed near the opening 207 of the bag. The air intake portion 202 may be made of a hard material. The air intake portion 202 is provided with an air intake 208, to facilitate air circulation. Certainly, in another embodiment, the air intake portion 202 may also be selectively disposed on the blowing-suction device 1 all the time, so that the air intake portion 202 is unchanged as a part of the blowing-suction device 1. In this embodiment, the air intake 208 may also be correspondingly disposed on the blowing-suction device 1.

Figure 32:
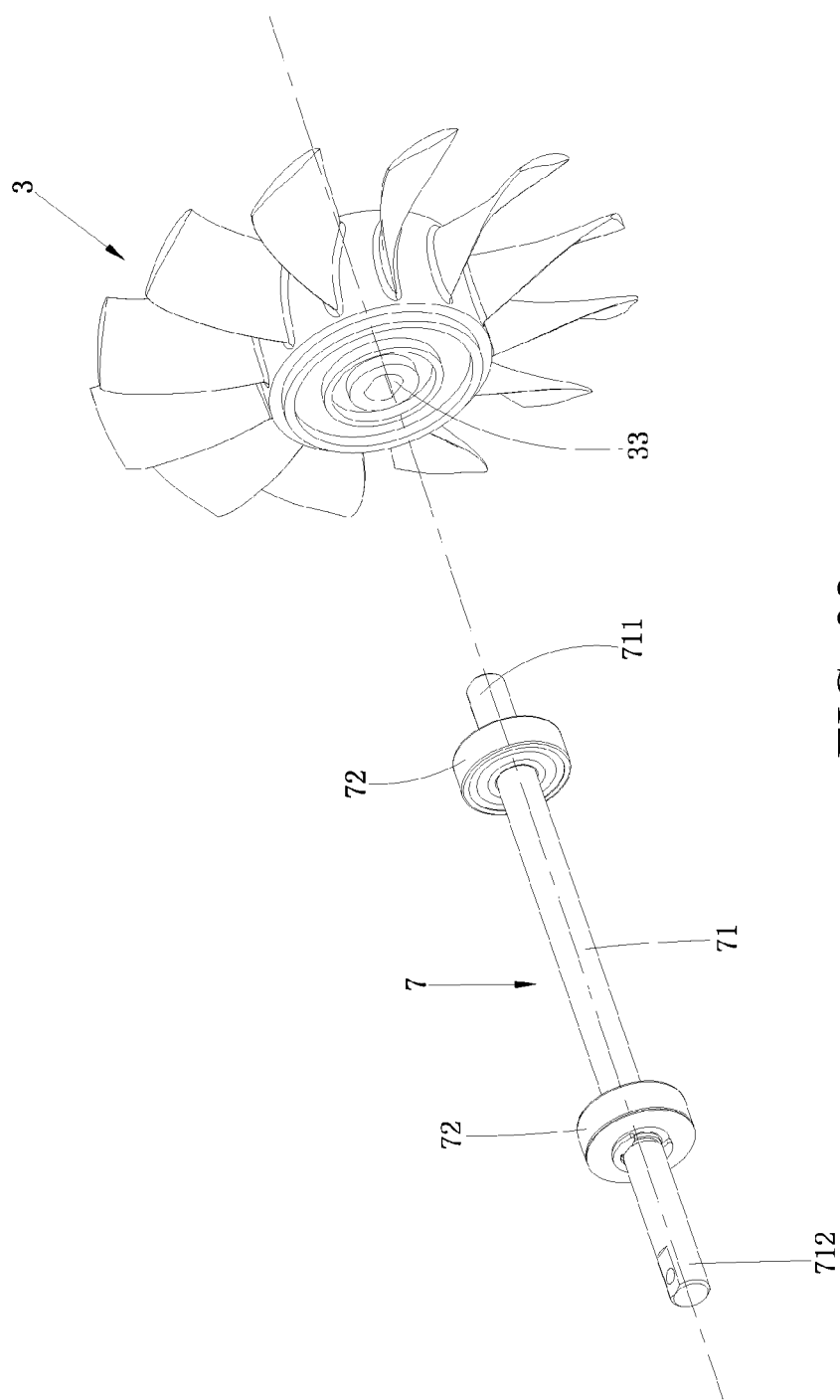
FIG. 32 is a schematic diagram of assembly of a fan and a transmission mechanism according to the present invention.
Figure 33:
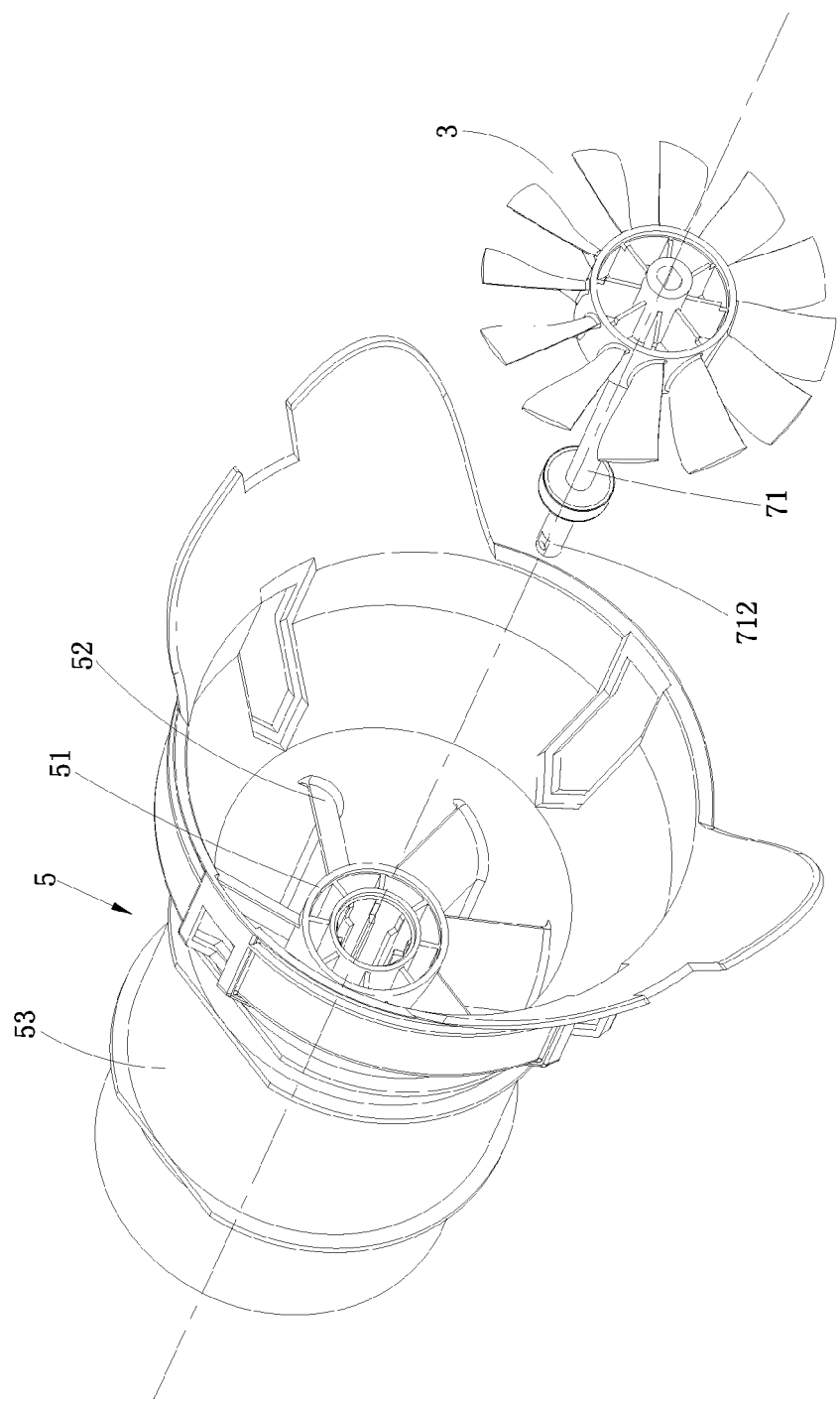
FIG. 33 is a schematic diagram of assembly of a duct and a transmission mechanism according to the present invention.
Figure 34:
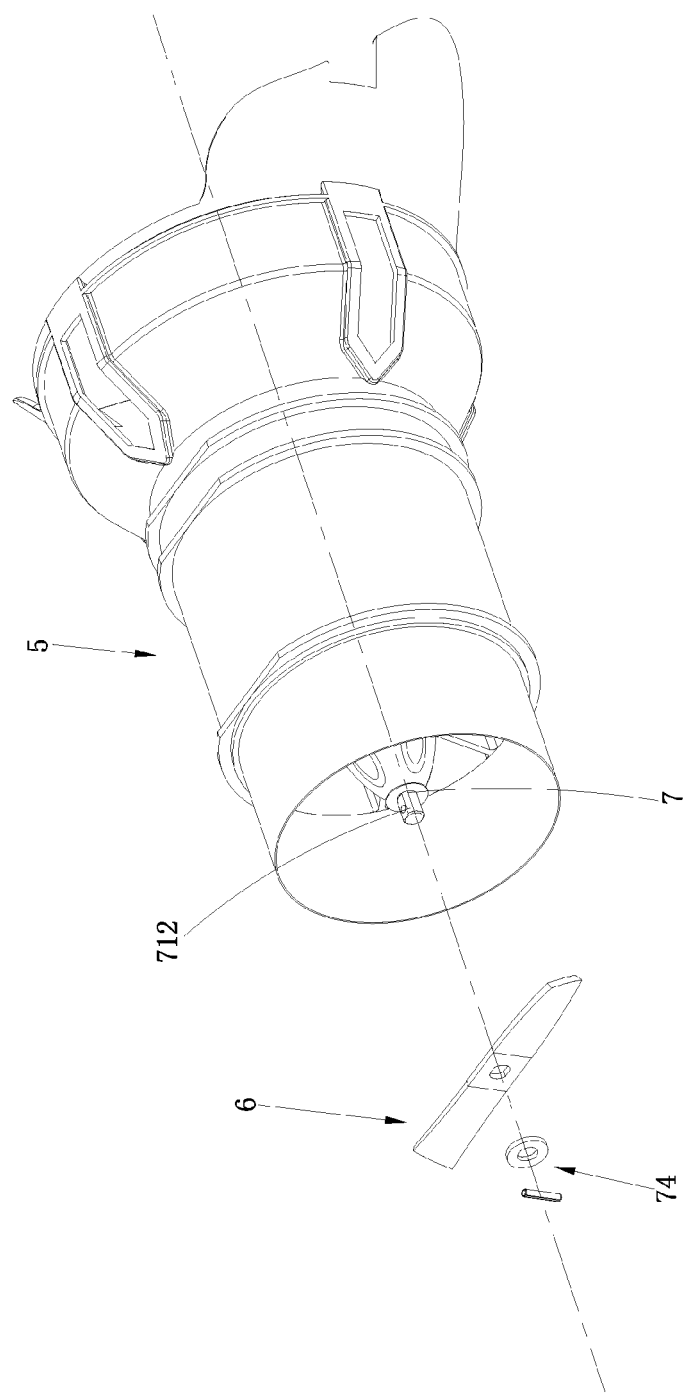
FIG. 34 is a schematic diagram of assembly of a crushing mechanism and a transmission mechanism according to the present invention.

A method of assembling a blowing-suction device is disclosed in the following. As shown in FIG. 32 to FIG. 38, the method includes: step S1. assembling a first component. The first component mainly includes a fan 3, a duct 5, a crushing mechanism 6 and a transmission mechanism 7 for connecting the fan 3 and the crushing mechanism 6. In step S1, the elements are assembled into a component. Step S1 includes three sub-steps S11, S12 and S13. Specifically, in the sub-step S11 as shown in FIG. 32, the fan 3 is mounted to a first end 711 of the transmission mechanism 7. In this embodiment, the transmission mechanism 7 is a transmission shaft 71. The transmission shaft 71 has two opposite ends, and the two ends are respectively set as a first end 711 and a second end 712 opposite thereto. The first end 711 of the transmission mechanism 7 is not rotatably relatively connected with the fan 3 along a dotted-line extending direction in FIG. 32. Besides, a supporting bearing 72 is further mounted on the transmission shaft 71. The position of the supporting bearing 72 is usually located between the first end and the second end of the transmission shaft 71. The number of the supporting bearing 72 is two. The two supporting bearings 72 are at a distance to support the transmission shaft 71. As shown in FIG. 33, after the fan 3 is mounted to the transmission shaft 71, the sub-step S12 is performed. In this step, the transmission shaft 71 is inserted into the duct 5. In this embodiment, the duct 5 is a one-piece design, and the whole duct 5 includes a deflector 51, stationary blades 52 and a deflector shield 53 which are parts formed integrally. Therefore, the transmission shaft 71 can only be matched with the duct 5 by insertion. The second end of the transmission shaft 71 is inserted into the deflector 51 from the tail of the duct 5 along the dotted-line direction in the figure, and moves towards the head of the duct 5. An inner surface of the deflector 51 is provided with a protruding positioning structure. The supporting bearing 72 on the transmission shaft 71 is clamped with some positioning structures in the deflector 51. The positioning structures may be positioning steps, positioning bosses or the like. As shown in FIG. 34, after the transmission shaft 71 is matched with the duct 5, the second end 712 of the transmission shaft 71 can go through the head of the duct 5. The first end 711 of the transmission shaft 71 is still outside the tail of the duct 5. The fan 3 connected to the first end 711 of the transmission shaft 71 is also outside the duct 5. The transmission shaft 71 passes through the duct 5, especially runs through the deflector 51 of the duct 5. In the sub-step S13, the crushing mechanism 6 is mounted to the second end of the transmission mechanism 7 along the dotted-line direction in the figure. The crushing mechanism 6 has a mounting portion 61, and is shape-matched with the second end of the transmission mechanism 7. The shape-matching here may be flat-square or splined connection. Therefore, the crushing mechanism 6 is disposed close to the head of the duct 5, while the fan 3 is disposed close to the tail of the duct 5. To prevent axial movement of the crushing mechanism 6 relative to the transmission mechanism 7, the second end of the transmission mechanism 7 is mounted with the crushing mechanism 6 and then mounted with an anti-slipping structure 74. Thus, the first component has been mounted, that is, step S1 is completed.

Figure 35:
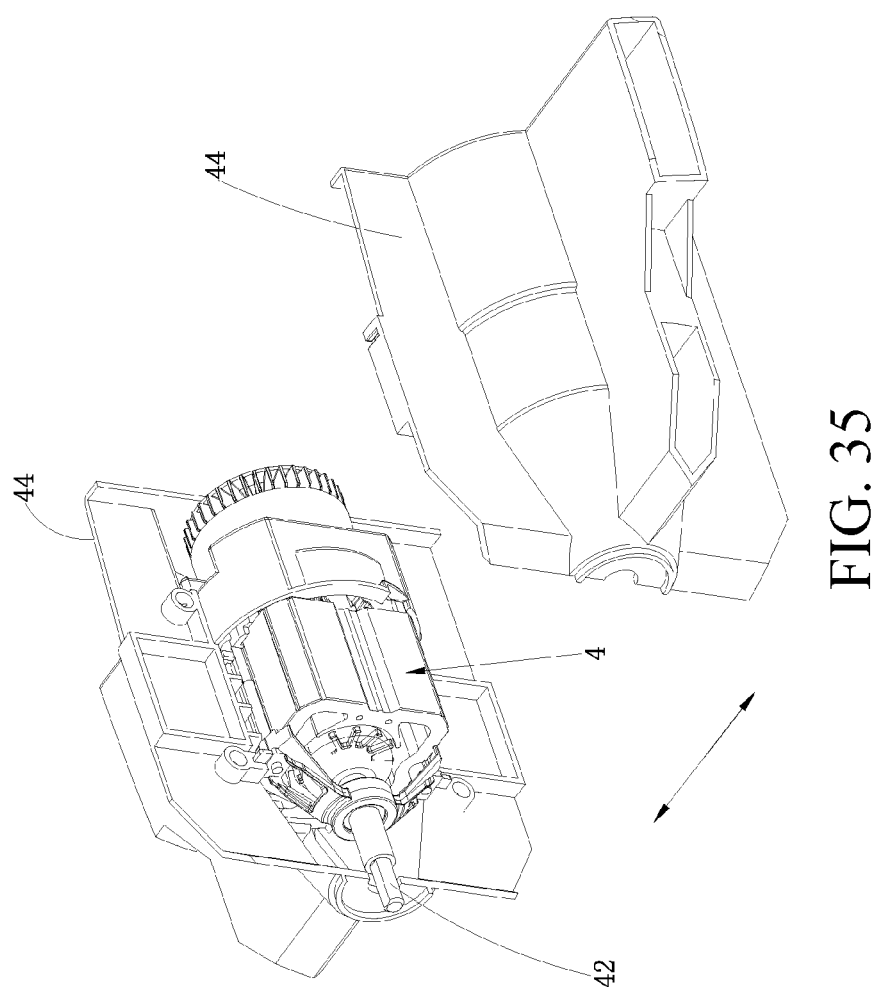
FIG. 35 is a schematic diagram of assembly of a motor and a motor cover according to the present invention.

In step S2, a second component is assembled. As shown in FIG. 35, the second component mainly includes a motor 4 and a motor cover 44. Step S2 mainly includes two sub-steps, S21 and S22. As the motor cover 44 includes two half shells. In the sub-step S21, the motor 4 is fixedly mounted to a motor cover half-shell, and ribs with a positioning function are correspondingly disposed in the motor 4 and the motor cover half-shell, so that the motor 4 can be fixedly mounted in the motor cover half-shell. In the sub-step S22, the other motor cover half-shell and the motor cover half-shell in the sub-step S21 are end-to-end connected along the double-end line direction in the figure, and are fixed through a fixing element such as a screw. The second component has been mounted, and so far, step S2 has been completed.

Figure 36:
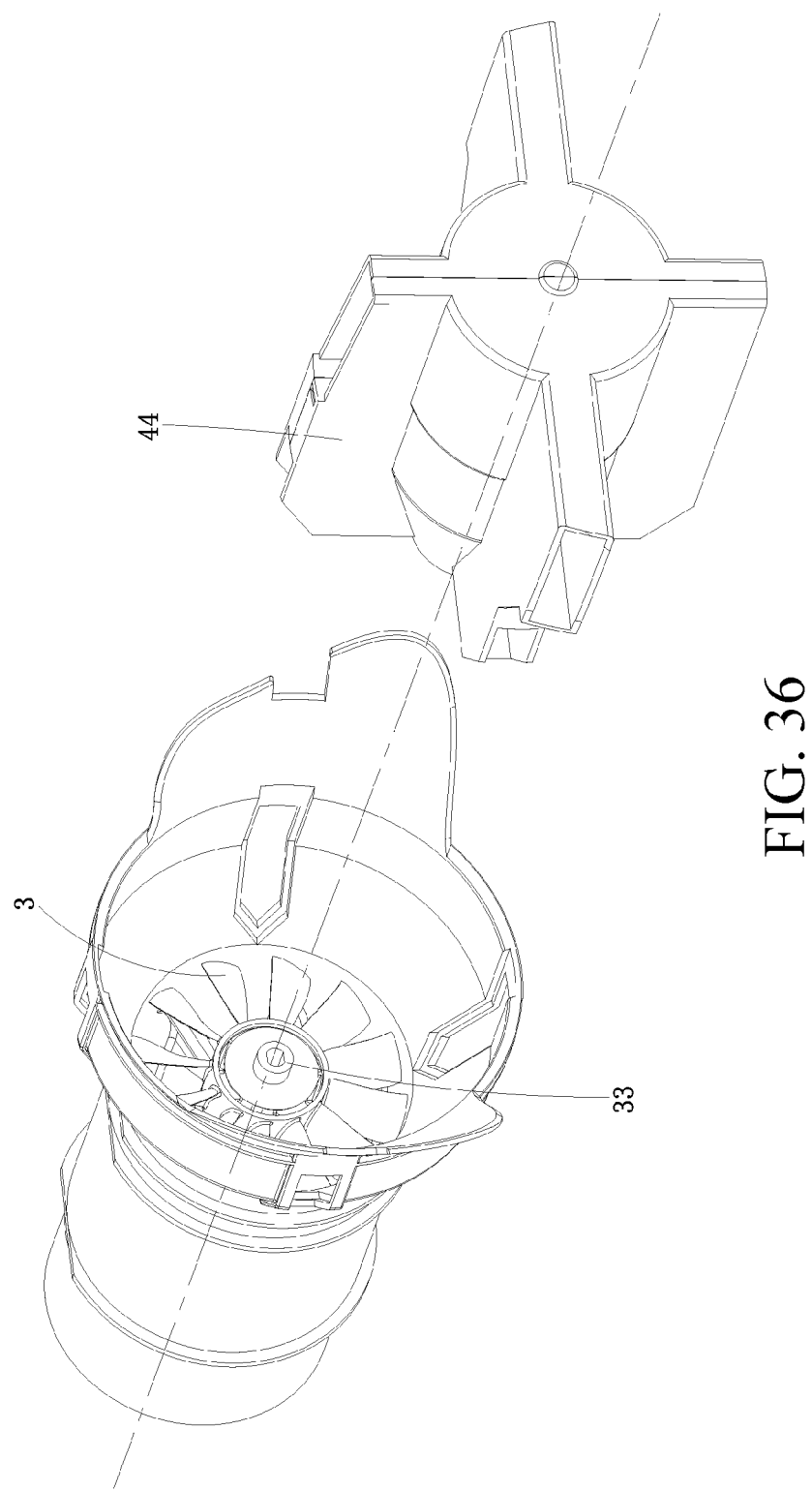
FIG. 36 is a schematic diagram of assembly of a first component and a second component according to the present invention.
Figure 37:
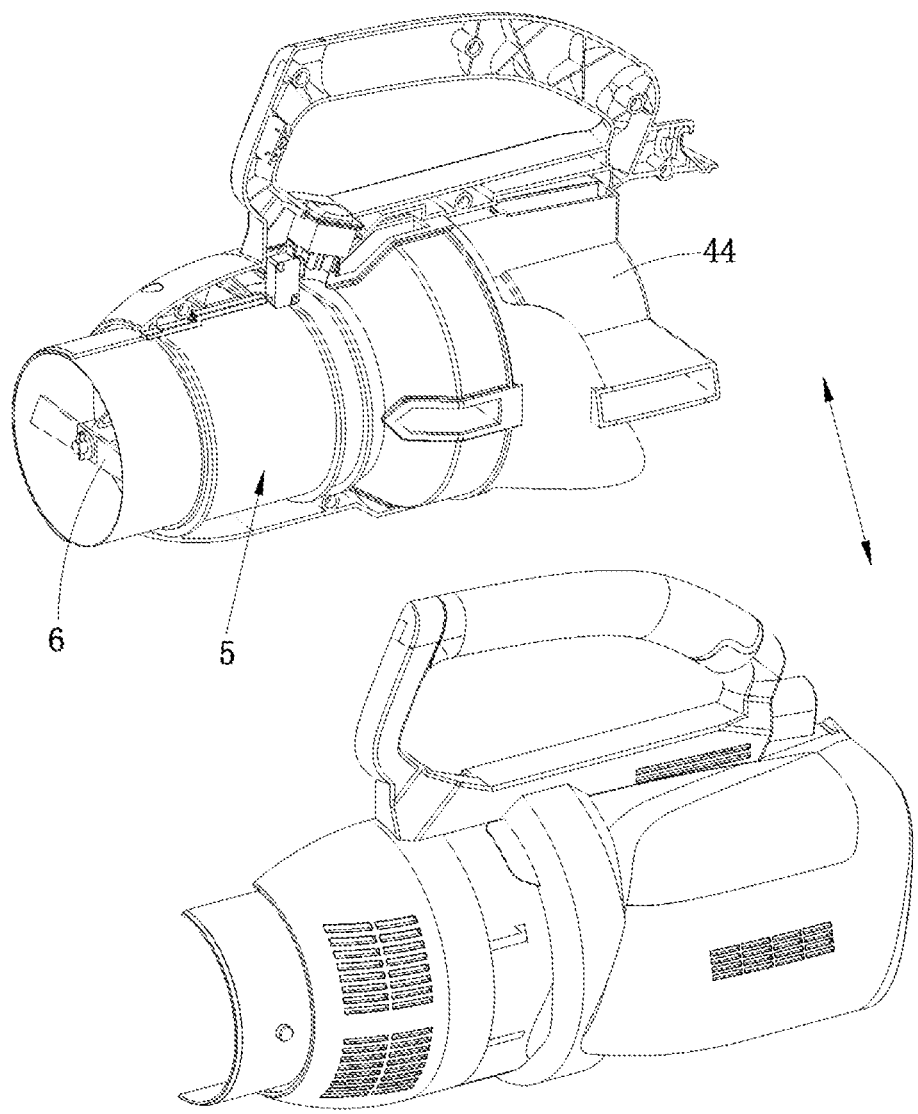
FIG. 37 is a schematic diagram of mounting of a first component and a second component into a housing according to the present invention.
Figure 38:
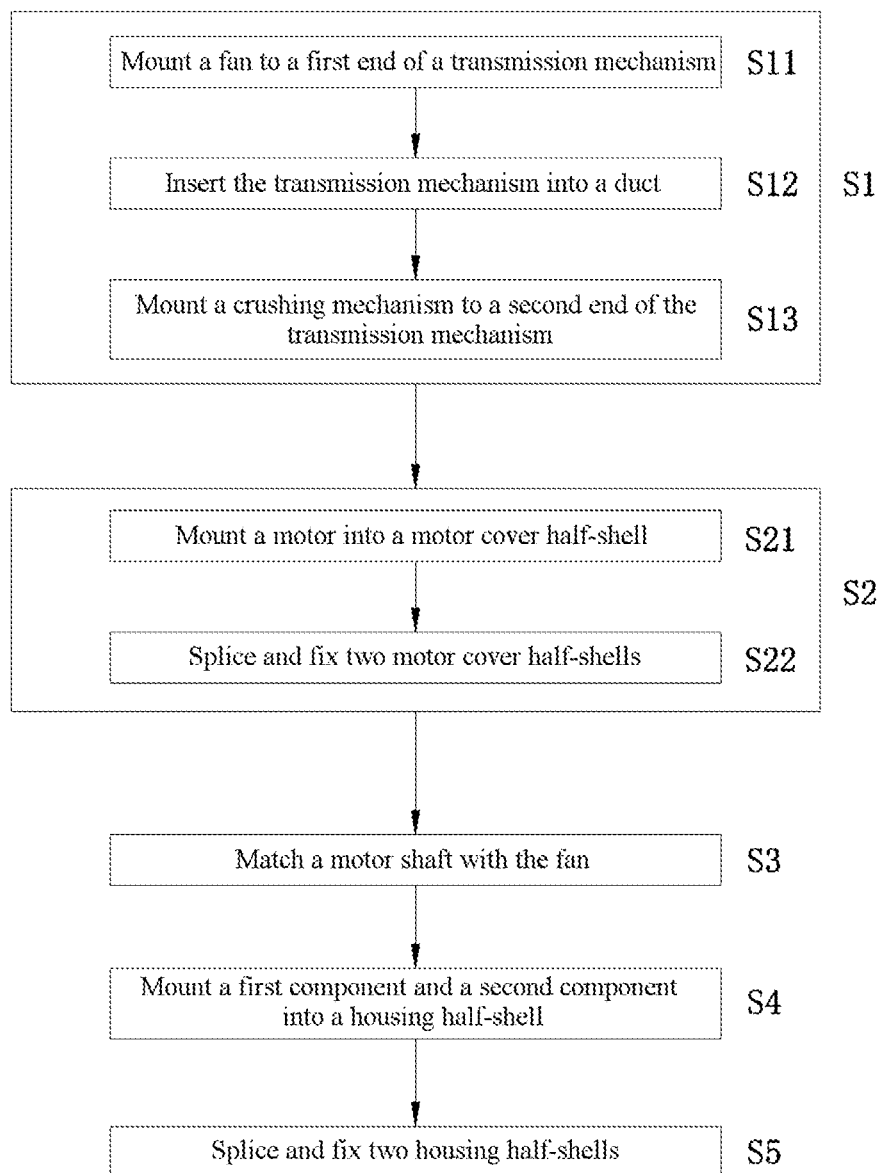
FIG. 38 is a schematic flowchart of assembly of the blowing-suction device according to the present invention.

In step S3, the first component and the second component are connected. As shown in FIG. 36, specifically, the motor shaft 42 extending out of the motor cover 44 in the second component is matched with the fan 3 in the first component. The connecting hole 33 of the fan 3 is a through hole, of which one side is connected to the transmission mechanism 7 and the other side is connected to the motor shaft 42. A specific connection manner may be the flat-square connection or splined connection mentioned above. Upon completion of connection, the first component and the second component are substantially front-back arranged along a longitudinal direction.

In step S4, the first component and the second component connected together are mounted into a housing half-shell. As shown in FIG. 36, similarly, the housing half-shell has a positioning structure fitting in with the first component and the second component. The positioning structure may be a positioning rib or the like. At the same time, the control switch that controls the movement manner of the motor 4 is also connected to a circuit pin of the motor 4 through an electric wire.

In step S5, as shown in FIG. 36, the other housing half-shell and the housing half-shell in S4 are spliced along the double-end line direction in the figure and are fixedly connected through a fixing element. In this way, assembling of the main body 10 of the blowing-suction device 1 is completed.

Regarding the blowing-suction device in another embodiment as shown in FIG. 17 and FIG. 18, the structure of the blowing-suction device 1 in this embodiment is basically the same as that of the blowing-suction device shown in FIG. 1. Description is made in the following in terms of differences between two embodiments: in this embodiment, a first side edge 681 and a second side edge 682 forming a cutting blade of the crushing mechanism 6 are arc-curved, so that the whole cutting blade is substantially S-shaped. At the same time, the cutting blade also has a smaller sectional area. In this embodiment, there is a shorter distance between the first side edge 681 and the corresponding second side edge 682, and preferably, the maximum distance is less than 20 mm. A fitting portion 59 of the duct 5 has a regular structure. The whole fitting portion 59 is similar to a funnel structure, and consists of a conical body 591 whose radius gradually increases and a cylindrical skirt body 592 connected to the end of the conical body 591. The conical body 591 is further provided with a cooling inlet 441'. A safety shield 121 is further disposed at the first opening 12. The safety shield 121 is located at a longitudinal rear end of the motor cover 44. FIG. 18 is a sectional view of the blowing-suction device in FIG. 17. It can be seen from the figure that the crushing mechanism 6 and the transmission shaft 71 of the fan 3 are disposed through the duct 5. The transmission shaft 71 is provided with a supporting bearing 72 playing a role of supporting. The supporting bearing 72 is further provided with a damping element 73. The damping element 73 plays a role of weakening vibration generated by the transmission shaft 71 and then transferring the vibration to the duct 5. The damping element 73 may be a rubber ring or rubber cap or the like sleeving the supporting bearing 72.

As shown in FIG. 18, a distance between the fan 3 and the stationary blade 52 of the duct 5 is preferably 5 mm to 20 mm. The distance L is defined as a longitudinal distance from the tail end of the stationary blade 52 to a plane P that the fan 3 rotates to form and passes through the center of the fan 3. The tail end of the stationary blade 52 refers to one end of the stationary blade 52 close to the fan 3. The stationary blade 52 has a longitudinal length, and the tail end of the stationary blade 52 refers to an end portion closest to the fan 3 along a longitudinal direction. The fan 3 rotates to form a rotation plane P perpendicular to the fan axis 39. As the fan axis 39 is disposed along a longitudinal direction, an extending direction of the rotation plane P of the fan 3 is perpendicular to the longitudinal direction, while the rotation plane P of the fan 3 passes through the center C of the fan 3. Besides, the width of the free end 36 of the blade 32 of the fan 3 is a chord length d, as shown in FIG. 3. In this embodiment, a ratio of the distance L to the chord length d is 0.3 to 1.5, which can ensure that the blowing performance of the blowing-suction device 1 is relatively high. If the ratio is less than 0.3, it indicates that the distance L is shorter and the fan 3 is too close to the duct 5, so that the performance of the fan 3 cannot be fully utilized, thus not conducive to generating higher blowing efficiency. If the ratio is greater than 1.5, it indicates that the distance L is longer and the fan 3 is too away from the duct 5, which is not conducive to generating high blowing efficiency, either. Preferably, when the ratio of the distance L to the chord length d is 0.6, the blowing efficiency is the highest. By taking that the chord length d of the stationary blade 52 is 21 mm as an example, when the distance L is 6.3 mm, that is, when the ratio is 0.3, the air speed generated by the blowing-suction device 1 is about 42 m/s. When the distance reaches 12.6 mm, that is, when the ratio is 0.6, the air speed generated by the blowing-suction device 1 is about 45 m/s. Therefore, it can be seen that, with increase of the ratio, the air speed is increased to some extent, thus enhancing the efficiency. When the distance L is 18.9 mm, that is, when the ratio is 0.9, the air speed generated by the blowing-suction device 1 is about 42 m/s; it is thus clear that, when the ratio continuously increases, the air speed begins to decline. When the distance L is about 31.5 mm, that is, when the ratio is 1.5, the air speed generated by the blowing-suction device 1 is 36 m/s; it thus can be seen that the air speed declines significantly, and the working efficiency is not ideal. Therefore, in a preferred embodiment, the ratio is about 0.6, and when the chord length of the blade 32 of the fan 3 is 21 mm, the distance L is preferably 12.6 mm, and at this point, the working efficiency is the highest.

In the blowing mode, the duct 5 is located in a downstream region of the fan 3, the airflow blown out from the fan 3 produces a rectifying function when passing through the duct 5, so that turning directions of some airflow can be adjusted, thus reducing generation of eddy currents, making the whole airflow direction more uniform, and enhancing the blowing effect and efficiency of the airflow. Specifically, as the air needs to sequentially pass through the stationary blade 52 of the duct 5 and the blade 32 of the fan 3, the stationary blade 52 and the blade 32 of the fan 3 are disposed circumferentially around the axis. To avoid mutual interference in the circumferential direction and ensure that there may not be more overlapping of the blade in any phase of the circumferential direction to generate similar effect of superimposition of resonance, the number of the stationary blade 52 and the number of the blade 32 are set as mutual prime numbers. If the number of the stationary blade 52 and the number of the blade 32 are not 1 or divisors not the numbers per se, the stationary blade 52 and the blade 32 may be the same in phase at a time, thus generating turbulent flow similar to the effect of superimposition of resonance and affecting stability of the airflow. In this embodiment, the number of the stationary blade 52 is preferably 5-8. If the number of the stationary blade 52 is set to be too small, for example, 4 or 3, some air may directly pass through a gap between two stationary blades 52, while not deflected by the stationary blades 52. As a result, local eddy currents are generated, affecting the blowing efficiency of the whole airflow. If the number of the stationary blade 52 is set to be too great, for example, 9 or 10, although the diversion effect is good, as the stationary blades 52 are too dense, affecting the wind-through area of the air in the airflow channel 55, the air cannot flow smoothly, and the air speed is reduced. In this embodiment, the number of the stationary blade 52 is preferably 6. The number of the blade 32 of the fan 3 is correspondingly 11, and thus it can ensure that their numbers are mutual prime numbers. In another embodiment, the number of the stationary blade 52 is 7, and the number of the blade 32 is correspondingly 12. In this way, when the fan 3 rotates, at any time, the number of the blade 32 and the stationary blade 52 overlapping in phase is at most one.

Besides, it should be noted that, to further isolate the cooling channel and the airflow channel 55 and prevent mutual communication of the airflow, the motor cover 44 further includes a sealing element 443. The sealing element 443 is disposed at a transmission interface 45 of the motor cover 44. The reason for disposing the transmission interface 45 is making the motor shaft 42 pierce the transmission interface 45 outwards to be in transmission connection with the fan 3. As the radial dimension of the transmission interface 45 is definitely greater than that of the motor shaft 42, there is a gap between the transmission interface 45 and the motor shaft 42, and some air in the airflow channel 55 outside the motor cover 44 can enter the interior of the motor cover 44 through the gap, thus disturbing separate settings of the airflow channel 55 and the cooling channel. As shown, a sealing element 443 is disposed at the transmission interface 45, and the sealing element 443 can isolate the airflow channel 55 from the cooling channel, to prevent mutual circulation of the airflow in the two channels through the transmission interface 45. In this embodiment, the sealing element 443 is a barrel structure. Circumferential sidewalls of the barrel structure are physical barrel walls. Two ends in the extending direction of the barrel walls are disposed as openings. Therefore, the sealing element 443 is a run-through barrel structure. The motor shaft 42 runs through, in a hollowing way, the interior of the sealing element 443. One end of the sealing element 443 is mounted to the transmission interface 45, and the other end is located inside the motor cover 44. Specifically, the end of the sealing element 443 is connected to a support structure 46 of the motor 4. Further, the sealing element 443 abuts against a front bracket 461 of the support structure 46. The front bracket 461 is provided with an supporting bearing 464 supporting the motor shaft 42, and the supporting bearing 464 only accommodates gapless passing of the motor shaft 42. Therefore, the supporting bearing 464 can seal the opening of the end of the sealing element 443, and isolates the interior of the motor cover 44 from the exterior of the motor cover 44. Meanwhile, the transmission effect of the motor shaft 42 would not be affected. With such a design, the airflow in the airflow channel 55 outside the motor cover 44 cannot enter the interior of the motor cover 44 due to the blocking of the barrel walls of the sealing element 443 and the supporting bearing 464. The airflow in the cooling channel inside the motor cover 44 cannot flow to the outside of the motor cover 44 also due to the blocking of the barrel walls of the sealing element 443 and the supporting bearing 464. Therefore, with the sealing element 443, separateness of the airflow channel 55 and the cooling channel can be ensured, preventing mutual interference and further enhancing the working efficiency. The structure in which the sealing element 443 is connected to the transmission interface 45 and the support structure 46 may be a shape-matched clamping structure such as a boss or a slot.

Figure 19:
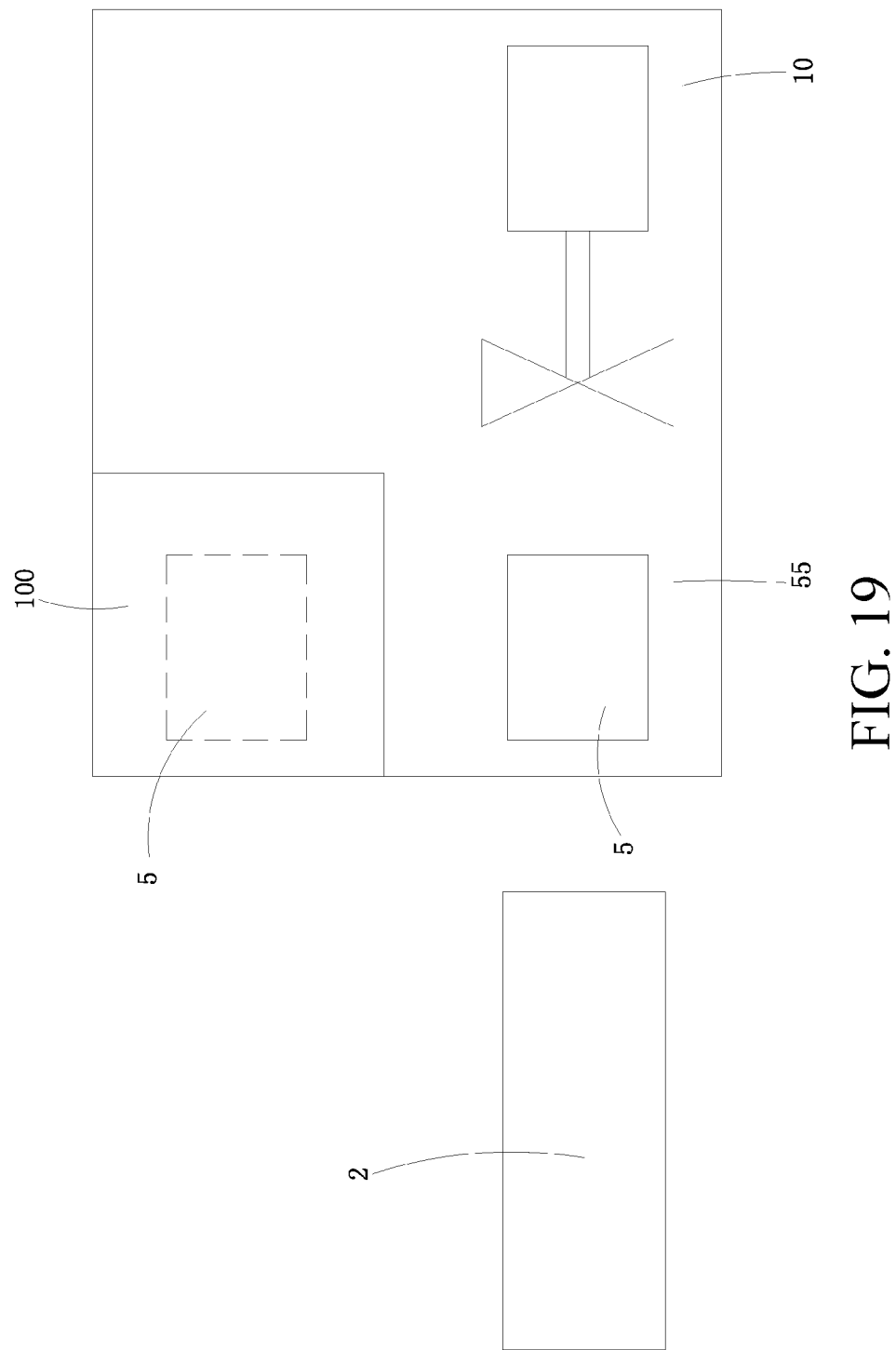
FIG. 19 is a schematic diagram of movement of a duct of the blowing-suction device according to the third embodiment of the present invention.

In the embodiment as shown in FIG. 19, the blowing-suction device 1 may further include a removal mechanism that removes the duct 5 from the airflow channel and an accommodating cavity 100 that can accommodate the duct 5. In the blowing-suction device 1 where the air pipe is a single pipe, it is a preferred solution that the duct 5 is set to be movable. The duct 5 selectively moves into the airflow channel 55 or the airflow channel 55 is removed. An accommodating cavity 100 that can accommodate the duct 5 wholly is further preferably near the airflow channel 55. After the duct 5 moves to the accommodating cavity, the duct 5 completely leaves the airflow channel 55. Thus, smoothness of the airflow channel 55 during suction is ensured. After the duct 5 moves to the airflow channel 55, during blowing, the duct 5 can divert the passing airflow. The manner in which the removal mechanism moves the duct 5 may also include translation or rotation. In an embodiment of translation, the removal mechanism may include a guide rail that slides the duct 5 and a controller that controls the duct 5 to slide on the guide rail. In an embodiment of rotation, the removal mechanism may include a cartridge mechanism similar to that in a revolver. Operating the rotation mechanism can rotate and shift the duct 5 wholly around an axis, thus removing the duct 5 from the airflow channel. The duct 5 is rotated to go back to the position in the airflow channel. The axis may be in a position outside the center of the duct 5. The rotation angle may also be preferably 90 degrees, 180 degrees, or the like.

In another embodiment as shown in FIG. 20, the motor 4 of the blowing-suction device 1 is located in the motor housing 143, and the fan axis 39 of the fan 3 is disposed in parallel to the axis 41 of the motor 4. To achieve their transmission effect, a transmission element 47 is further disposed between the motor 4 and the fan 3. The motor 4 drives the fan 3 to rotate through the transmission element 47. The transmission element 47 may be an element that can change the transmission angle such as a common belt or bevel gear. The fan 3 and the motor 4 are not front-back arranged longitudinally, but the fan 3 and the motor 4 are disposed side by side along a longitudinal direction. In this way, the whole longitudinal dimension of the blowing-suction device 1 can be reduced, and the motor 4 is not located in a path through which the airflows. Those skilled in the art can easily think of that the fan axis 39 of the fan 3 and the axis 41 of the motor 4 may also be disposed at an angle, for example, an acute angle. The air pipe 2 is the same as that in the previous embodiment.

Figure 21:
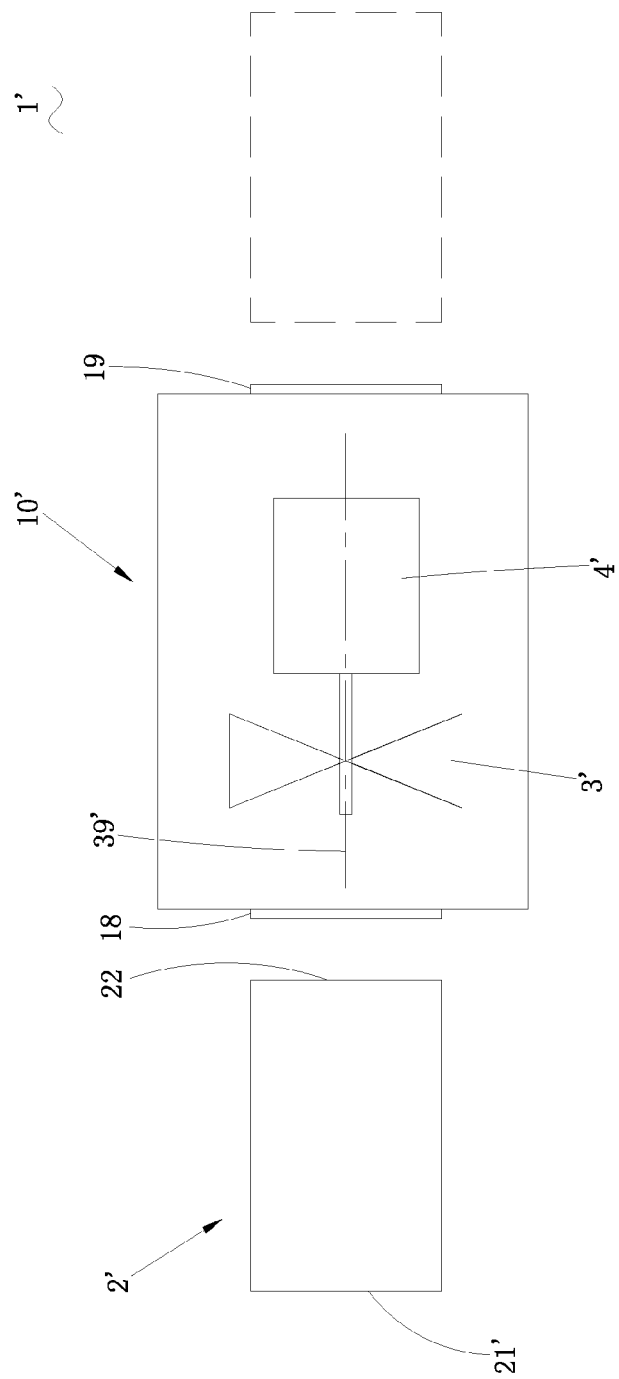
FIG. 21 is a schematic diagram of the blowing-suction device according to the fifth embodiment of the present invention.
Figure 22:
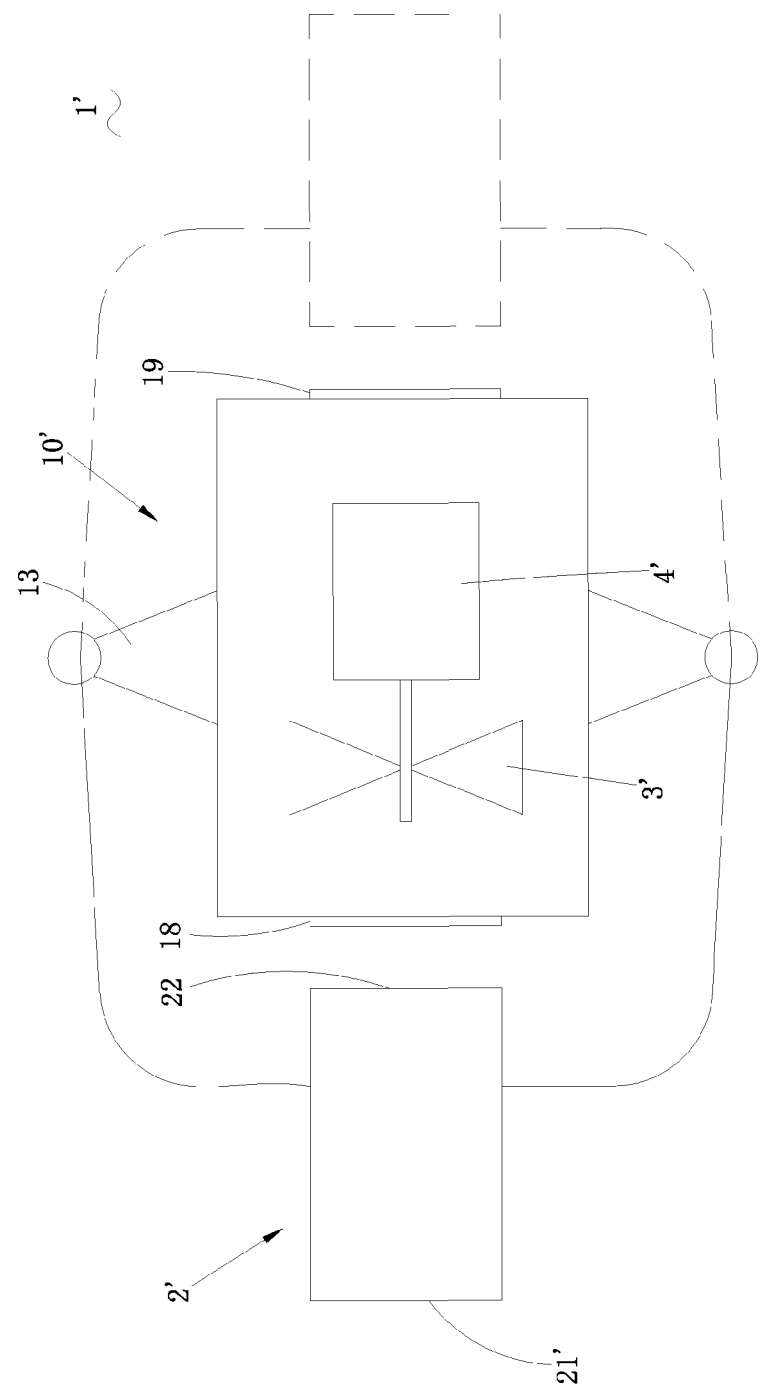
FIG. 22 is a schematic diagram of a blowing-suction device according to a sixth embodiment of the present invention.

In another embodiment as shown in FIG. 21, the blowing-suction device 1' also includes an air pipe 2' and a main body 10'. The number of the air pipe 2' is also one. One end of the air pipe 2' is a pipe orifice 21', and the other end is a joint 22 for connecting the main body 10'. Different from the previous embodiment, the main body 10' has at least two different connecting ports, which are a first connecting port 18 and a second connecting port 19 respectively. Moreover, the joint 22 of the air pipe is selectively matched with the first connecting port 18 and the second connecting port 19. Preferably, the first connecting port 18 and the second connecting port 19 are located on two sides of the fan 3' located in the main body 10' respectively. Projections of the first connecting port 18 and the second connecting port 19 on a plane perpendicular to the fan axis 39' of the fan 3' are at least partially the same. After the air pipe 2' is selectively connected to a corresponding connecting port, the blowing-suction device 1' also naturally switches to the corresponding operating mode. For example, when the joint 22 of the air pipe 2' is connected to the first connecting port 18 of the main body 10', the blowing-suction device 1' is in the blowing mode. After the motor 4' begins to operate, airflow generated by the fan 3' is blown out of the pipe orifice 21' of the air pipe 2' through the first connecting port 18. When the joint 22 of the air pipe 2' is connected to the second connecting port 19 of the main body, the blowing-suction device 1' switches to the suction mode. After operation, the airflow is suctioned from the pipe orifice 21' of the air pipe 2' and passes through the second connecting port 19. It should be noted that, in this embodiment, the fan 3' does not need to change a rotation direction in the blowing or suction mode, and always only rotates along one direction. The airflow channel in the blowing mode is different from the airflow channel in the suction mode. The fan 3' preferably includes an axial fan, a mixed flow fan or the like that can generate airflow axially moving along the fan. Certainly, the main body 10' and the air pipe 2' may be preferably connected detachably. When operation is not needed, the main body 10' and the air pipe 2' may be detached into two separate parts for respective storage, and when operation is needed, the air pipe 2' chooses to be fixedly connected to one connecting port in the main body 10'. In another embodiment shown in FIG. 22, the air pipe 2' may be connected to the main body 10' in the form of rotating relative to the main body 10'. The main body 10' is provided with a pivot 13 which can drive the air pipe 2' to rotate to different positions around its axis. Thus, connection of the air pipe 2' with one connecting port is achieved. In this preferred embodiment, in the process that the air pipe 2' rotates from the position where it is connected to the first connecting port 18 to the position where it is connected to the second connecting port 19, the rotation angle is 180 degrees. Certainly, those skilled in the art can think of employing a structure that implements relative linear movement between the air pipe and the main body.

Figure 25:
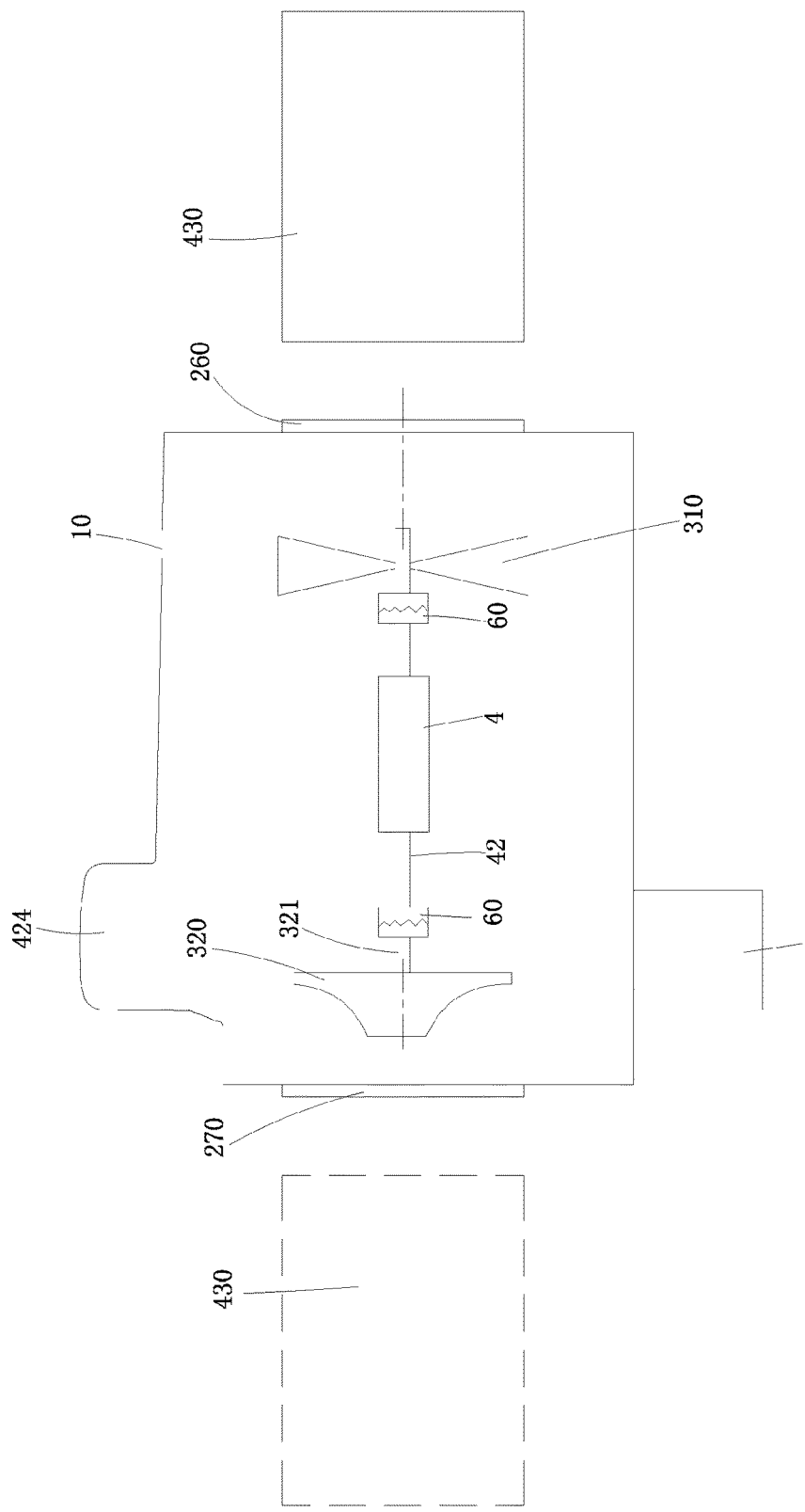
FIG. 25 is a schematic diagram of a blowing-suction device according to an eighth embodiment of the present invention.

FIG. 25 shows another embodiment of the present invention. In this embodiment, the blowing-suction device 1 includes a first fan 310 and a second fan 320, and the first fan 310 and the second fan 320 are both located in a main body 10. A motor 4 is located between the first fan 310 and the second fan 320, and are connected to the first fan 310 and the second fan 320 respectively. A clutch device 60 is disposed between a motor shaft 42 and the first fan 310, the second fan 320. The main body 10 is provided with a first opening 260 and a second opening 270. In this embodiment, an outlet pipe 423 and a spiral channel 424 are both disposed on the main body 10, and are disposed near the second opening 270 of the main body 10. In a preferred embodiment, a same air pipe 430 may be employed as a blowing pipe and a suction pipe. In the blowing mode, the air pipe 430 is mounted to the first opening 260, the motor 4 drives the first fan 310 to operate, and airflow is blown out from the air pipe. When the blowing mode is switched to the suction mode, the air pipe 430 is removed from the first opening 260 and mounted to the second opening 270, the motor 4 drives the second fan 320 to operate, and the air is suctioned from the air pipe 430 and discharged from the outlet pipe 423 on the main body 10.

Figure 26:
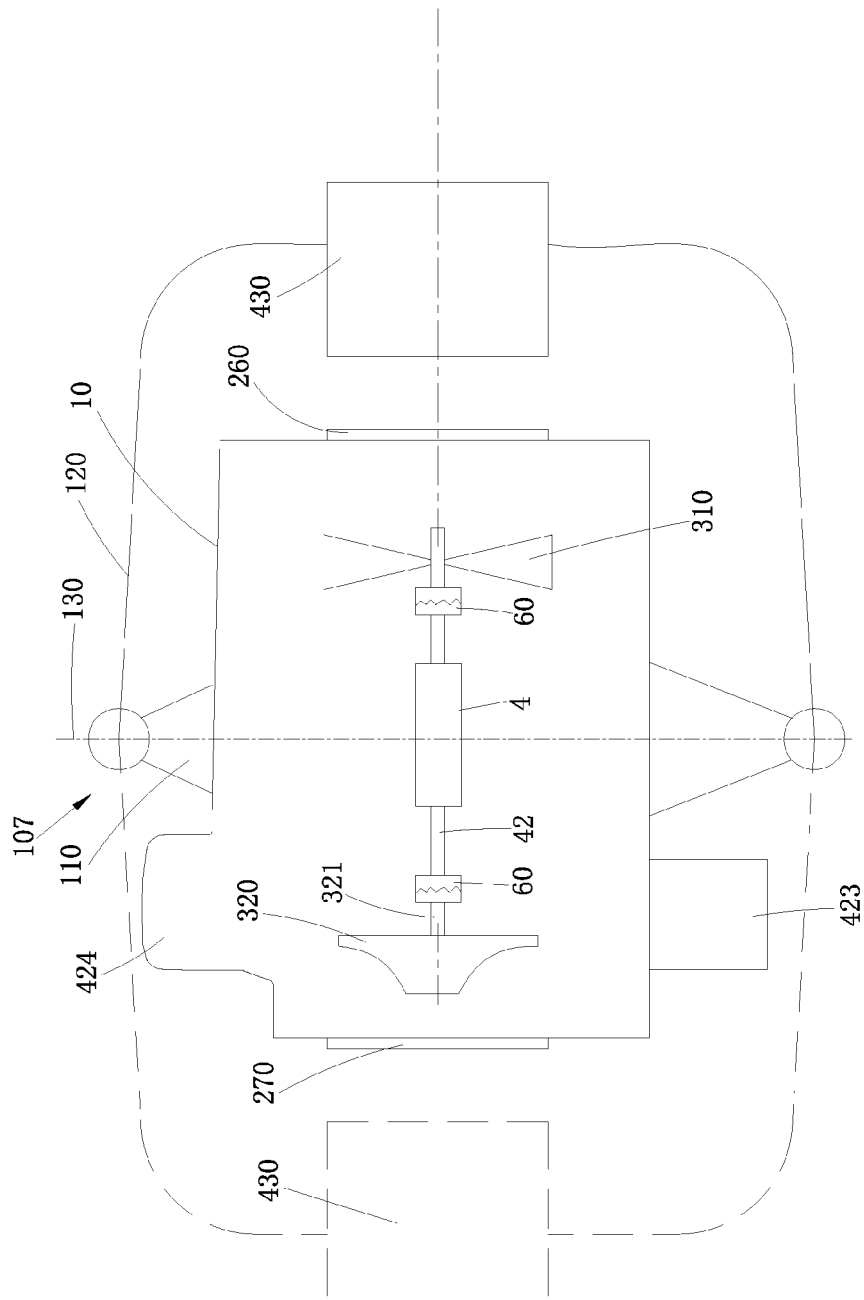
FIG. 26 is a schematic diagram of a blowing-suction device according to a ninth embodiment of the present invention.

FIG. 26 shows another embodiment of the present invention. In this embodiment, one air pipe 430 is still taken as a blowing pipe or a suction pipe. Different from the fifth embodiment, the blowing-suction device 1 is provided with a pivoting device 107 connecting the air pipe and the main body 10. The pivoting device 107 may control the air pipe 430 to change the position relative to the main body 10. The pivoting device 107 rotates around the pivot 130. The pivoting device 107 further includes a first connecting arm 110 connecting the main body 10 and a second connecting arm 120 connecting the air pipe 430. As shown in FIG. 26, in the blowing mode, the air pipe 430 moves to a position where it fits the first fan 310, and at this point, the air pipe 430 is used as a blowing pipe. When it is switched to the suction mode, it is unnecessary to remove the air pipe, the air pipe is moved, through the pivoting device, to a position where it fits the second fan 320, and at this point, the air pipe 430 is used as a suction pipe.

Figure 27:
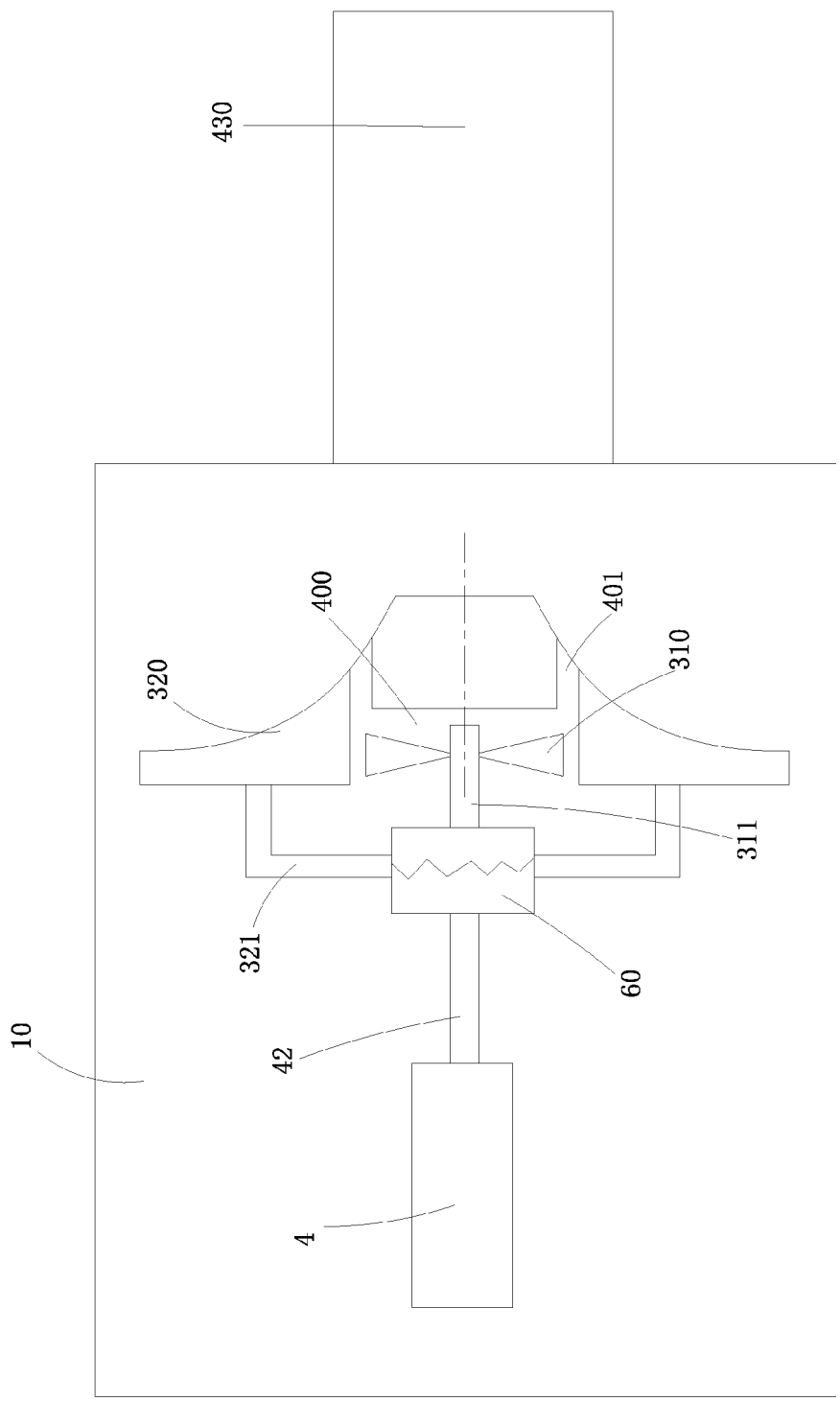
FIG. 27 is a schematic diagram of a blowing-suction device according to a tenth embodiment of the present invention.

FIG. 27 shows another embodiment of the present invention. In this embodiment, one air pipe 430 is still taken as a blowing pipe or a suction pipe, and the air pipe 430 does not need to move during switching of the blowing and suction modes and can be fixedly connected onto the main body 10 all the time. A first fan 310 and a second fan 320 are disposed in the main body 10. The first fan 310 is an axial fan, and has an axial blade and a first rotating shaft 311. The second fan 320 is a centrifugal fan, and has a centrifugal blade and a second rotating shaft 321. The axial fan can move between a blowing position where the motor 4 drives the axial fan to rotate separately and a suction position where the motor 4 drives the axial fan and the centrifugal fan simultaneously. An accommodating cavity 400 accommodating the first fan 310 is disposed on the second fan 320. The first fan 310 is located in the accommodating cavity 400. A channel 401 in communication with the accommodating cavity 400 and the air pipe 430 is further disposed on the second fan 320. A clutch device is disposed between the first rotating shaft 311 of the first fan 310, the second rotating shaft 321 of the second fan 320 and the motor shaft 42. In the blowing mode, the motor shaft 42 is in power connection with the first rotating shaft 311 through the clutch device, while breaks power connection with the second rotating shaft 321, so that the motor 4 drives the first fan 310 to rotate. Airflow generated by the first fan 310 passes through the channel of the second fan 320, and is blown to the outside from the air pipe 430. When it is switched to the suction mode, the motor shaft 42 is in power connection with the second rotating shaft 321 through the clutch device, while breaks power connection with the first rotating shaft 311. The motor 4 can drive the second fan 320 to rotate, thus suctioning the airflow from the air pipe 430.

Figure 28:
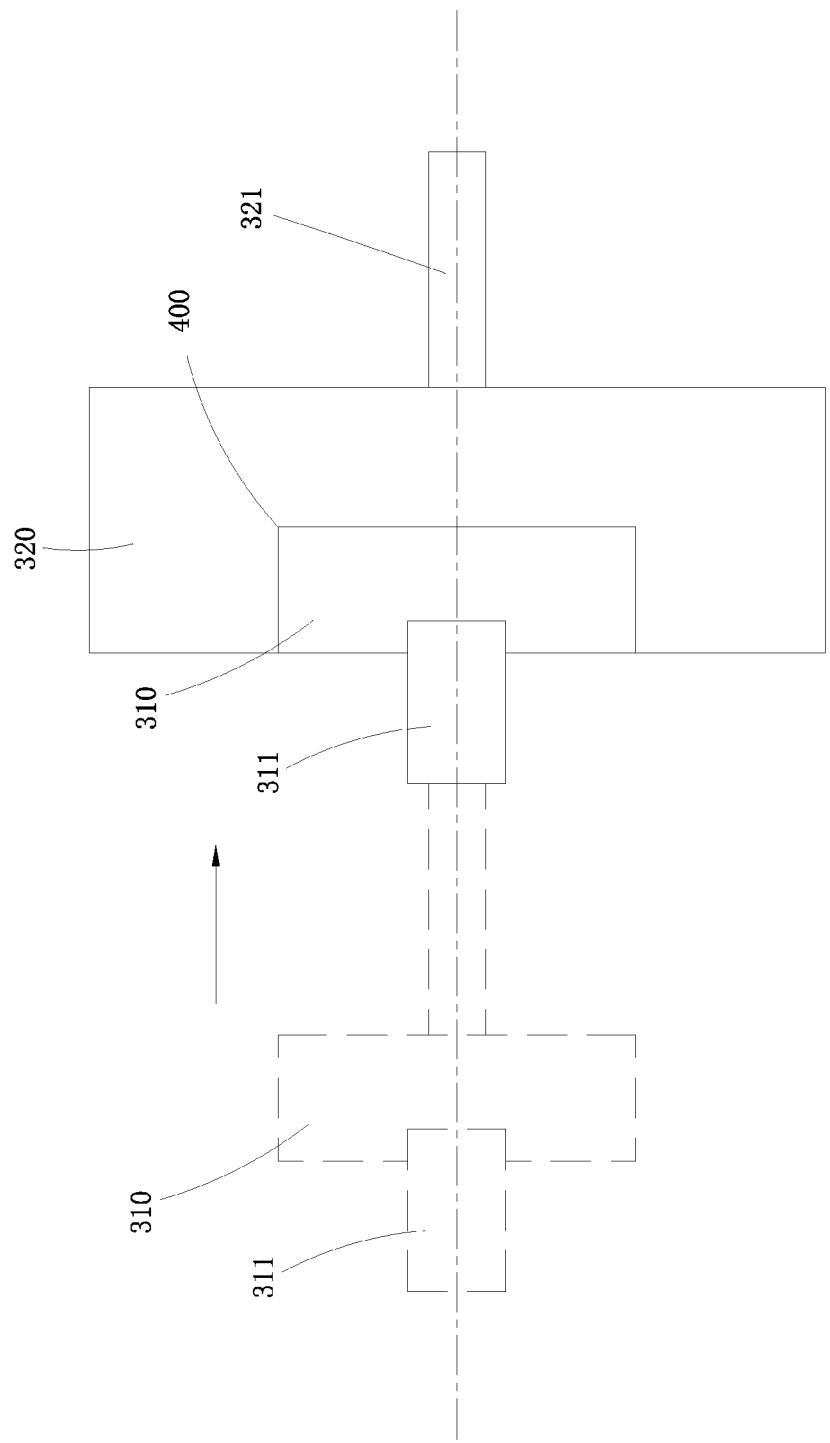
FIG. 28 is a schematic diagram of a blowing-suction device according to an eleventh embodiment of the present invention.

FIG. 28 shows another embodiment of the present invention. In this embodiment, the blowing-suction device still includes a first fan 310 and a second fan 320. The first fan 310 is an axial fan, and the second fan 320 is a centrifugal fan. The first fan 310 movably cooperates with the second fan 320. In the blowing mode, the first fan 310 as the axial fan operates, but does not cooperate with the second fan the second fan 320. The second fan 320 as the centrifugal fan does not operate. In the suction mode, the first fan 310 moves to a position where it cooperates with the second fan 320, so that the second fan 320 and the second fan 320 work together. As shown in FIG. 28, the second fan 320 has an accommodating cavity 400, and the first fan 310 may move along an axial direction of the first rotating shaft 311. When the first fan 310 is received in the accommodating cavity 400 of the second fan 320, blades of the first fan 310 are aligned with blades of the second fan 320, to form mixed-flow blades. In the blowing mode, the first fan 310 works separately and generates airflow, while the second fan 320 does not operate. In the suction mode, blades of the first fan 310 and blades of the second fan 320 make up blades of the mixed flow fan, so that the first fan 310 and the second fan 320 wholly form a mixed flow fan. The motor 4 drives the first fan 310 and the second fan 320 to work together, so that the mixed flow fan rotates and generates airflow.

In another embodiment as shown in FIG. 23 and FIG. 24, the blowing-suction device 1' also includes an air pipe 2' and a main body 10'. The number of the air pipe 2' is also one. Different from the previous embodiment, two ports on two ends of the air pipe 2' are both selectively connected to the main body 10'. For ease of description, the two ports of the air pipe 2' are a first port 23 and a second port 24 respectively. The main body 10' is preferably only provided with a connecting port 25. Through connections between different ports of the air pipe 2' and the main body 10', the blowing-suction device switches the operating mode correspondingly. For example, after the first port 23 of the air pipe is connected to the connecting port 25 on the main body 10', at this point, the second port 24 serves as a free end of the air pipe 2', and the blowing-suction device 1' is in the blowing mode. After the motor 4' drives the fan 3' to operate, airflow is blown out from the second port 24 of the air pipe 2'. After the second port 24 of the air pipe 2' is connected to the connecting port 25 of the main body 10', the first portion 23 of the air pipe 2' serves as the free end of the air pipe 2', and the blowing-suction device 1' is in the suction mode. After the motor 4' drives the fan 3' to operate, the airflow is suctioned into the main body 10' from the first port 23 of the air pipe 2'. Certainly, in this embodiment, the fan also preferably includes an axial fan, a mixed flow fan and the like that can generate airflow moving axially along the fan. Different from the previous embodiment, the fan 3' can rotate along two different directions. In the blowing mode, the fan 3' rotates along a first direction, and in the suction mode, the fan 3' rotates along a second direction. It should be particularly noted that, in this embodiment, the air pipe is preferably not a straight pipeline, but changes in thickness. The air pipe 2' is substantially cone-shaped, and the radius of the first port 23 is greater than that of the second port 24, so that the sectional area of the first port 23 is greater than that of the second port 24. In this way, in the blowing mode, airflow blown out from the second port 24 with a smaller sectional area can obtain a higher air speed, enhancing the blowing effect. In the suction mode, the airflow is suctioned from the first port 23 with a larger sectional area, which can prevent foreign matters from forming blockage at the port to affect the suction effect. Certainly, to enable the connecting port 25 of the main body 10' to be connected to the ports of the air pipe having different thicknesses, the connecting port 25 has a first connecting portion 26 matching the first port 23 and a second connecting portion 27 matching the second port 24. In this embodiment, the connecting port 25 preferably has a step structure similar to a step or a cone-shaped structure similar to a funnel. That is to say, the first connecting portion 26 and the second connecting portion 27 cooperate to form a circumferential step structure or form a cone-shaped structure with a gradient radius. Besides, it should be noted that, as different ports of the air pipe fit the connecting port in different positions, the effective length of the air pipe 2' in the blowing and suction modes also varies. The effective length refers to a distance from the connecting port to the free end of the air pipe.

In another embodiment as shown in FIG. 41, the blowing-suction device 1 also includes a main body 10 and an air pipe 2 detachably connected to the main body 10. A first opening 12 is disposed on the main body 10. An airflow generation device is disposed in the main body 10 for generating airflow. When the blowing-suction device 1 is in the blowing mode, under the driving of the airflow generation device, the air enters the main body 10 from the first opening 12, and is blown out from the air pipe 2 connected to the main body 10. When the blowing-suction device 1 switches to the suction mode, under the driving of the airflow generation device, the air, along with leaves and dust, enters from the air pipe and is discharged from the first opening 12. Certainly, the first opening 12 may be disposed in different positions of the main body 10. In this embodiment, the airflow generation device includes a contra-rotating axial flow mechanism 500 and a motor 501 for driving the contra-rotating axial flow mechanism 500. The contra-rotating axial flow mechanism 500 includes at least one pair of axial fans. The pair of axial fans can generate airflow moving along different directions, and generates, in the blowing mode, airflow moving towards the air pipe 2, while generates, in the suction mode, airflow moving towards the first opening 12. The pair of axial fans in the contra-rotating axial flow mechanism 500 are disposed close to each other, thus producing a contra-rotating effect therebetween. The pair of axial fans include a first axial fan 502 and a second axial fan 503. The distance between the first axial fan 502 and the second axial fan 503 is between a 0.01-times axial fan diameter to a 0.5-times axial fan diameter. The first axial fan 502 and the second axial fan 503 both can rotate around respective rotation axes. In this embodiment, rotation axes of the first axial fan 502 and the second axial fan 503 coincide with each other, that is to say, the first axial fan 502 and the second axial fan 503 rotate around the same rotation axis. In the embodiment of the present invention, the first axial fan 502 and the second axial fan 503 are driven to rotate simultaneously all the time. Further, the first axial fan 502 and the second axial fan 503 rotate along opposite directions. That is to say, when the first axial fan 502 rotates clockwise, the second axial fan 503 rotates anticlockwise. When the first axial fan 502 rotates anticlockwise, the second axial fan 503 rotates clockwise. Owing to the contra-rotating effect of the first axial fan 502 and the second axial fan 503, the airflow passing through the contra-rotating axial flow mechanism 500 always keeps moving along the direction of the rotation axis.

Figure 43:
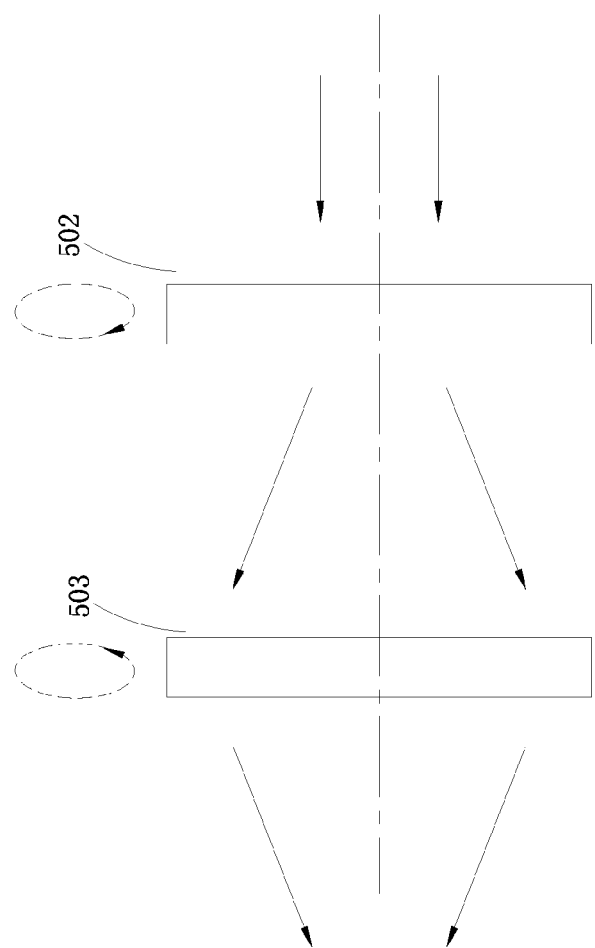
FIG. 43 is a schematic diagram showing that the air passes through the contra-rotating axial flow mechanism in FIG. 41.

The first axial fan 502 and the second axial fan 503 have several blades arranged circumferentially around the rotation axis. As shown in FIG. 42, the rotating direction of the blades of the first axial fan 502 is along the direction of the arrow AA' in the figure, that is, the anticlockwise direction. The rotating direction of the blades of the second axial fan 503 is along the direction of the arrow BB' in the figure, that is, the clockwise direction. Therefore, the rotating directions of the blades of the first axial fan 502 and the second axial fan 503 are opposite. As shown in FIG. 43, when airflow passes through the first axial fan 502, due to the reason of the rotating direction of the blades of the axial fan, the airflow always deviates from a direction away from the axis. When the deviating airflow passes through the second axial fan 503, due to the opposite rotating direction of the second axial fan 503, the airflow moves towards a direction close to the axis. Therefore, the airflow passing through the two-stage axial fans can ensure movement along the direction of the rotation axis. In this embodiment, the blowing-suction device 1 does not need to be provided with a duct mechanism for diversion. In the absence of the duct mechanism, in the suction mode, the air, along with particles such as leaves and dust, directly passes through the contra-rotating axial flow mechanism 500 in the main body 10, and does not need to pass through an additional crushing mechanism, so that the passing efficiency of the particles can be improved.

Figure 44:
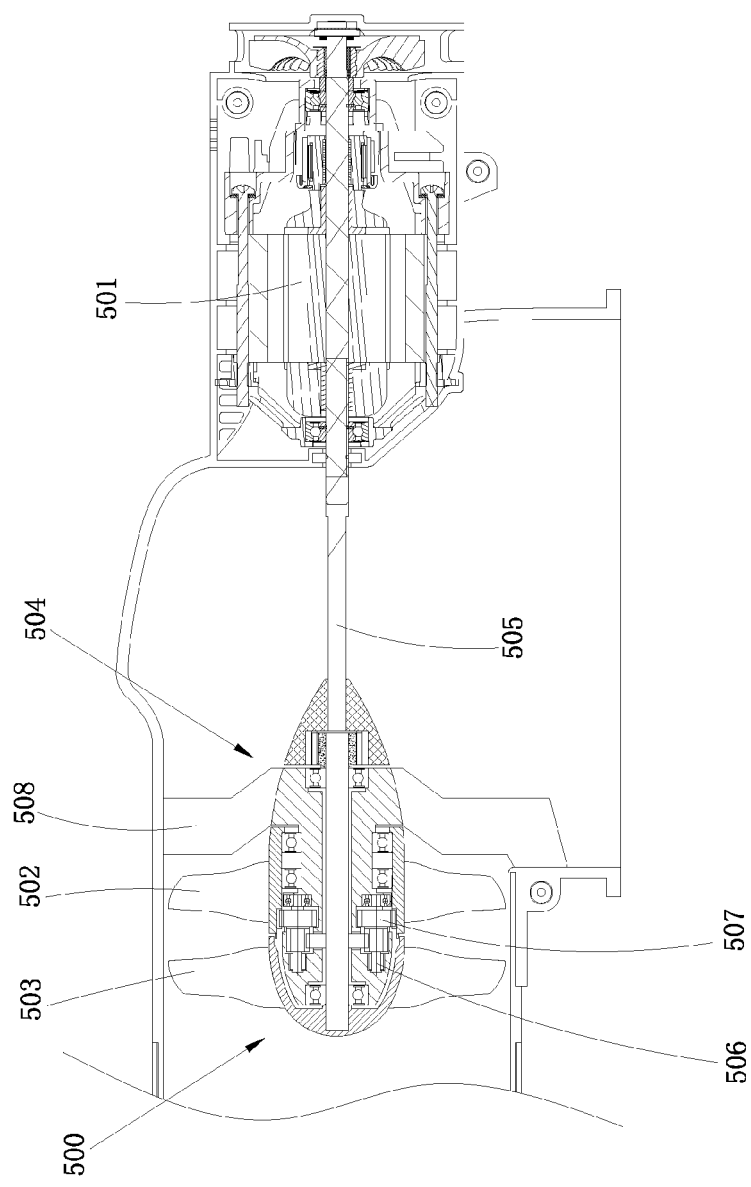
FIG. 44 is a schematic diagram showing that a motor of the blowing-suction device of FIG. 41 drives a contra-rotating axial flow mechanism.

To enable the motor 501 to drive the first axial fan 502 and the second axial fan 503 to rotate simultaneously, in the embodiment as shown in FIG. 41 and FIG. 44, the blowing-suction device 1 further includes a transmission device 504 connecting the first axial fan 502 and the second axial fan 503. The transmission device 504 is connected to the motor 501, and also can simultaneously drive the first axial fan 502 and the second axial fan 503 to rotate in opposite directions. As shown in FIG. 44, the transmission device 504 includes a connecting shaft 505 connecting the motor 501, a first gear set 506 connecting the first axial fan 502 and a second gear set 507 connecting the second axial fan 503. The first gear set 506 and the second gear set 507 are both in engaging transmission with the connecting shaft 505. The first gear set 506 and the second gear set 507 have different transmission engaging directions to be in transmission connection with the connecting shaft 505. Therefore, when the connecting shaft 505 is driven by the motor 501 to rotate, it can drive the first gear set 506 and the second gear set 507 to rotate in opposite directions, so that the first axial fan 502 and the second axial fan 503 simultaneously rotate in opposite directions. The blowing-suction device 1 further includes a support device 508 supporting the connecting shaft 505. The support device 508 includes a bracket structure. It can be seen from this embodiment that the number of the motor 501 is one. In the blowing mode, the user controls the motor 501 to rotate along a first direction, and through driving of the transmission device 504, the second axial fan 503 rotates anticlockwise while the first axial fan 502 rotates clockwise; therefore, the whole contra-rotating axial flow mechanism 500 generates airflow blown towards the air pipe 2. In the suction mode, the user controls the motor 501 to rotate along a second direction opposite to the first direction, and through the transmission device 504, the second axial fan 503 rotates clockwise while the first axial fan 502 rotates anticlockwise; therefore, the whole contra-rotating axial flow mechanism 500 generates airflow suctioned from the air pipe 2.

Figure 46:
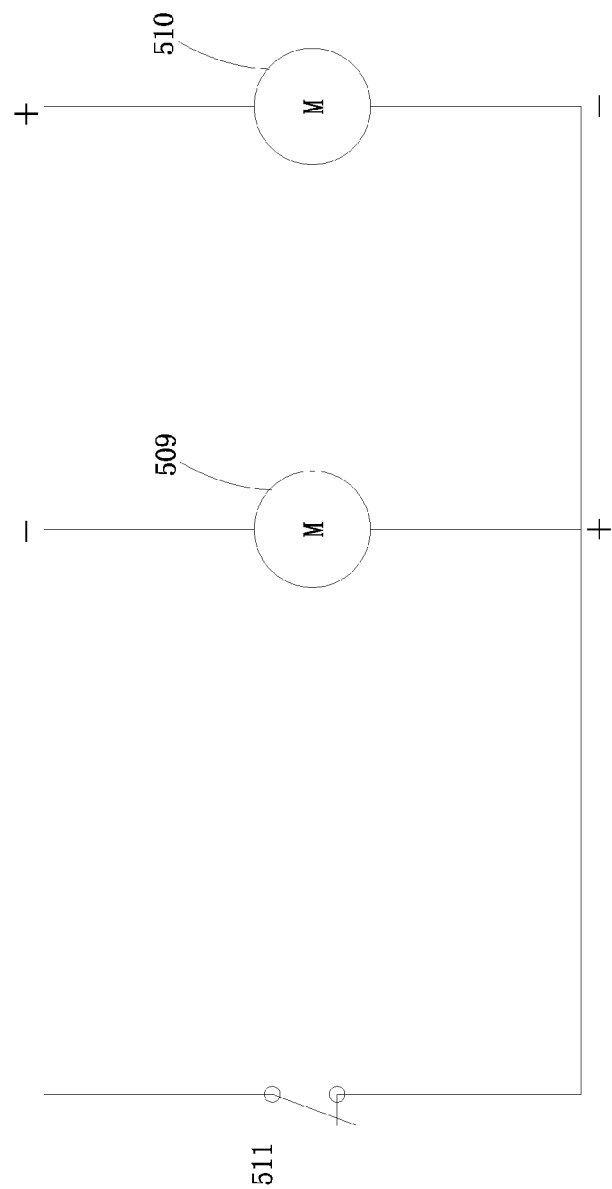
FIG. 46 is a schematic diagram showing that the control mechanism in FIG. 42 controls a first motor and a second motor.

In the embodiment as shown in FIG. 45, the blowing-suction device 1 also has a contra-rotating axial flow mechanism 500 including a first axial fan 502 and a second axial fan 503. The difference lies in that the motor 501 includes a first motor 509 and a second motor 510 disposed separately. The first motor 509 is connected to the first axial fan 502 separately and used for driving the first axial fan 502 to rotate. The second motor 510 is connected to the second axial fan 503 separately and used for driving the second axial fan 503 to rotate. The blowing-suction device 1 further includes a control mechanism 511 controlling the first motor 509 and the second motor 510. The control mechanism 511 controls the first motor 509 and the second motor 510 to rotate in opposite directions, and then drives the first axial fan 502 and the second axial fan 503 to rotate along opposite directions. The control mechanism 511 may drive the two motors in the form of a PCB board. In this embodiment, the number of the motor 501 is at least two. In one embodiment therein, as shown in FIG. 46, the anode of the first motor 509 and the cathode of the second motor 510 are connected in parallel to electrical terminals on the other end of the control mechanism 511. When the control mechanism 511 moves to a first position where the circuit is on, the first motor 509 and the second motor 510 just rotate in opposite directions simultaneously. When the control mechanism 511 moves to a second position where the circuit is on, the first motor 509 and the second motor 510 simultaneously change the rotating directions respectively, and then the first motor 509 and the second motor 510 still keep opposite rotating directions.

Besides, those skilled in the art can think of that the contra-rotating axial flow mechanism 500 may also be used in the blower that can only perform a blowing function, thus improving the axial blowing performance.

The above embodiments merely express several implementations of the present invention, and are described specifically and in detail, but cannot be thus understood as limitations to the patent scope of the present invention. It should be indicated that those of ordinary skill in the art can also make transformations and improvements without departing from the concept of the present invention, all of which belong to the protection scope of the present invention.

What is claimed is:

1. A blowing-suction device, comprising:
a housing having a first opening in communication with the outside;
an air pipe connected to the housing and having a pipe orifice in communication with the outside; and
an airflow generation device operably generating airflow, wherein the airflow generation device comprises a fan and a motor configured to rotate the fan;
a garbage collection device connected to the first opening;
wherein the blowing-suction device is configured to clean when the blowing-suction device is in a blowing mode and the airflow enters the housing from the first opening and is blown out from the pipe orifice and the airflow is configured to concentrate foreign matter, and when the blowing-suction device is in a suction mode, the foreign matter enters the air pipe from the pipe orifice and passes through the fan along with the airflow and the foreign matter enters into the garbage collection device from the first opening.

2. The blowing-suction device according to claim 1, wherein there is only one air pipe, and when the blowing-suction device is in the blowing mode or the suction mode, the position of the air pipe relatively connected to the housing is unchanged.

3. The blowing-suction device according to claim 2, wherein the pipe orifice is at one end of the air pipe, and the other end of the air pipe is provided with a connection port connected to the housing.

4. The blowing-suction device according to claim 1, wherein the housing further has a joint connected to the air pipe, and when the blowing-suction device is in the blowing mode or the suction mode, the air pipe is connected to the joint.

5. The blowing-suction device according to claim 4, wherein there is only one joint.

6. The blowing-suction device according to claim 4, wherein in the blowing mode, the airflow moves from the first opening to the joint along a straight line, and in the suction mode, the airflow moves from the joint to the first opening along a straight line.

7. The blowing-suction device according to claim 4, wherein the joint and the first opening are on two opposite sides of the airflow generation device.

8. The blowing-suction device according to claim 1, wherein the fan is configured to rotate around a fan axis along different directions, thus generating the airflow moving along different directions.

9. The blowing-suction device according to claim 8, wherein the fan comprises an axial fan, a moving direction of an airflow generated by the axial fan being parallel to the direction of the fan axis.

10. The blowing-suction device according to claim 8, wherein when the blowing-suction device is in the blowing mode, the fan rotates around the fan axis along a clockwise direction; and when the blowing-suction device is in the suction mode, the fan rotates around the fan axis along an anti-clockwise direction.

11. The blowing-suction device according to claim 8, wherein the motor is located between the fan and the first opening, so that the distance from the motor to the first opening is less than the distance from the fan to the first opening.

12. The blowing-suction device according to claim 8, wherein the fan, the motor, and the first opening are arranged sequentially along a straight line.

13. The blowing-suction device according to claim 12, wherein the housing further has a joint connected to the air pipe, and the joint, the fan, the motor, and the first opening are arranged sequentially along a straight line.

14. The blowing-suction device according to claim 8, wherein the blowing-suction device further comprises a crushing mechanism disposed between the axial fan and the pipe orifice, the crushing mechanism being used for crushing an object suctioned from the pipe orifice.

15. The blowing-suction device according to claim 14, wherein the blowing-suction device further comprises a duct guiding the airflow to pass through, the duct comprising a baffle extending along a longitudinal direction, stationary blades distributed circumferentially relative to the baffle, and a guide cover receiving the baffle and the stationary blades.

16. The blowing-suction device according to claim 8, wherein the motor controllably rotates around a motor shaft along clockwise and anticlockwise directions, and when rotating along the clockwise direction, the motor drives the fan to rotate along the first direction; when rotating along the anticlockwise direction, the motor drives the fan to rotate along the second direction.

17. The blowing-suction device according to claim 16, wherein the blowing-suction device further comprises a control switch that controls the rotation direction of the motor, the control switch selectively controlling the motor to rotate along the clockwise or anticlockwise direction.

18. The blowing-suction device according to claim 17, wherein the blowing-suction device further comprises a safety switch linking the control switch, and when the safety switch is triggered, the control switch can rotate the motor.

19. The blowing-suction device according to claim 18, wherein the housing further has a joint connected to the air pipe, and when the air pipe is connected to the joint, the safety switch is triggered.

20. A blowing-suction device, selectively operating in a blowing mode or a suction mode, comprising:
   a housing;
   an air pipe connected to the housing both in a blowing mode and a suction mode;
   an airflow generation device operably generating an airflow, in the blowing mode, the airflow being blown out from the air pipe, and in the suction mode, the airflow being suctioned from the air pipe; and
   a duct configured to guide the airflow to pass through, the duct comprising a deflector extending along a longitudinal direction, stationary blades distributed circumferentially relative to the deflector, and a guide cover receiving the deflector and the stationary blades;
   wherein the housing and the air pipe form an airflow channel, and in the blowing mode and the suction mode, the airflow moves in the airflow channel.

* * * * *